United States Patent
Huang et al.

(10) Patent No.: US 10,001,769 B2
(45) Date of Patent: Jun. 19, 2018

(54) SYSTEMS AND METHODS FOR OPTIMIZING FORMATION FRACTURING OPERATIONS

(71) Applicant: WEATHERFORD TECHNOLOGY HOLDINGS, LLC, Houston, TX (US)

(72) Inventors: Jian Huang, Houston, TX (US); Kedar M. Deshpande, Houston, TX (US); Mohammad Reza Safariforoshani, Houston, TX (US); Ovunc Mutlu, Houston, TX (US); Chih-Chau Hwang, Houston, TX (US); Rajesh K. Saini, Houston, TX (US); Leonid Vigderman, Houston, TX (US); Duane Treybig, Houston, TX (US); Clayton S. Smith, Houston, TX (US); Mathew M. Samuel, Houston, TX (US); Kern L. Smith, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 794 days.

(21) Appl. No.: 14/546,301

(22) Filed: Nov. 18, 2014

(65) Prior Publication Data

US 2016/0139588 A1    May 19, 2016

(51) Int. Cl.
*G05B 19/406*    (2006.01)
*E21B 43/267*    (2006.01)
(Continued)

(52) U.S. Cl.
CPC ............ *G05B 19/406* (2013.01); *E21B 43/26* (2013.01); *E21B 43/267* (2013.01); *G05B 19/19* (2013.01); *G05B 2219/45129* (2013.01)

(58) Field of Classification Search
CPC .................. G05B 19/406; G05B 19/19; G05B 2219/45129; E21B 43/26; E21B 43/267
(Continued)

(56) References Cited

U.S. PATENT DOCUMENTS

| 2,196,042 A | 4/1940 | Timpson ........................ 23/11 |
| 2,390,153 A | 12/1945 | Kern ............................ 260/72 |

(Continued)

FOREIGN PATENT DOCUMENTS

| CA | 2125513 | 1/1995 | |
| DE | 4027300 | 3/1992 | ............. B10D 53/14 |

(Continued)

OTHER PUBLICATIONS

Ribeiro et al., "A New Three-Dimensional, Compositional, Model for Hydraulic Fracturing with Energized Fluids", Society of Petroleum Engineers, 2012, 19pg.*

(Continued)

*Primary Examiner* — Ryan D. Coyer
(74) *Attorney, Agent, or Firm* — Vorys, Sater, Seymour & Pease LLP

(57) ABSTRACT

Systems and methods generate optimized formation fracturing operational parameters by iteratively optimizing bottom hole temperature design, perforation design, fracturing fluid pulse design, and proppant design based on formation properties, proppant properties, candidate selection, flow and geomechanical modeling, and engineering design, where the systems and methods as implemented on a digital processing unit.

19 Claims, 22 Drawing Sheets

(51) Int. Cl.
*E21B 43/26* (2006.01)
*G05B 19/19* (2006.01)

(58) Field of Classification Search
USPC ..................................................... 700/275
See application file for complete search history.

(56) References Cited

U.S. PATENT DOCUMENTS

| | | | |
|---|---|---|---|
| 2,805,958 A | 7/1959 | Bueche et al. ............... 106/308 |
| 3,059,909 A | 10/1962 | Wise ........................... 261/39.3 |
| 3,163,219 A | 12/1964 | Wyant et al. ................ 166/283 |
| 3,301,723 A | 1/1967 | Chrisp ........................... 149/20 |
| 3,301,848 A | 1/1967 | Halleck ..................... 536/123.1 |
| 3,303,896 A | 2/1967 | Tillotson et al. ............... 175/69 |
| 3,317,430 A | 5/1967 | Priestley et al. ............. 510/503 |
| 3,565,176 A | 2/1971 | Wittenwyler ................ 166/270 |
| 3,856,921 A | 12/1974 | Shrier et al. ................. 423/228 |
| 3,888,312 A | 6/1975 | Tiner et al. ............... 166/308.5 |
| 3,933,205 A | 1/1976 | Kiel ........................... 166/308.1 |
| 3,937,283 A | 2/1976 | Blauer et al. ................ 166/307 |
| 3,960,736 A | 6/1976 | Free et al. ................... 507/216 |
| 3,965,982 A | 6/1976 | Medlin ......................... 166/249 |
| 3,990,978 A | 11/1976 | Hill ............................. 507/235 |
| 4,007,792 A | 2/1977 | Meister ..................... 166/308.2 |
| 4,052,159 A | 10/1977 | Fuerst et al. ....................... 8/6 |
| 4,067,389 A | 1/1978 | Savins ......................... 166/246 |
| 4,108,782 A | 8/1978 | Thompon .................... 507/205 |
| 4,112,050 A | 9/1978 | Sartori et al. ................ 423/223 |
| 4,112,051 A | 9/1978 | Sartori et al. ................ 423/223 |
| 4,112,052 A | 9/1978 | Sartori et al. ................ 423/223 |
| 4,113,631 A | 9/1978 | Thompson ................... 507/202 |
| 4,378,845 A | 4/1983 | Medlin et al. ............... 166/297 |
| 4,385,935 A | 5/1983 | Skjeldal ....................... 106/607 |
| 4,461,716 A | 7/1984 | Barbarin et al. ............. 252/307 |
| 4,479,041 A | 10/1984 | Fenwick et al. ............ 200/81 R |
| 4,506,734 A | 3/1985 | Nolte ........................ 166/308.1 |
| 4,514,309 A | 4/1985 | Wadhwa ..................... 507/211 |
| 4,541,935 A | 9/1985 | Constien et al. ............ 507/225 |
| 4,549,608 A | 10/1985 | Stowe et al. .............. 166/280.1 |
| 4,561,985 A | 12/1985 | Glass, Jr. ..................... 507/108 |
| 4,623,021 A | 11/1986 | Stowe ...................... 166/250.1 |
| 4,654,266 A | 3/1987 | Kachnik ...................... 428/403 |
| 4,657,081 A | 4/1987 | Hodge ..................... 166/380.5 |
| 4,660,643 A | 4/1987 | Perkins ........................ 166/283 |
| 4,683,068 A | 7/1987 | Kucera ........................ 507/201 |
| 4,686,052 A | 8/1987 | Baranet et al. .............. 507/244 |
| 4,695,389 A | 9/1987 | Kubala ........................ 507/244 |
| 4,705,113 A | 11/1987 | Perkins ........................ 166/302 |
| 4,714,115 A | 12/1987 | Uhri ......................... 166/308.1 |
| 4,718,490 A | 1/1988 | Uhri ............................ 166/281 |
| 4,724,905 A | 2/1988 | Uhri ......................... 166/250.1 |
| 4,725,372 A | 2/1988 | Teot et al. .................... 507/129 |
| 4,739,834 A | 4/1988 | Peiffer et al. .............. 166/308.4 |
| 4,741,401 A | 5/1988 | Walles et al. ................ 166/300 |
| 4,748,011 A | 5/1988 | Baize ........................... 423/228 |
| 4,779,680 A | 10/1988 | Sydansk ....................... 166/300 |
| 4,795,574 A | 1/1989 | Syrinek et al. .............. 507/238 |
| 4,817,717 A | 4/1989 | Jennings, Jr. et al. ........ 166/278 |
| 4,830,106 A | 5/1989 | Uhri ......................... 166/250.1 |
| 4,846,277 A | 7/1989 | Khalil et al. ............... 166/280.1 |
| 4,848,468 A | 7/1989 | Hazlett et al. ............... 166/300 |
| 4,852,650 A | 8/1989 | Jennings, Jr. et al. ..... 166/250.1 |
| 4,869,322 A | 9/1989 | Vogt, Jr. et al. ........... 166/280.1 |
| 4,892,147 A | 1/1990 | Jennings, Jr. et al. ..... 166/280.2 |
| 4,926,940 A | 5/1990 | Stromswold ................ 166/247 |
| 4,938,286 A | 7/1990 | Jennings, Jr. .............. 166/280.1 |
| 4,978,512 A | 12/1990 | Dillon ......................... 423/226 |
| 5,005,645 A | 4/1991 | Jennings, Jr. et al. ..... 166/280.1 |
| 5,024,276 A | 6/1991 | Borchardt ................. 166/308.6 |
| 5,067,556 A | 11/1991 | Fudono et al. ............... 62/196.4 |
| 5,074,359 A | 12/1991 | Schmidt .................... 166/280.1 |
| 5,074,991 A | 12/1991 | Weers .......................... 208/236 |
| 5,082,579 A | 1/1992 | Dawson ....................... 507/211 |
| 5,106,518 A | 4/1992 | Cooney et al. ................. 507/21 |
| 5,110,486 A | 5/1992 | Manalastas et al. ......... 507/260 |
| 5,169,411 A | 12/1992 | Weers ............................. 44/421 |
| 5,224,546 A | 7/1993 | Smith et al. .................. 166/300 |
| 5,228,510 A | 7/1993 | Jennings, Jr. et al. ........ 166/263 |
| 5,246,073 A | 9/1993 | Sandiford et al. ............ 166/295 |
| 5,259,455 A | 11/1993 | Nimerick et al. .......... 166/308.5 |
| 5,330,005 A | 7/1994 | Card et al. ................. 166/280.2 |
| 5,342,530 A | 8/1994 | Aften et al. ................ 252/8.551 |
| 5,347,004 A | 9/1994 | Rivers et al. ................. 544/180 |
| 5,363,919 A | 11/1994 | Jennings, Jr. .............. 166/308.1 |
| 5,465,792 A | 1/1995 | Dawson et al. .............. 166/295 |
| 5,402,846 A | 4/1995 | Jennings, Jr. et al. ........ 166/259 |
| 5,411,091 A | 5/1995 | Jennings, Jr. .............. 166/280.1 |
| 5,424,284 A | 6/1995 | Patel et al. ................... 507/129 |
| 5,439,055 A | 8/1995 | Card et al. ................. 166/280.2 |
| 5,462,721 A | 10/1995 | Pounds et al. ............... 423/226 |
| 5,472,049 A | 12/1995 | Chaffee et al. ............ 166/250.1 |
| 5,482,116 A | 1/1996 | El-Rabaa et al. .......... 166/250.1 |
| 5,488,083 A | 1/1996 | Kinsey, III et al. .......... 507/211 |
| 5,497,831 A | 3/1996 | Hainey et al. ............. 166/308.1 |
| 5,501,275 A | 3/1996 | Card et al. ................. 166/280.2 |
| 5,539,044 A | 7/1996 | Dindi et al. .................. 524/570 |
| 5,551,516 A | 9/1996 | Norman et al. ........... 166/308.2 |
| 5,624,886 A | 4/1997 | Dawson et al. .............. 507/217 |
| 5,635,458 A | 6/1997 | Lee et al. ..................... 507/240 |
| 5,649,596 A | 7/1997 | Jones et al. .................. 166/300 |
| 5,669,447 A | 9/1997 | Walker et al. ................ 166/300 |
| 5,674,377 A | 10/1997 | Sullivan, III et al. ..... 208/208 R |
| 5,688,478 A | 11/1997 | Pounds et al. ............... 423/228 |
| 5,693,837 A | 12/1997 | Smith et al. .................. 556/148 |
| 5,711,396 A | 1/1998 | Joerg et al. ................... 180/444 |
| 5,722,490 A | 3/1998 | Ebinger ........................ 166/281 |
| 5,744,024 A | 4/1998 | Sullivan, III et al. ........ 208/236 |
| 5,755,286 A | 5/1998 | Ebinger ........................ 166/281 |
| 5,775,425 A | 7/1998 | Weaver et al. ............... 166/276 |
| 5,787,986 A | 8/1998 | Weaver et al. ............ 166/280.2 |
| 5,806,597 A | 9/1998 | Tjon-Joe-Pin et al. ....... 166/300 |
| 5,807,812 A | 9/1998 | Smith et al. .................. 507/238 |
| 5,833,000 A | 11/1998 | Weaver et al. ............... 166/276 |
| 5,853,048 A | 12/1998 | Weaver et al. ............... 166/279 |
| 5,871,049 A | 2/1999 | Weaver et al. ............... 166/276 |
| 5,877,127 A | 3/1999 | Card et al. ................... 507/273 |
| 5,908,073 A | 6/1999 | Nguyen et al. ............... 166/276 |
| 5,908,814 A | 6/1999 | Patel et al. ................... 507/131 |
| 5,964,295 A | 10/1999 | Brown et al. ............. 166/308.2 |
| 5,979,557 A | 11/1999 | Card et al. ................... 166/300 |
| 5,980,845 A | 11/1999 | Cherry ......................... 423/229 |
| 6,001,887 A | 12/1999 | Keup et al. .................. 516/118 |
| 6,016,871 A | 1/2000 | Burts, Jr. ..................... 166/300 |
| 6,035,936 A | 3/2000 | Whalen .................... 166/308.5 |
| 6,047,772 A | 4/2000 | Weaver et al. ............... 166/276 |
| 6,054,417 A | 4/2000 | Graham et al. .............. 507/238 |
| 6,059,034 A | 5/2000 | Rickards et al. .......... 166/280.2 |
| 6,060,436 A | 5/2000 | Synder et al. ................ 507/266 |
| 6,063,972 A | 5/2000 | Duncum et al. ............... 585/15 |
| 6,069,118 A | 5/2000 | Hinkel et al. ................ 507/277 |
| 6,123,394 A | 9/2000 | Jeffrey .......................... 299/16 |
| 6,133,205 A | 10/2000 | Jones ........................... 507/276 |
| 6,147,034 A | 11/2000 | Jones et al. .................. 507/238 |
| 6,162,449 A | 12/2000 | Maier et al. .................. 424/401 |
| 6,162,766 A | 12/2000 | Muir et al. ................... 507/267 |
| 6,169,058 B1 | 1/2001 | Le et al. ....................... 507/222 |
| 6,228,812 B1 | 5/2001 | Dawson et al. .............. 507/221 |
| 6,247,543 B1 | 6/2001 | Patel et al. ..................... 175/64 |
| 6,267,938 B1 | 7/2001 | Warrender et al. ........... 423/226 |
| 6,283,212 B1 | 9/2001 | Hinkel et al. ................ 166/279 |
| 6,291,405 B1 | 9/2001 | Lee et al. ..................... 507/136 |
| 6,330,916 B1 | 12/2001 | Rickards et al. .......... 166/280.2 |
| 6,725,931 B2 | 4/2004 | Nguyen et al. ............ 166/280.2 |
| 6,756,345 B2 | 6/2004 | Pakulski et al. ............. 507/246 |
| 6,793,018 B2 | 9/2004 | Dawson et al. .............. 166/300 |
| 6,832,650 B2 | 12/2004 | Nguyen et al. ............... 166/279 |
| 6,875,728 B2 | 4/2005 | Gupta et al. ................. 507/240 |
| 7,055,628 B2 | 6/2006 | Grainger et al. ............... 175/66 |
| 7,186,353 B2 | 3/2007 | Novak .......................... 252/70 |
| 7,268,100 B2 | 9/2007 | Kippie et al. ................ 507/244 |
| 7,350,579 B2 | 4/2008 | Gatlin et al. ............... 166/308.3 |
| 7,392,847 B2 | 7/2008 | Gatlin et al. .............. 166/280.2 |
| 7,517,447 B2 | 4/2009 | Gatlin .......................... 208/236 |
| 7,565,933 B2 | 7/2009 | Kippie et al. ................ 166/372 |

(56) References Cited

U.S. PATENT DOCUMENTS

| | | | |
|---|---|---|---|
| 7,566,686 B2 | 7/2009 | Kippie et al. | 507/213 |
| 7,712,535 B2 | 5/2010 | Venditto et al. | 166/308.2 |
| 7,767,628 B2 | 8/2010 | Kippie et al. | 507/102 |
| 7,829,510 B2 | 11/2010 | Gatlin et al. | 166/295 |
| 7,886,824 B2 | 2/2011 | Kakadjian et al. | 166/300 |
| 7,915,203 B2 | 3/2011 | Falana et al. | 507/138 |
| 7,932,214 B2 | 4/2011 | Zamora et al. | 507/202 |
| 7,942,201 B2 | 5/2011 | Ekstrand et al. | 166/246 |
| 7,956,017 B2 | 6/2011 | Gatlin et al. | 507/238 |
| 7,956,217 B2 | 6/2011 | Falana et al. | 562/572 |
| 7,971,659 B2 | 7/2011 | Gatlin et al. | 510/492 |
| 7,989,404 B2 | 8/2011 | Kakadjian et al. | 507/261 |
| 7,992,653 B2 | 8/2011 | Zamora et al. | 175/65 |
| 8,011,431 B2 | 9/2011 | van Petegem et al. | 166/270 |
| 8,028,755 B2 | 10/2011 | Darnell et al. | 166/379 |
| 8,034,750 B2 | 10/2011 | Thompson et al. | 507/273 |
| 8,084,401 B2 | 12/2011 | Lukocs et al. | 507/238 |
| 8,093,431 B2 | 1/2012 | Falana et al. | 564/471 |
| 8,097,567 B2 | 1/2012 | Wilson, Jr. | 507/131 |
| 8,141,661 B2 | 3/2012 | Kakadjian et al. | 175/69 |
| 8,158,562 B2 | 4/2012 | Wilson, Jr. et al. | 507/238 |
| 8,172,952 B2 | 5/2012 | Wanner et al. | 134/22.11 |
| 8,220,546 B2 | 7/2012 | Kakadjian et al. | 166/305.1 |
| 8,258,339 B2 | 9/2012 | Falana et al. | 562/572 |
| 8,273,693 B2 | 9/2012 | Schwartz | 507/238 |
| 8,287,640 B2 | 10/2012 | Zamora et al. | 106/677 |
| 8,362,298 B2 | 1/2013 | Falana et al. | 562/590 |
| 8,466,094 B2 | 6/2013 | Kakadjian et al. | 507/229 |
| 8,475,585 B2 | 7/2013 | Zamora et al. | 106/677 |
| 8,507,412 B2 | 8/2013 | Lukocs et al. | 507/238 |
| 8,507,413 B2 | 8/2013 | Wilson, Jr. | 507/240 |
| 8,524,639 B2 | 9/2013 | Falana et al. | 507/202 |
| 8,530,394 B2 | 10/2013 | Gatlin et al. | 507/239 |
| 8,563,481 B2 | 10/2013 | Gatlin et al. | 507/203 |
| 8,714,283 B2 | 5/2014 | Gatlin et al. | 175/69 |
| 8,728,989 B2 | 5/2014 | Kakadjian et al. | 507/221 |
| 8,772,203 B2 | 7/2014 | Schwartz | 507/128 |
| 8,835,364 B2 | 9/2014 | Thompson et al. | 507/267 |
| 8,841,240 B2 | 9/2014 | Kakadjian et al. | 507/240 |
| 8,846,585 B2 | 9/2014 | Falana et al. | 507/233 |
| 8,851,174 B2 | 10/2014 | Zamora et al. | 166/285 |
| 8,871,694 B2 | 10/2014 | Zamora et al. | 507/238 |
| 8,899,328 B2 | 12/2014 | Zamora et al. | 166/285 |
| 8,932,996 B2 | 1/2015 | Falana et al. | 507/128 |
| 8,944,164 B2 | 2/2015 | Veldman et al. | 166/276 |
| 8,946,130 B2 | 2/2015 | Zamora et al. | 507/204 |
| 8,950,493 B2 | 2/2015 | van Petegem et al. | 166/308.2 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2008/0149329 A1* | 6/2008 | Cooper | E21B 43/267 166/250.01 |
| 2010/0252262 A1 | 10/2010 | Ekstrand et al. | 166/280.1 |
| 2010/0305010 A1 | 12/2010 | Falana et al. | 507/274 |
| 2010/0311620 A1 | 12/2010 | Kakadjian et al. | 507/136 |
| 2011/0001083 A1 | 1/2011 | Falana et al. | 252/178 |
| 2011/0120718 A1* | 5/2011 | Craig | E21B 43/26 166/308.1 |
| 2011/0177982 A1 | 7/2011 | Ekstrand et al. | 507/201 |
| 2011/0240131 A1 | 10/2011 | Parker | 137/13 |
| 2012/0071367 A1 | 3/2012 | Falana et al. | 507/103 |
| 2012/0073813 A1 | 3/2012 | Zamora et al. | 166/285 |
| 2012/0097893 A1 | 4/2012 | Wanner et al. | 252/184 |
| 2012/0273206 A1 | 11/2012 | Zamora et al. | 166/308.1 |
| 2012/0279727 A1 | 11/2012 | Kakadjian et al. | 166/386 |
| 2012/0295820 A1 | 11/2012 | Falana et al. | 507/128 |
| 2012/0302468 A1 | 11/2012 | Falana et al. | 507/110 |
| 2012/0325329 A1 | 12/2012 | Schwartz | 137/1 |
| 2013/0081820 A1 | 4/2013 | Falana et al. | 166/308.1 |
| 2013/0096038 A1 | 4/2013 | Kim et al. | 507/221 |
| 2013/0175477 A1 | 7/2013 | Falana et al. | 252/389.23 |
| 2013/0270012 A1 | 10/2013 | Kakadjian et al. | 175/65 |
| 2013/0274151 A1 | 10/2013 | Kakadjian et al. | 507/204 |
| 2013/0312977 A1 | 11/2013 | Lembcke et al. | 166/311 |
| 2013/0331301 A1 | 12/2013 | Falana et al. | 507/105 |
| 2014/0087977 A1 | 3/2014 | Kim et al. | 507/225 |
| 2014/0128294 A1 | 5/2014 | Gatlin et al. | 507/110 |
| 2014/0128308 A1 | 5/2014 | Levey et al. | 510/188 |
| 2014/0166285 A1 | 6/2014 | Santra et al. | 166/292 |
| 2014/0262287 A1 | 9/2014 | Treybig et al. | 166/305.1 |
| 2014/0262319 A1 | 9/2014 | Treybig et al. | 166/371 |
| 2014/0303048 A1 | 10/2014 | Kakadjian et al. | 507/236 |
| 2014/0315763 A1 | 10/2014 | Kakadjian et al. | 507/115 |
| 2014/0318793 A1 | 10/2014 | van Petergem et al. | 166/305.1 |
| 2014/0318795 A1 | 10/2014 | Thompson et al. | 166/308.5 |
| 2014/0323360 A1 | 10/2014 | Comarin et al. | 507/111 |
| 2014/0323362 A1 | 10/2014 | Falana et al. | 507/127 |
| 2015/0007989 A1 | 1/2015 | Tan et al. | 166/279 |
| 2015/0011440 A1 | 1/2015 | Zamora et al. | 507/202 |
| 2015/0051311 A1 | 2/2015 | Zamora et al. | 523/130 |
| 2015/0068747 A1 | 3/2015 | Hwang et al. | 166/280.2 |
| 2015/0072901 A1 | 3/2015 | Samuel et al. | 507/104 |
| 2015/0087561 A1 | 3/2015 | Falana et al. | 507/102 |
| 2015/0087562 A1 | 3/2015 | Falana et al. | 507/102 |

FOREIGN PATENT DOCUMENTS

| | | | |
|---|---|---|---|
| GB | 775376 | 10/1954 | |
| GB | 1073338 A | 6/1967 | |
| JP | 10001461 | 6/1988 | C07C 211/50 |
| JP | 08151422 | 11/1996 | |
| JP | 10110115 A | 4/1998 | |
| JP | 2005194148 A | 7/2005 | |
| WO | WO 98/56497 | 12/1998 | |
| WO | WO 2009-141308 | 11/2009 | C09K 8/528 |

OTHER PUBLICATIONS

Safari et al., "Pulsed Fracturing in Shale Reservoirs: Geomechanical Aspects, Ductile-Brittle Transition and Field Implications", Unconventional Resources Technology Conference, 2013, 14pg.*

* cited by examiner

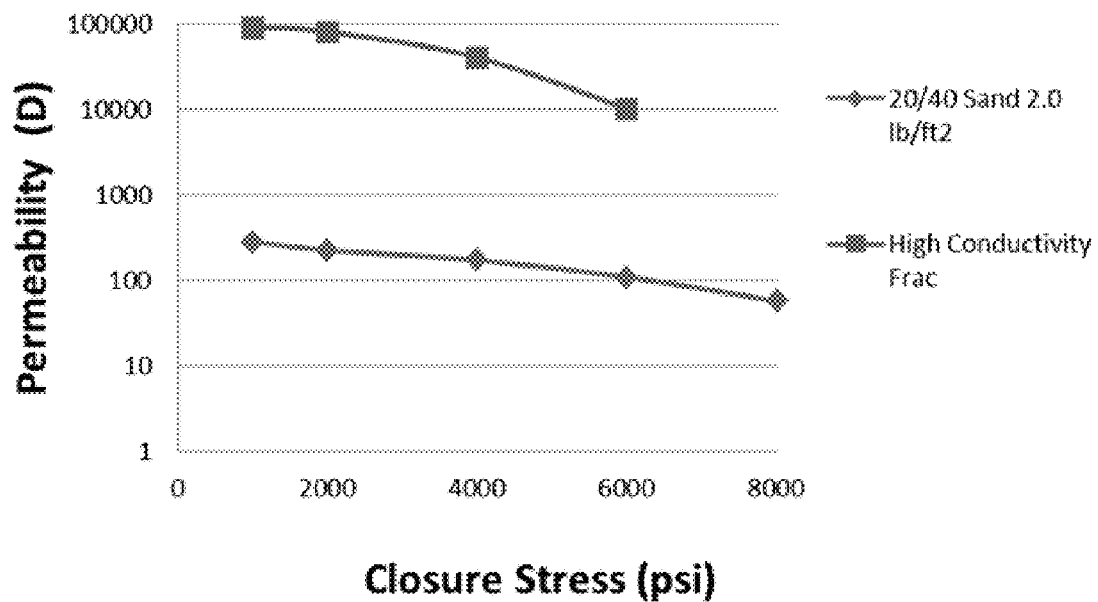
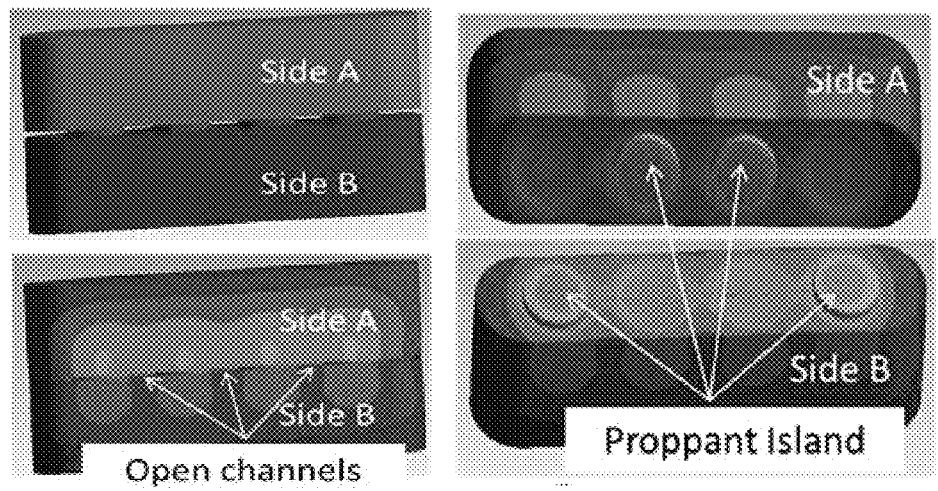
FIG. 3

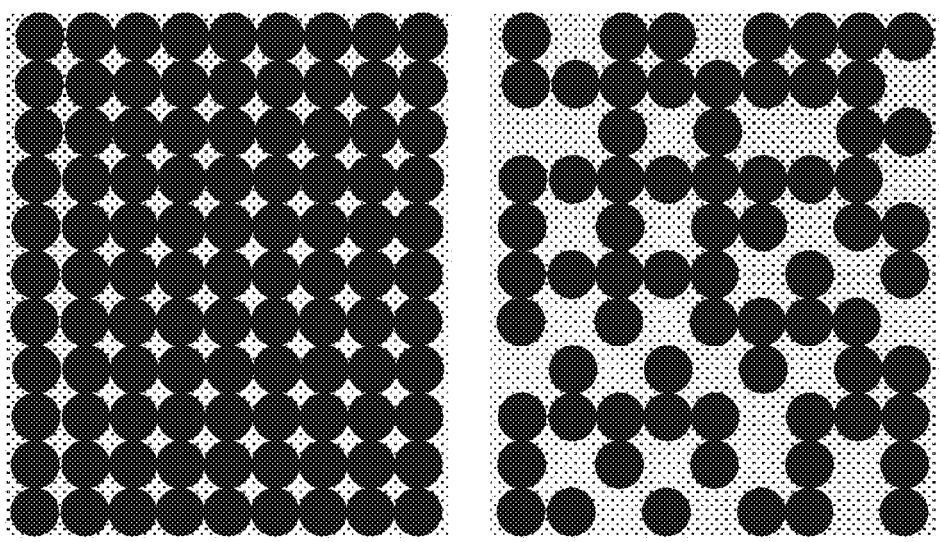
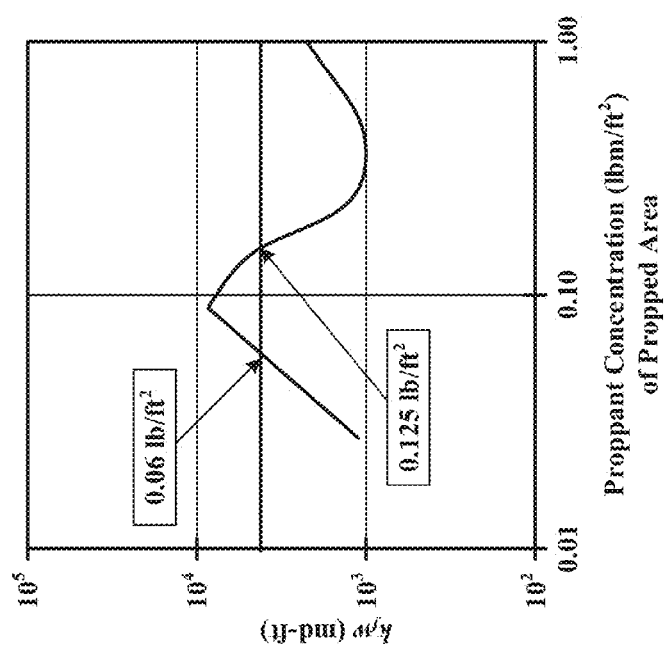
FIG. 4

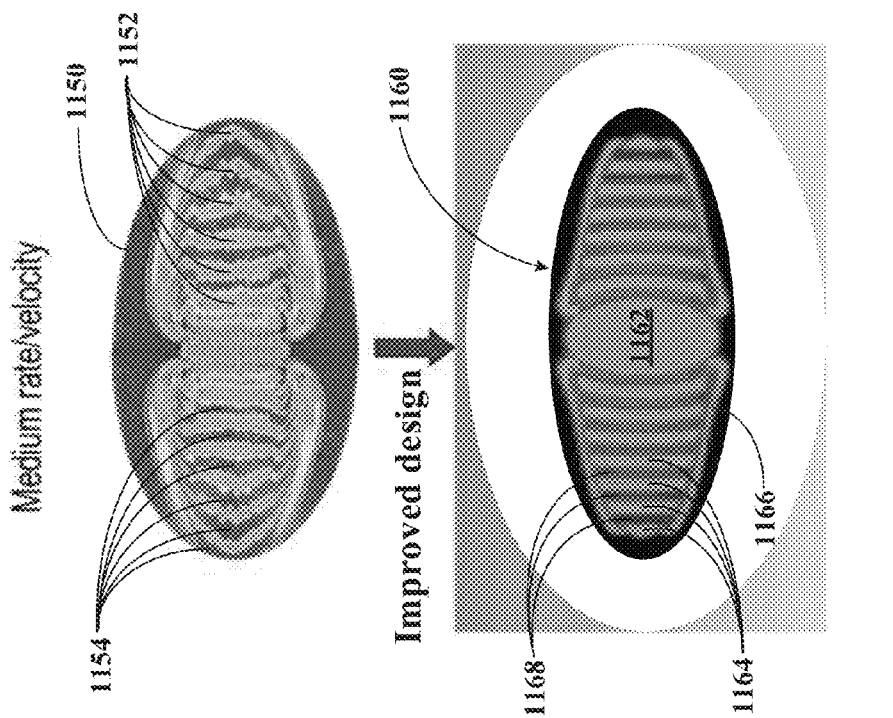
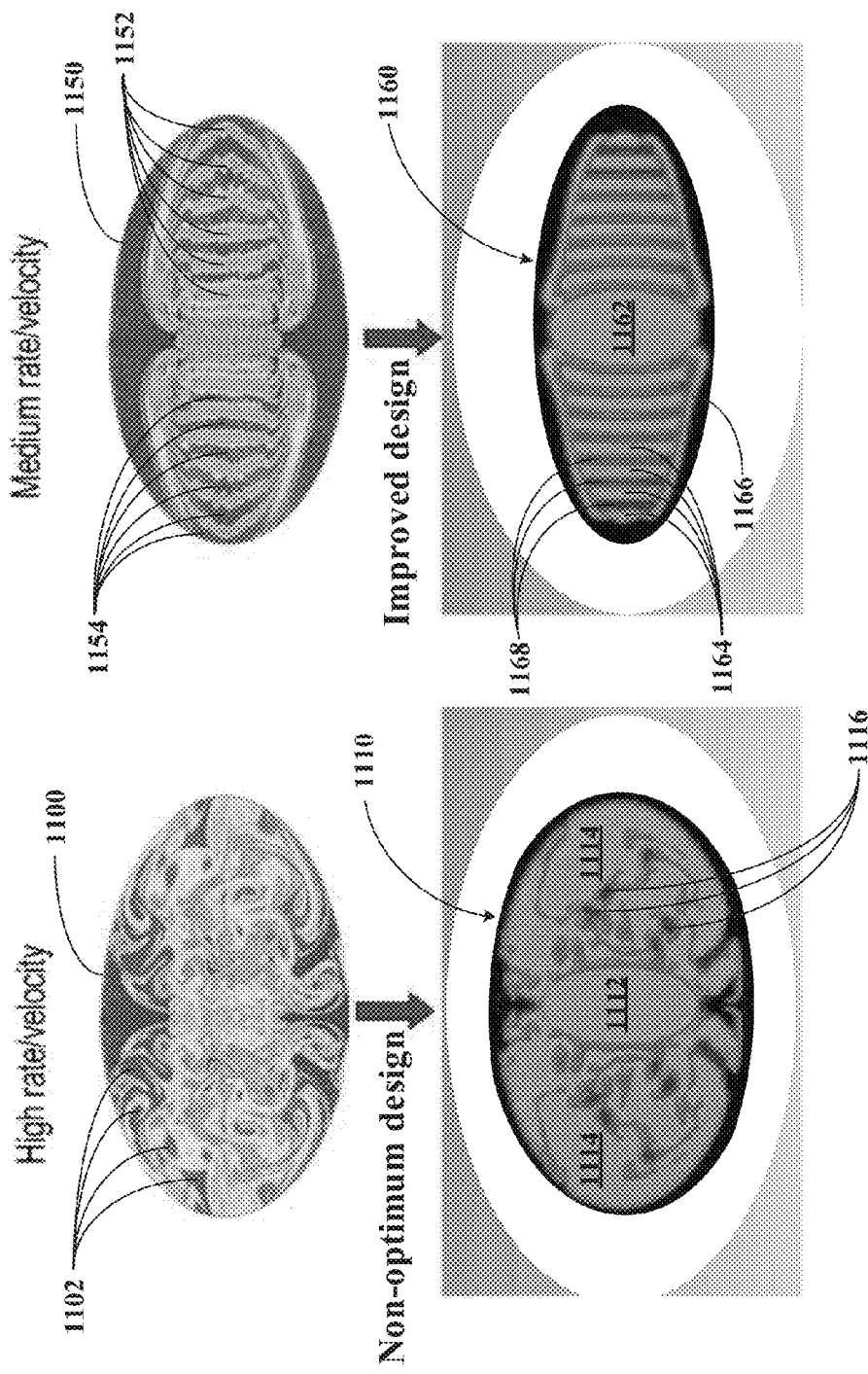
FIG. 10A
FIG. 10B
FIG. 10C
FIG. 10D

Shorter Perforation Interval

Non-optimum design

Longer Perforation Interval

Improved design

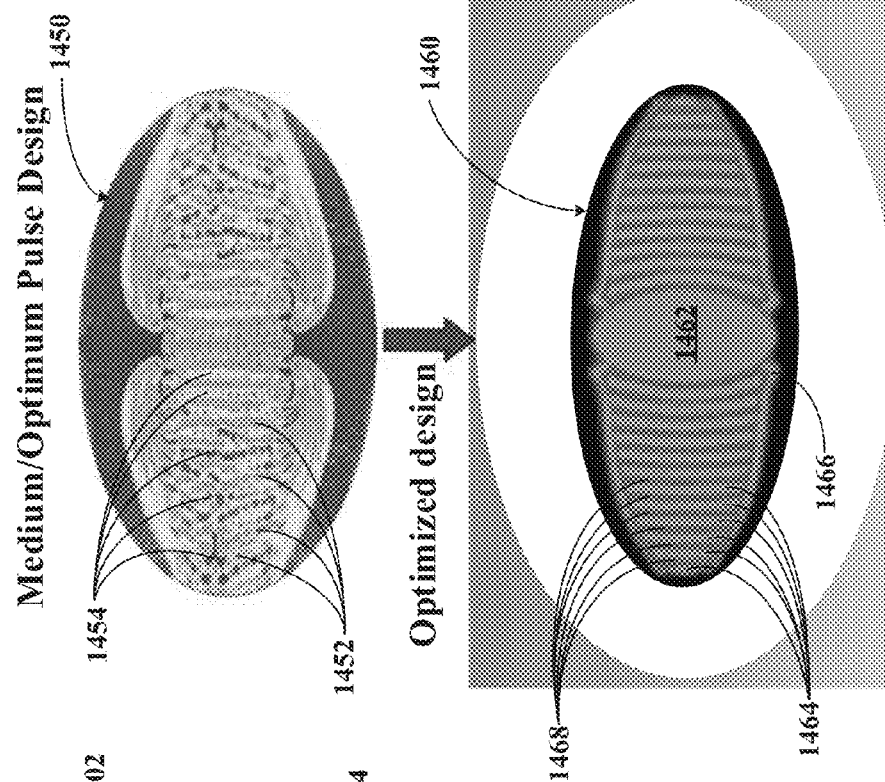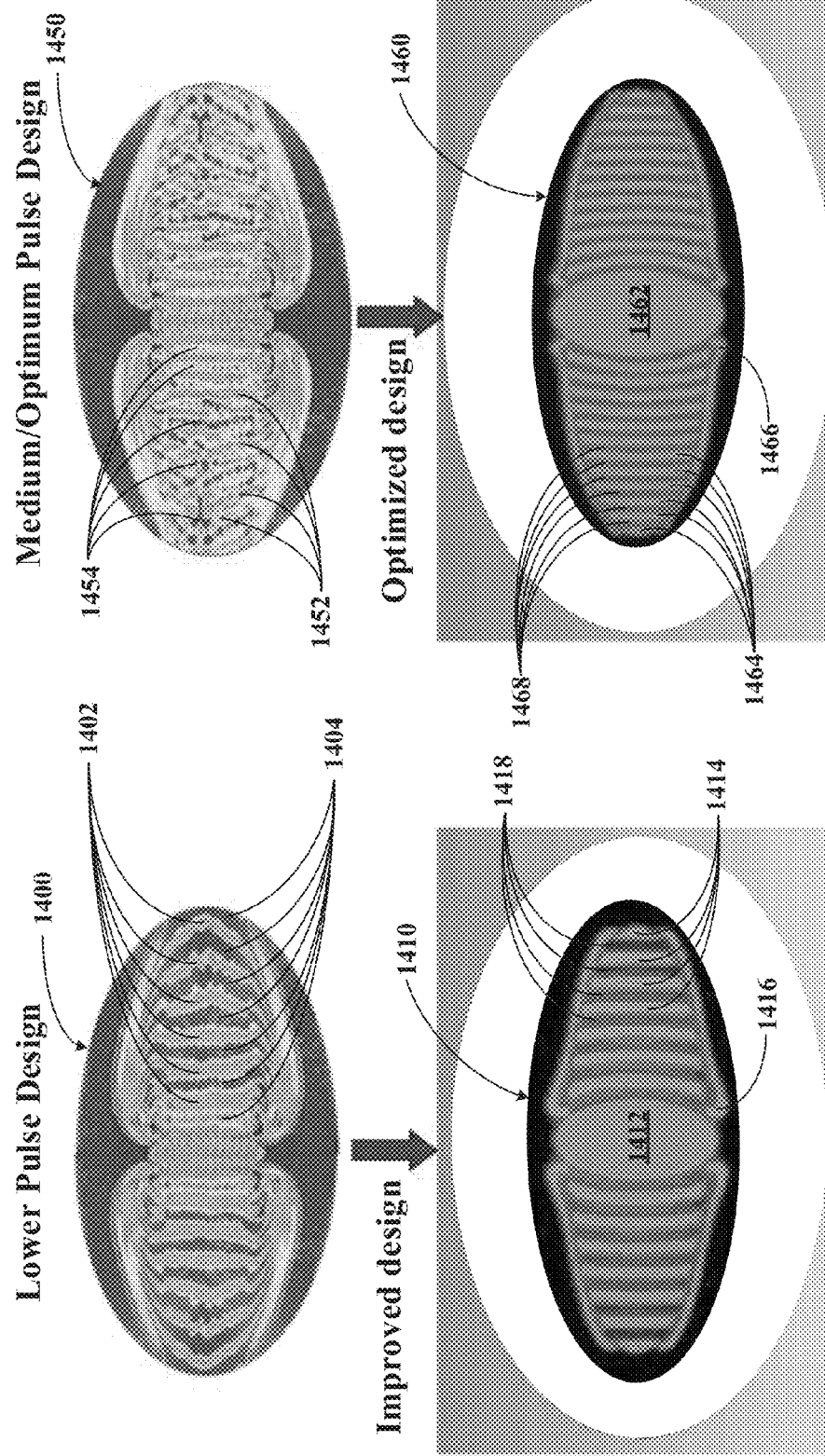
FIG. 13A Lower Pulse Design
FIG. 13B Medium/Optimum Pulse Design
FIG. 13C Improved design
FIG. 13D Optimized design

SYSTEMS AND METHODS FOR OPTIMIZING FORMATION FRACTURING OPERATIONS

BACKGROUND OF THE INVENTION

1. Field of the Invention

Embodiments of the present invention relates to systems and methods for optimizing formation fracturing by iteratively optimizing bottom hole pressure (BHP) and temperature design, perforation design, fracturing fluid pulse and rate design, and proppant design based on formation and proppant properties, candidate selection, flow and geomechanical modeling and engineering design.

More particularly, embodiments of the present invention relates to systems and methods for optimizing formation fracturing by iteratively optimizing bottom hole temperature design, perforation design, fracturing fluid pulse and rate design, and proppant design based on formation and proppant properties, candidate selection, flow and geomechanical modeling and engineering design, where the systems include (a) a subsystem that collects or inputs formation and/or zone properties and characteristics, (b) a subsystem that selects a proppant composition, (c) a subsystem that selects fracturing fluid pulses and rates for placing the proppant composition into the formation and/or formation zone, (d) a subsystem that selects a perforation design, (e) a subsystem that selected a bottom hole pressure (BHP) design, and (f) a subsystem that iteratively optimizes proppant composition, fracturing fluid pulse and rate design, perforation design, and BHP design to produce optimal fracturing application parameters based on the formation and/or formation zone and/or proppant properties and characteristics.

2. Description of the Related Art

Hydraulic fracturing is a primary tool for improving well productivity by forming fractures in a formation from a well bore penetrating the formation to enhance production from or injection into the formation. Hydraulic fracturing is typically performed by injecting a fracturing fluid into a wellbore penetrating a subterranean formation above the formation pressure forming or extending cracks and/or fractures in the formation. During the fracturing operation, proppant is also injected into the formation and into the fractures in an attempt to reduce or prevent fracture closing after fracturing, and thus, providing improved flow into and out of the formation or zones thereof.

The success of a hydraulic fracturing treatment is related to the fracture conductivity, which is the ability of fluids to flow from or into the formation through the proppant pack—proppants injected into the fractures to hole the fracture open. In other words, the proppant pack or matrix must have a high fluid conductivity or permeability relative to the formation for fluid to flow with low resistance into or form the wellbore.

In traditional fracturing operations, techniques have been used to increase the fluid conductivity or permeability of the proppant pack by increasing the porosity of the interstitial channels between adjacent proppant particles within the proppant matrix. These traditional operations seek to distribute the porosity and interstitial flow passages as uniformly as possible in the consolidated proppant matrix filling the fracture. The fracturing employs homogeneous proppant placement procedures to substantially uniformly distribute the proppant and non-proppant, porosity-inducing materials within the fractures.

In U.S. Pat. No. 6,776,235 (England), a method for hydraulically fracturing a subterranean formation involving alternating stages of proppant-containing hydraulic fracturing fluids contrasting in their proppant-settling rates to form proppant clusters as pillars that prevent fracture closing to improve hydraulic fracture conductivity. This method can, for example, alternate the stages of proppant-laden and proppant-free fracturing fluids to create proppant clusters in the fractures and open channels between them for formation fluids to flow. Thus, the fracturing treatments result in a heterogeneous proppant placement (HPP) and a "room-and-pillar" configuration in the fractures, rather than a homogeneous proppant placement and consolidated proppant pack. The amount of proppant deposited in the fracture during each HPP stage is modulated by varying the fluid transport characteristics (such as viscosity and elasticity), the proppant densities, diameters, and concentrations and the fracturing fluid injection rate.

In U.S. Pat. No. 7,451,812 (Cooper et al.), a system and a method for heterogeneous proppant placement in a fracture in a subterranean formation are disclosed. The system includes a delivery system for delivering proppant and treatment fluid to the fracture, a sensor for measuring geometry of the fracture and a computer in communication with the sensor. The computer includes a software tool for real-time design of a model for heterogeneous proppant placement in the fracture based on data from the sensor measurements and a software tool for developing and updating a proppant placement schedule for delivering the proppant and treatment fluid to the fracture corresponding to the model. A control link between the computer and the delivery system permits the delivery system to adjust the delivery of the proppant and treatment fluid according the updated proppant placement schedule.

While there are currently a number of systems and methods for modifying or adjusting fracturing operations of a formation, many of these systems and methods suffer from a consideration of only one or two aspects of a fracturing operation, thus, there is a need in the art for systems and methods that are capable of creating an optimal fracturing operation based on formation properties and characteristics by iteratively optimizing all facets/aspects of the fracturing operation.

SUMMARY OF THE INVENTION

Embodiments of this invention provide methods implemented on or in one digital processing unit or a plurality of digital processing units for producing optimized fracturing operations including iteratively optimized proppant composition, fracturing fluid pulse and rate design, perforation design, and BHP design. The methods include collecting formation properties and characteristics, e.g., depth, pore pressure gradient, permeability, etc. in a data input subsystem or module. The methods also include collecting geomechanical properties and characteristics, e.g., Young's modulus, Poisson's ratio, minimum horizontal principal stress ($S_{hmin}$) gradient, etc. in the data input subsystem or module. The methods also include collecting site and well specific information, e.g., trajectory, pumping schedule, etc. in the data input subsystem or module. The methods also include determining proppant pillar mechanical properties from experimental data to build up and calibrate the material model with experimentally determined proppant pillar mechanical properties in the data input subsystem or module.

The methods also include performing hydraulic fracture geometry modeling and outputting fracture extent, e.g., height, length, aperture, orientation, etc. in a candidate formation selection subsystem or module. The methods also include, based on calibrated pillar properties and modeled fracture geometry, generating response surfaces for different pillar configurations and using the response surfaces as a reliable screening technique to select candidates. The response surfaces may be generated by an analytical or a numerical engine, where the response surfaces provide a quick look analysis of a combination of formation properties, pillar/proppant characteristics, depth of investigation, pillar spacing, optimum draw down, etc. The response surfaces act as aids in evaluating, weighing, and/or comparing candidate. The methods also include testing candidate formation or well or wells (among multiple wells) viability. If the candidate is determined to be non-viable, then the methods include selecting a different formation type, well, wells, formations, and/or a different proppant/pillar type and repeating the response surface generating step and the viability testing step until one or more viable candidates are generated. If one or more candidates are determined to be viable, then the candidate is forwarded to an advanced flow geomechanical and production analysis subsystem or module.

The methods also include simulating proppant pillar transport and quantifying pillar pattern geometry via computational fluid dynamics (CFD) models and export pillar configurations into geomechanical models in an engineering design subsystem or module. The methods also include simulating pillar deformation (embedment and crush) and fracture closure dynamics using geomechanical models for different pillar configurations and output conductivity maps for formation simulations. The methods also include performing production and economic analyses to evaluate the success of each proposed design to determine an optimal design for the a specific formation such as a shale play. If a design meets targeted production and economics, then the methods include outputting optimized engineering design parameters. If the design fails to meet the targeted production and economics, then the methods include modifying and/or adjusting engineering design parameters (e.g., BHP design, perforation design, proppant composition, pulse design including pulse composition, pulse frequency, pumping rate, etc.) and rerunning the advanced flow geomechanical and production analysis until an optimized design is achieved. If a design meets targeted production and economics, then the methods include outputting optimized engineering design parameters to an optimal design output subsystem or module, where the design parameters include treatment schedule, perforation design, pulse frequency, pumping rate, proppant composition, optimum BHP, etc. The methods also include providing the design parameters to be applied in the field as field operation/design recommendations to guide field application. The methods may also include making modifications in one, some or all of the design parameters in near real time (RT) based on near real time formation fracturing operational data.

Embodiments of this invention also provide systems implemented in one digital processing unit or a plurality of digital processing units for producing optimized fracturing operations including iteratively optimized proppant composition, fracturing fluid pulse and rate design, perforation design, and BHP design. The systems of this invention includes a data input subsystem or module. The data input module accepts or collects formation properties and characteristics including depth, pore pressure gradient, permeability, etc. The input module also accepts or collects geomechanical properties and characteristics including Young's modulus, Poisson's ratio, minimum horizontal principal stress ($S_{hmin}$) gradient, etc. and site and well specific information including trajectory, pumping schedule, fluid rheological and fluid material properties etc. The input module also receives and accepts proppant pillar mechanical properties obtained from experimental data and generates and calibrates proppant pillar material models. The systems also include a candidate well or candidate formation selection subsystem or module, where the candidates may be multiple shale formations or plays or multiples wells in a specific shale play or any other formation or well into the formation. The candidate selection module performs hydraulic fracture geometry modeling and outputs fracture properties including height, length, aperture, orientation, etc. Based on calibrated pillar properties and modeled fracture geometry, the candidate selection module generates response surfaces for different pillar configurations and uses the response surfaces to screen candidates. The response surfaces may be generated by an analytical engine or a numerical engine. The response surfaces provide a quick look analysis of formation properties, pillar/proppant characteristics, depth of investigation, pillar spacing(s), optimum draw down, etc. for assisting the evaluation and comparisons of different candidate selections. If a candidate fails selection, the candidate selection module selects a different formation type and/or a different proppant/pillar type and go through the quick look analysis/screening. This process is repeated until a viable candidate is selected at which point, the selected candidate is further analyzed in an advanced flow geomechanical and production analysis subsystem or module. The advanced flow geomechanical and production analysis subsystem or module simulates proppant pillar transport and quantifies pillar pattern geometry via computational fluid dynamics (CFD) models and export pillar configurations into the geomechanics model. The analysis subsystem or module also simulates pillar deformation (embedment and crush) and fracture closure with geomechanics models for different pillar configurations and outputs conductivity maps for simulations. The analysis subsystem or module also performs production and economic analyses to evaluate the proposed design and to search for an optimized design for the specific formation. If the design falls below the targeted production and economic levels, then the analysis subsystem or module modifies engineering design parameters such as BHP, perforations, pulse frequencies, pulse rates, pulse compositions, etc. and reruns the advanced flow geomechanical and production analysis until reaching an optimized design. Once an optimal design that achieves the targeted production & economics is found, then the analysis subsystem or module outputs optimized engineering design parameters. The systems also include an output subsystem or module that receives the design parameters including treatment schedule, perforation design, pulse design (frequency, rate, composition, etc.), optimum BHP, optimal proppant composition, and production uplift to be applied in the field. The systems also include an operation subsystem or module that provides field operation/design recommendations to guide field fracturing operations. The systems may also include a near real time (RT) modification subsystem or module that generates modified design parameters based on near RT data collected during the fracturing operation and input into the real time (RT) modification subsystem or module permitting on the fly optimization of fracturing operations to achieve optimal formation fracturing and propping.

BRIEF DESCRIPTION OF THE DRAWINGS

The invention can be better understood with reference to the following detailed description together with the appended illustrative drawings in which like elements are numbered the same:

FIG. 3 depicts a plot of permeability versus closure pressure and a numerical example showing open channels between proppant islands and under closure stress.

FIG. 4 depicts a plot of $k_f w$ versus proppant layer type illustrating the difference between mono-layered proppant and partial mono-layered proppant configurations.

FIGS. 10A-D depict a high rate/velocity injection that results in a non-optimum proppant placement configuration versus a medium rate/velocity injection that results in an improved proppant placement configuration.

FIGS. 13A-D depicts the proppant placement configuration for the lower pulse design and medium or optimum pulse design of FIG. 12.

DEFINITIONS OF TERM USED IN THE INVENTION

Figure 1:
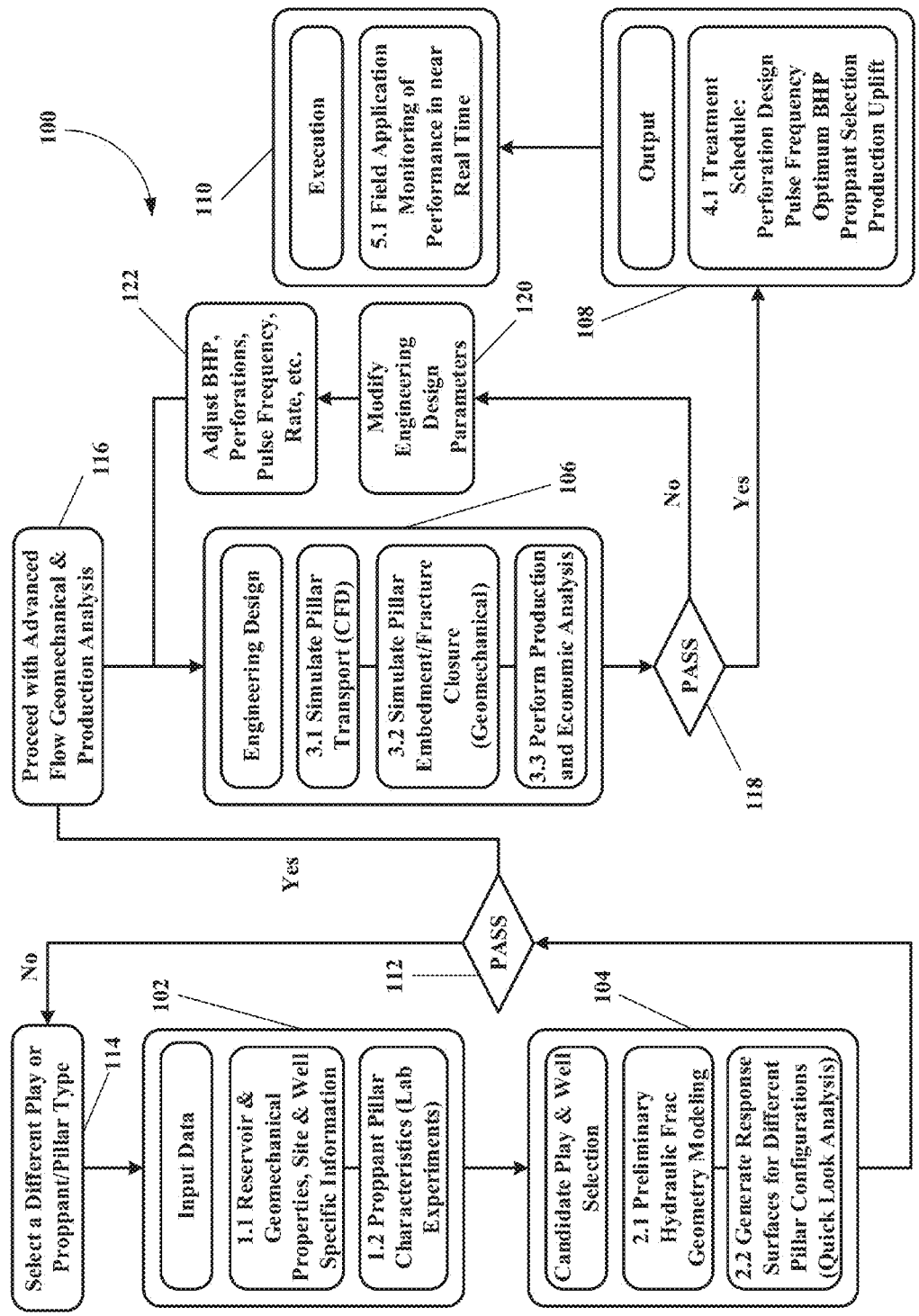
FIG. 1 depicts a schematic flow chart of the methods and systems of the present invention.

The following definitions are provided in order to aid those skilled in the art in understanding the detailed description of the present invention.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "proppant pillar, proppant island, proppant cluster, proppant aggregate, or proppant agglomerate" mean that a plurality of proppant particles are aggregated, clustered, agglomerated or otherwise adhered together to form discrete structures.

The term "mobile proppant pillar, proppant island, proppant cluster, proppant aggregate, or proppant agglomerate" means proppant pillar, proppant island, proppant cluster, proppant aggregate, or proppant agglomerate that are capable of repositioning during fracturing, producing, or injecting operations.

The term "self healing proppant pillar, proppant island, proppant cluster, proppant aggregate, or proppant agglomerate" means proppant pillar, proppant island, proppant cluster, proppant aggregate, or proppant agglomerate that are capable of being broken apart and recombining during fracturing, producing, or injecting operations.

The term "amphoteric" refers to surfactants that have both positive and negative charges. The net charge of the surfactant can be positive, negative, or neutral, depending on the pH of the solution.

The term "anionic" refers to those viscoelastic surfactants that possess a net negative charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactants" or "VES" refers to that class of compounds which can form micelles (spherulitic, anisometric, lamellar, or liquid crystal) in the presence of counter ions in aqueous solutions, thereby imparting viscosity to the fluid. Anisometric micelles in particular are preferred, as their behavior in solution most closely resembles that of a polymer.

The abbreviation "VAS" refers to a Viscoelastic Anionic Surfactant, useful for fracturing operations and frac packing. As discussed herein, they have an anionic nature with preferred counterions of potassium, ammonium, sodium, calcium or magnesium.

The term "foamable" means a composition that when mixed with a gas forms a stable foam.

The term "real time" means that adjustments are made to fracturing parameters during a fracturing operation without a temporal delay due to downhole data correction, processing, transmitting, and implementing the adjustments.

The term "near real time" means that adjustments are made to fracturing parameters during a fracturing operation without substantially no temporal delay due to downhole data correction, processing, transmitting, and implementing the adjustments without a temporal delay due to downhole data correction, processing and implementing the adjustments, where substantially here means that the delay is less than or equal to 2 days. In certain embodiments, the delay is less than or equal to 1 day. In certain embodiments, the delay is less than or equal to 8 hours. In certain embodiments, the delay is less than or equal to 4 hours. In certain embodiments, the delay is less than or equal to 2 hours. In certain embodiments, the delay is less than or equal to 1 hour. In certain embodiments, the delay is less than or equal to 30 minutes. In certain embodiments, the delay is less than or equal to 15 minutes. In certain embodiments, the delay is less than or equal to 10 minutes. In certain embodiments, the delay is less than or equal to 5 minutes. In certain embodiments, the delay is less than or equal to 1 minute. In certain embodiments, the delay is less than or equal to 30 seconds. In certain embodiments, the delay is less than or equal to 10 seconds. In certain embodiments, the delay is less than or equal to 5 seconds.

The term "gpt" means gallons per thousand gallons.
The term "ppt" means pounds per thousand gallons.
The term "SRV" means stimulated rock volume.
The term "spf" means shots per foot.
The term "bpm" means barrels per minute.

DETAILED DESCRIPTION OF THE INVENTION

The inventors have found that systems and methods can be constructed and implemented on one digital processing unit or a plurality of digital processing units for optimized formation fracturing by iteratively optimizing bottom hole pressure (BHP) and temperature design, perforation design, fluid and proppant pulse and rate design, and proppant design based on formation properties, candidate selection, flow and geomechanical modeling and engineering design. The systems and methods produce optimized fracturing operational parameters based on proppant or formation/reservoir properties and characteristics. One significant aspect of this invention resides in the fact that optimized fracturing operational parameters that include optimized proppant selection, optimized perforation design, optimized BHP design and optimized pulse sequence design are generated and delivered to the job site prior to commencing with the fracturing job. These optimized fracturing operational parameter alone may be used to facilitate an optimized formation fracturing operation and an optimized placement of proppant to achieve optimized high conductivity fractures. The inventors have also found that by collected downhole data during the fracturing operation, one, some or all of the generated optimized fracturing operational parameter may be modified or adjusted to further improve fracturing and proppant placement and the development of high conductivity fractures within the fractured formation, where the high conductivity fractures include the configuration or network of proppant islands or pillars and flow channels generated by the optimized fracturing operational parameters generated by the modeling methods and systems of this invention.

The systems and methods of this invention include a module and steps that collect all the necessary reservoir properties and characteristics (e.g., depth, pore pressure gradient, porosity, permeability, reservoir fluid properties, temperature, natural fracture, etc.) and geomechanics properties and characteristics (e.g., Young's modulus, Poisson's ratio, stress gradients, cohesion, friction angle, formation anisotropy, etc.) of the formation, formation zone, shale play(s) and site and well specific information (trajectory, pumping schedule) and extract proppant pillar mechanical properties from experimental data to build up and calibrate the material model with experiment results. The systems and methods also include a module and steps that perform hydraulic fracture modeling and output fracture extent (height, length & aperture) and based on calibrated pillar properties and modeled fracture geometry, generate response surfaces for different pillar configurations and use them as a reliable screening analysis/tool to select proper candidates. The response surfaces could be generated by an analytical or a numerical engine. The response surfaces provide a quick look analysis (combinations of formation properties, pillar/proppant characteristics, depth of investigation, pillar spacing(s), optimum draw down). The response surfaces help evaluate relative chance of success via comparisons between candidate plays or well(s). If the candidate is viable, proceed with a PASS and conduct advanced flow geomechanical and production analysis module. If the candidate fails, select a different play or proppant/pillar type and go through the quick look analysis/screening. The systems and methods also include repeating these steps until a viable candidate is selected (play or well). The methods and systems also include module and steps that simulate proppant pillar transport and quantify pillar pattern geometry via CFD (computational fluid dynamics) models and export pillar configurations into geomechanics model and simulate pillar deformation (embedment and crush) and fracture closure with geomechanics models for different pillar configurations and output conductivity map for reservoir simulations. The simulation module also perform production and economic analysis to evaluate the success of the proposed design and search for the optimized design for the specific play. If the targeted production & economics achieved: output optimized engineering design parameters. If the design falls below the targeted production and economic levels: modify engineering design parameters (e.g., BHP, perforations, pulse frequency, pulse rate, etc.) and rerun the advanced flow geomechanical and production analysis until reaching an optimized design. The systems and methods also include a module and steps that output all the design parameters, including treatment schedule, perforation design, fluid pulse design, optimum BHP, proppant selection and production uplift to be applied in the field. The systems and methods may also include a module and steps that provide field operation/design recommendation to guide field applications. The systems and methods may also include a module and steps that make modifications of optimal fracturing parameters in near RT based on data collected during fracturing.

The systems and methods of this invention are designed to create high conductivity fractures in a formation using flow simulation & geomechanics and engineered chemistry, which represent default included in geomechanics, flow and engineered chemistry sub-workflows. For example optimal fracturing parameters are an output from the geomechanical analysis.

The systems and methods of this invention are directed to pillar fracturing for the production of high conductivity fracture creation with increased effective lengths using intermittent pumping of proppant-containing fluids and proppant-free fluids, where the proppants may include untreated proppants, treated proppants including coatings of an aggregating composition or a proppants including crosslinked aggregating composition coatings and where the fluid may include aggregating compositions, coating crosslinking compositions or both. The optimal fracturing parameters are implemented to optimize spaces between proppant islands to provide high conductivity flow channels and to create longer effective and conductive fracture lengths for production of oil and gas from the formation or for the injection of fluids into the formation. Uplift from this technique is due to a combination of created high conductivity channels and increased effective fracture lengths (via fluid pulses that might push the proppant islands further into the fracture). That is, it is not only the flow channels that matter, but also how far the proppant is transported within a given fracture or fracture network. Geomechanical and flow analysis provide tailored engineering design to optimize perforation design, fluid pulse design, proppant design, and BHP design.

Embodiments of the invention relate to methods of optimized proppant placement in a subterranean formation, comprising the steps of (a) obtaining formation, proppant, fracturing fluid, site and well properties and characteristics in a data input module; (b) selecting candidates based on hydraulic fracture geometry modeling in a candidate selection module; (c) generating response surfaces for different proppant pillar configurations in the candidate selection module; (d) testing each selected candidate from step Ⓒ to determine if the candidate satisfies candidate selection criteria; (e) repeating steps (c-d), if the selected candidate fails the test of step (d); (f) forwarding passed candidate onto an advanced flow geomechanical and production analysis module; (g) simulating pillar transport properties using computational fluid dynamics in the advanced flow geomechanical and production analysis module; (h) simulating pillar embedment and fracture closure properties using geomechanics in the advanced flow geomechanical and production analysis module; (i) generating fracturing operational parameters; (j) preforming production and economic analysis on the generated fracturing operational parameters; (k) testing the generated fracturing operational parameters to determine if the generated fracturing operational parameters satisfy fracturing operational parameter criteria; (l) if the generated fracturing operational parameters fail the testing step (k), modifying engineering design parameters and adjusting BHP design, perforation design, and fluid rate and pulse design; (m) repeating steps (g) through (l), until the generated fracturing operational parameters satisfy the fracturing operational parameter criteria and forwarding optimized fracturing operational parameters to an output module and generating a treatment schedule, and (n) transmitting the treatment schedule to a field location for implementation. In certain embodiments, the methods further comprise (o) collecting near real time data during the fracturing implementation and adjusting one, some or all of the optimized fracturing operational parameters. In other embodiments, parameters for the model comprise formation mechanical properties selected from the group consisting of Young's modulus, Poisson's ratio, formation effective stresses, and a combination thereof.

Embodiments of the invention relate to systems for optimized proppant placement in a fracture in a subterranean formation, comprising a fracturing parameter generation subsystem implemented on a digital and/or analog processing unit including an input module, a candidate selection module, an advanced flow geomechanical and production analysis module, an output module and an execution module, where the subsystem is implemented in the methods of set forth herein and generates optimized formation fracturing parameters for the formation to be fractured, and a delivery subsystem that delivers proppant-free fluids and proppant-containing fluids to a formation during formation fracturing according to optimized formation fracturing parameters generated by the fracturing parameter generation subsystem; a control subsystem in communication with the fracturing parameter generation subsystem and the delivery system that delivers the optimized formation fracturing parameters to the delivery subsystem. In certain embodiments, the systems further comprise a sensor subsystem including a plurality of sensors that measure one, some or all of the fracturing operational parameter is real-time or near real time, a parameter adjustment subsystem implement on a digital or analog processing unit that receives that sensor data and modifies or adjusts one, some, or all of the optimized formation fracturing parameters based on the sensor data, where the a sensor subsystem and the parameter adjustment subsystem are in communication with the control subsystem. In certain embodiments, the delivery subsystem comprises a pump. In certain embodiments, the delivery subsystem comprises a mixer. In certain embodiments, the delivery subsystem comprises a blender. In certain embodiments, the blender comprises a programmable optimum density (POD) blender. In certain embodiments, the blender comprises a tub blender. In certain embodiments, the sensors are selected from the group consisting of pressure sensor, seismic sensor, tilt sensor, radioactivity sensor, magnetic sensor and electromagnetic sensor. In certain embodiments, the sensor comprises an array of sensors. In certain embodiments, the sensor comprises a noisy particulate material and a sensor for detecting a detonation, ignition or exothermic reaction of the noisy particulate material. In certain embodiments, the systems further comprises a device for actively transmitting data for locating the position of the transmitting device and the sensor comprises a sensor for receiving the transmitted location data.

Embodiments of the invention relate to methods comprise (a) generating optimized fracturing operational parameters using the method of claim 1, where the optimized fracturing operational parameters are optimized to produce an optimized proppant pillar open channel network in formation fractures, and (b) implementing the optimized fracturing operational parameters to deliver proppant-free fluids and proppant-containing fluids to the fractures. In certain embodiments, the methods further comprise Ⓒ taking real-time or near real-time measurements of one, some or all of the fracturing parameters; (d) modifying or altering one, some or all of the fracturing parameters based on the measurements; and (e) repeating steps (d) through (f) in real-time until the proppant delivery is complete. In other embodiments, the network comprises proppant pillars in the fracture, the method further comprising allowing the fracture to close, monitoring the formation for micro-seismic events, determining a geometry of the fracture according to the micro-seismic events, and updating the initial model according to the geometry of the fracture.

Unlike conventional fracturing methods generally result in proppant packs having high flow resistance and require large amount of proppant and treating fluids, the present invention is based on methods using formation and proppant properties and characteristics to generate optimal fracturing parameters including optimized BHP design, optimized perforation design, optimized fluid delivery design, and optimized proppant design to achieve optimal proppant placement and optimal proppant pillar design within the fractures forming highly conductive fractures.

The systems and methods of this invention have a number of benefits improved completion performance including the creation of high conductivity/permeability distribution in fractures, better stimulation fluid recovery, increased effective fracture lengths, lowers pressure drop in fractures, and reduced risk of screen-outs. These improvements result in reduced completion cost and lower material requirements calculated to be about 25% to about 45% less proppants and about 25% less fluid. The systems and methods are also calculated to result in reservoir simulations that indicate about a 20% to about a 30% increase in production compared to conventional methods. In certain embodiments, the reduction in proppant use is about 25%; in other embodiments, the reduction in proppant use is about 30%; in other embodiments, the reduction in proppant use is about 35%; in other embodiments, the reduction in proppant use is about 40%; and in other embodiments, the reduction in proppant use is about 45%. In certain embodiments, the reduction in fluid use is about 15%; in other embodiments, the reduction in fluid use is about 20%, and in other embodiments, the reduction in fluid use is about 25%. The systems and methods of this invention find application in oil, gas and condensate rich wells, cased hole wells, open hole wells, vertical and horizontal wells, carbonate, sandstone, tight gas sand (silts), shale wells. The systems and methods of this invention also require the use of rheological/viscous fluids—proppant-free and proppant-containing.

The systems and methods of this invention are designed to have the following performance specifications: (a) high conductivity fractures having discrete proppant conglomerates (pillars), spaced at an optimum distance from each other, higher stress resistance than partial monolayers, agglomerated proppant pillars harder to crush or embed which helps to hold the formation open, pillar height also much greater than monolayer proppant placement. The term optimal distance is a distance between proppant island sufficient to optimize the conductivity of fluid through the proppant island in the fractures.

The systems and methods of this invention combined unique candidate selection and design processes including geomechanical & flow modeling coupling fluids including aggregating compositions of this invention and optimized process control for high quality execution of fracturing operations.

The systems and methods of this invention include modules for obtaining formation and proppant properties, selecting candidate, generating flow geomechanics models and engineering designs to produce optimized BHP designs, optimized perforation designs, optimized fluid pulse designs, and optimize proppant design based on the formation and proppant properties to obtain optimal fracturing parameters that may be used on site to control fracturing equipment. The systems and methods may include near real time feedback from the fracturing operation to modify the optimal parameters to further improve proppant placement and configuration within the fractures.

The design aspects of the systems and methods include effective candidate selection and treatment design using a modeling workflow based on coupling flow modeling to optimize pillar design, minimize embedment/crushing and maximize production. Candidate selection is based on known characteristics of formation compositions. Advanced analysis involves candidate selection including in-depth basin and formation understanding prior to fracturing, geomechanical models to assess candidates viability, brittleness vs ductility of formation, embedment & crushing potential of proppant, and BHP. From this data, the systems and methods generate response surfaces which helps choose the right methodology and produce successful fracturing parameters. The advanced analysis permits pillar configuration optimization by coupling flow and geomechanical models to optimize proppant & fluid volume(s), perforation design, pillar configuration, pulse frequency, pulse composition, pulse flow rate, and other fracturing parameters.

Geomechanics and flow modeling have shown that pillars are most effective (i.e., fracture is more conductive) when rates are relatively low, pulse frequencies are intermediate, and perforations are dense, equally spaced and cover longer length(s). Reservoir simulations based on calculated fracture conductivity maps show an 20-30% increase in production relative to conventional fracturing methods. The unique coupling of geomechanical & flow models facilitate optimized engineering design of pillar fractures based on response surfaces serve as a pre-screening/design tool to produced optimized formation candidate selection, proppant selection, perforation selection, and draw down/BHP for improved fracturing proppant configuration and high conductivity fractures. Candidate selection process is a key aspect in successful implementation of the pillar fracturing technology of this invention. The present system and methods include a number of competitive advantage including unique zeta potential altering chemicals for agglomeration and stabilizing agglomerated pillars compared to bio-degradable (fibers, glue, etc.) material, which can lead to pillar instability, stable long-life proppant pillars, improved proppant distribution, increased SRV based on fluid systems that lead to better long term production, sustained higher production rates compared to previous channel fracturing technique, unique engineering design workflow via geomechanics & flow coupling and candidate screening analysis.

The inventors have found that using both chemistry and pumping technique advanced pillar type fracturing structures may be produced in the formation. This advanced pillar formation permits an optimum spacing between each proppant island or pillar and permits maximization of fluid flow from the well because the advanced pillar formation increases conductivity. Effective fracture length(s) can increase due to proppant pulsing, which further contributes to cumulative production.

The present invention achieves optimal fracturing operations for optimal proppant placement within fractures using calculated optimal bottom hole pressure BHP design, perforation design, fluid pulse design and proppant design using an automated procedures and systems based on formation properties and characteristics and proppant properties and characteristics, where the optimal fracturing operations include optimal fracturing design parameters. The automated procedures and systems may also include near real-time feedback based on measuring fracture geometry as the fracture treatment progresses to update the fracturing design parameters to improve proppant placement and configuration within the fractures. The idealized, predictive models of proppant placement are pre-determined in an iterative methodology to produce optimal fracturing design parameters, which may be adjusted during the fracture operation to further improve proppant placement and fracturing conductivity. The invention thus succeeds more often and to a greater extent to improve the conductivity of the fracture for the flow of formation fluids from production wells or the flow of fluids into injection wells.

Embodiment of the on-site fracturing systems to optimize proppant placement within fractures and to optimize fracture conductivity in a subterranean formation include a delivery subsystem for delivering proppant and treatment fluids to the formation during fracturing, sensors for measuring fracturing properties in near real time, and a computer or digital processing unit in communication with the sensors. The computer includes software tools for near real-time modification of optimal fracturing parameters generated by the fracturing optimization systems of this invention to further improve proppant placement, proppant configuration, and fracture conductivity. The modified parameters are then communicated by the computer via a control link to the delivery system for delivery of the proppant and treatment fluids according the modified optimal parameters.

In certain embodiments, the delivery system may include pumps, mixers, blenders, or the like. In other embodiments, the blender may include a programmable optimum density (POD) blender, a tub blender, or the like or a combination thereof.

In other embodiment, the sensors may include a pressure sensor, seismic sensor, tilt sensor, radioactivity sensor, magnetic sensor, electromagnetic sensor, and the like or a combination thereof. In other embodiments, the fracturing system includes an array of sensors.

In other embodiments, the delivery system may include position transmitters associated with the sensors and receivers in communication with the computer for receiving data from the transmitters.

Embodiments of the methods of this invention include the steps of: (a) obtaining formation and proppant properties and characteristics, (b) producing optimal fracturing parameters including optimal proppant design, optimal BHP design, optimal fluid pulse design and optimal perforation design, and ⓒ performing the fracturing according to the optimal fracturing parameters.

In other embodiments, the methods may also includes the further steps of (d) performing the fracturing operation according the optimal fracturing parameters; (d) obtaining fracture date in near real time during fracturing; (f) modifying one or more model optimal fracturing parameters based on the data; and (g) repeating steps (e) through (f) to complete the fracturing operation.

In all of these embodiments, the proppant is delivered to the formation according to the optimized pulse sequence design using the optimized perforation design, optimized BHP design, and optimized proppant design, where the optimized pulse sequence is calculated to generate the optimal proppant placement sequence so that high conductivity fractures of this invention are produced having alternating elongated proppant pillars and elongated flow paths.

The use of the zeta altering chemistry and zeta altering coating strengthening chemistry and data concerning proppant treated with these chemistries that permits the methodology to select the optimize proppant design for a give formation to ensure that channels/pillars and flow paths are efficiently formed and have greater strength to withstand erosion and proppant migration as compared to the other technologies previously disclosed. Prior art solutions to proppant placement design involved the use of dissolvable fibers which help with channel/pillar formation but it has been observed that once the wells are brought back on production with even minimal flux rate the channels/pillars lose their strength once the fibers have been dissolved and the channels collapse and the pillars erode leaving a conventional frac pac that will likely exhibit proppant migration and flow back.

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used any other application where increased particle aggregation potentials are desirable or where decreased absolute values of the zeta potential of the particles, which is a measure of aggregation propensity. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating. That is to say, that the coated particles tend to prefer like compositions, which increase their self-aggregation propensity and increase their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

The present methods are designed to create and place (a) proppant pillars, clusters, or islands, (b) regions of proppant pillars, clusters, or islands, ⓒ flow pathways or channels, or (d) regions of flow pathways or channels in the fractures have the advantages of producing (a) longer (and/or higher) fractures with the same mass of proppant, and (b) more effective fracture clean-up of fracturing fluids from the fractures due to a greater volume of the fracture being flow pathways based on the optimized fracturing operational parameters prior to the commencement of the fracturing operations.

In certain embodiments, the methods the fracturing operation may include a third stage or "tail-in stage" following the second state involving continuous introduction of an amount of proppant. If employed, the tail-in stage of the fracturing operation resembles a conventional fracturing treatment, in which a continuous bed of well-sorted conventional proppant is placed in the fracture relatively near to the wellbore. In certain embodiments, the tail-in stage is distinguished from the second stage by the continuous placement of a well-sorted proppant, that is, a proppant with an essentially uniform size of particles. The proppant strength in the tail-in stage is sufficient to prevent proppant crushing (crumbling), when it is subjected to the stresses that occur upon fracture closure. The role of the proppant at this stage is to prevent fracture closure and, therefore, to provide good fracture conductivity in proximity to the wellbore. The proppants used in this third stage should have properties similar to conventional proppants.

Compositions

The invention broadly relates to a composition including a zeta altering composition. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating may interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces. Additionally, the coating may be stabilized or strengthened by a subsequence treatment with a coating crosslinking composition. Thus, the a wide variety of proppant type may be placed and or in situ produced in a fracture through selective pumping of different proppant and fluid types. For example, the proppant composition in the fluids may include one, some or all of the following proppant types untreated proppant, zeta potential altered treated proppant, crosslinked zeta potential altered proppant, where the selection is based on the modeling methodology of this invention with the properties of these proppant types being used an input to the generation of optimized fracturing operational parameters. Moreover, the sequences of fluid slugs may also include varying amount of either a zeta potential altering composition of this invention or a coating crosslinking composition of this invention. In this way, the treated and crosslink treated proppants are made in situ.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to methods for treating metal oxide-containing surfaces including the step of contacting the metal oxide-containing material with a composition of this invention. The composition forms a partial and/or complete coating on the material surfaces altering the properties of the material and/or surfaces thereof so that the materials and/or surfaces thereof are capable to interacting with similarly treated materials to form agglomerated and/or aggregated structures. The treating may be designed to partially or completely coat continuous metal oxide containing surfaces and/or the surfaces of metal oxide containing particles. If both are treated, then the particles cannot only self-aggregate, but the particles may also aggregate, agglomerate and/or cling to the coated continuous surfaces. The compositions may be used in fracturing fluids, frac pack applications, sand pack applications, sand control applications, or any other downhole application. Moreover, structures, screens or filters coated with the compositions of this invention may be used to attract and remove fines that have been modified with the compositions of this invention.

Method for Fracturing and/or Propping

The present invention broadly relates to methods for fracturing a formation including the step of pumping a fracturing fluid including a composition of this invention into a producing formation at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepared step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deform-ability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating. In addition, the inventors believe that the altered aggregation propensity of the particles will increase proppant particle density in regions of the formation most susceptible to proppant penetration resulting in an enhance degree of formation propping.

Compositional Ranges Useful in the Invention

Fracturing fluids are all based on 100 wt. % of a base fluid and various wt. % of the other components so that the final fracturing fluid weight percentages may sum to greater than 100%, thus, the other components represent relative amounts. These formulations are therefore similar to rubber compositions which are expressed relative amounts based on 100 parts rubber. With this in mind, the fracturing fluids may include 100 wt. % of a base fluid and varying amounts of: an aggregating composition, an aggregating coating cross-linking composition, a viscosifying composition, a proppant composition, and other additives. Table 1 tabulations permitted proppant-free fracturing fluid compositions in ranges of components.

TABLE 1

Proppant-Free Fluids -All Amount in Weight Percentages

| Type | BF[a] | AC[b] | ACC[c] | VC[d] | OC[e] | PC[f] |
|---|---|---|---|---|---|---|
| 1 | 100 | 0 | 0 | 0 | 0 | 0 |
| 2 | 100 | 0.01-20 (0.01-10) {0.01-5} | 0 | 0 | 0 | 0 |
| 3 | 100 | 0 | 0.01-20 (0.01-10) {0.01-5} | 0 | 0 | 0 |
| 4 | 100 | 0 | 0 | 0.01-20 (0.01-10) {0.01-5} | 0 | 0 |
| 5 | 100 | 0 | 0 | 0 | 0.01-20 (0.01-10) {0.01-5} | 0 |
| 6 | 100 | 0.01-20 (0.01-10) {0.01-5} | 0.01-20 (0.01-10) {0.01-5} | 0 | 0 | 0 |
| 7 | 100 | 0.01-20 (0.01-10) {0.01-5} | 0 | 0.01-20 (0.01-10) {0.01-5} | 0 | 0 |
| 8 | 100 | 0.01-20 (0.01-10) {0.01-5} | 0 | 0 | 0.01-20 (0.01-10) {0.01-5} | 0 |
| 9 | 100 | 0 | 0.01-20 (0.01-10) {0.01-5} | 0.01-20 (0.01-10) {0.01-5} | 0 | 0 |
| 10 | 100 | 0 | 0.01-20 (0.01-10) {0.01-5} | 0 | 0.01-20 (0.01-10) {0.01-5} | 0 |
| 11 | 100 | 0 | 0 | 0.01-20 (0.01-10) {0.01-5} | 0.01-20 (0.01-10) {0.01-5} | 0 |
| 12 | 100 | 0.01-20 (0.01-10) {0.01-5} | 0.01-20 (0.01-10) {0.01-5} | 0.01-20 (0.01-10) {0.01-5} | 0 | 0 |
| 13 | 100 | 0.01-20 (0.01-10) {0.01-5} | 0.01-20 (0.01-10) {0.01-5} | 0 | 0.01-20 (0.01-10) {0.01-5} | 0 |
| 14 | 100 | 0.01-20 (0.01-10) {0.01-5} | 0 | 0.01-20 (0.01-10) {0.01-5} | 0.01-20 (0.01-10) {0.01-5} | 0 |
| 15 | 100 | 0 | 0.01-20 (0.01-10) {0.01-5} | 0.01-20 (0.01-10) {0.01-5} | 0.01-20 (0.01-10) {0.01-5} | 0 |
| 16 | 100 | 0.01-20 (0.01-10) {0.01-5} | 0.01-20 (0.01-10) {0.01-5} | 0.01-20 (0.01-10) {0.01-5} | 0.01-20 (0.01-10) {0.01-5} | 0 |

[a]base fluid,
[b]aggregating composition,
[c]coating crosslinking composition,
[d]viscosifying composition,
[e]other additives, and
[f]proppant composition
-( ) narrower range, { } still narrower range, (( )) still narrower range Table 2 tabulates permitted proppant-containing fracturing fluids in ranges of components.

TABLE 2

Proppant Containing Fluids -All Amount in Weight Percentages

| Type | BF[a] | AC[b] | ACC[c] | VC[d] | OC[e] | PC[f] |
|---|---|---|---|---|---|---|
| 1 | 100 | 0 | 0 | 0 | 0 | 0.1-400 (0.1-300) {0.1-200} ((.01-100)) |
| 2 | 100 | 0.01-20 (0.01-10) {0.01-5} | 0 | 0 | 0 | 0.1-400 (0.1-300) {0.1-200} ((.01-100)) |
| 3 | 100 | 0 | 0.01-20 (0.01-10) {0.01-5} | 0 | 0 | 0.1-400 (0.1-300) {0.1-200} ((.01-100)) |
| 4 | 100 | 0 | 0 | 0.01-20 (0.01-10) {0.01-5} | 0 | 0.1-400 (0.1-300) {0.1-200} ((.01-100)) |
| 5 | 100 | 0 | 0 | 0 | 0.01-20 (0.01-10) {0.01-5} | 0.1-400 (0.1-300) {0.1-200} ((.01-100)) |

TABLE 2-continued

Proppant Containing Fluids -All Amount in Weight Percentages

| Type | BF[a] | AC[b] | ACC[c] | VC[d] | OC[e] | PC[f] |
|---|---|---|---|---|---|---|
| 6 | 100 | 0.01-20<br>(0.01-10)<br>{0.01-5} | 0.01-20<br>(0.01-10)<br>{0.01-5} | 0 | 0 | 0.1-400<br>(0.1-300)<br>{0.1-200}<br>((.01-100)) |
| 7 | 100 | 0.01-20<br>(0.01-10)<br>{0.01-5} | 0 | 0.01-20<br>(0.01-10)<br>{0.01-5} | 0 | 0.1-400<br>(0.1-300)<br>{0.1-200}<br>((.01-100)) |
| 8 | 100 | 0.01-20<br>(0.01-10)<br>{0.01-5} | 0 | 0 | 0.01-20<br>(0.01-10)<br>{0.01-5} | 0.1-400<br>(0.1-300)<br>{0.1-200}<br>((.01-100)) |
| 9 | 100 | 0 | 0.01-20<br>(0.01-10)<br>{0.01-5} | 0.01-20<br>(0.01-10)<br>{0.01-5} | 0 | 0.1-400<br>(0.1-300)<br>{0.1-200}<br>((.01-100)) |
| 10 | 100 | 0 | 0.01-20<br>(0.01-10)<br>{0.01-5} | 0 | 0.01-20<br>(0.01-10)<br>{0.01-5} | 0.1-400<br>(0.1-300)<br>{0.1-200}<br>((.01-100)) |
| 11 | 100 | 0 | 0 | 0.01-20<br>(0.01-10)<br>{0.01-5} | 0.1-20<br>(0.1-10)<br>{0.01-5} | 0.1-400<br>(0.1-300)<br>{0.1-200}<br>((.01-100)) |
| 12 | 100 | 0.01-20<br>(0.01-10)<br>{0.01-5} | 0.01-20<br>(0.01-10)<br>{0.01-5} | 0.01-20<br>(0.01-10)<br>{0.01-5} | 0 | 0.1-400<br>(0.1-300)<br>{0.1-200}<br>((.01-100)) |
| 13 | 100 | 0.01-20<br>(0.01-10)<br>{0.01-5} | 0.01-20<br>(0.01-10)<br>{0.01-5} | 0 | 0.01-20<br>(0.01-10)<br>{0.01-5} | 0.1-400<br>(0.1-300)<br>{0.1-200}<br>((.01-100)) |
| 14 | 100 | 0.01-20<br>(0.01-10)<br>{0.01-5} | 0 | 0.01-20<br>(0.01-10)<br>{0.01-5} | 0.01-20<br>(0.01-10)<br>{0.01-5} | 0.1-400<br>(0.1-300)<br>{0.1-200}<br>((.01-100)) |
| 15 | 100 | 0 | 0.01-20<br>(0.01-10)<br>{0.01-5} | 0.01-20<br>(0.01-10)<br>{0.01-5} | 0.01-20<br>(0.01-10)<br>{0.01-5} | 0.1-400<br>(0.1-300)<br>{0.1-200}<br>((.01-100)) |
| 16 | 100 | 0.01-20<br>(0.01-10)<br>{0.01-5} | 0.01-20<br>(0.01-10)<br>{0.01-5} | 0.01-20<br>(0.01-10)<br>{0.01-5} | 0.01-20<br>(0.01-10)<br>{0.01-5} | 0.1-400<br>(0.1-300)<br>{0.1-200}<br>((.01-100)) |

[a]base fluid,
[b]aggregating composition,
[c]coating crosslinking composition,
[d]viscosifying composition,
[e]other additives, and
[f]proppant composition
- ( ) narrower range, { } still narrower range, (( )) still narrower range In certain embodiments, the viscosifying compositions include from about 80 wt. % to about 99 wt. % of one viscosifying agent or a plurality of viscosifying agents and from about 20 wt. % to about 0.1 wt. % of one crosslinking agent or a plurality of crosslinking agents. A list of viscosifying agents and crosslinking agents are set forth in the Suitable Reagents section herein.

In certain embodiments, the aggregating composition may comprise a single aggregating agent or a plurality of aggregating agents in any relative mixture, where the agent and/or mixture selection may be tailored to formation and proppant properties and characteristics.

Figure 16:
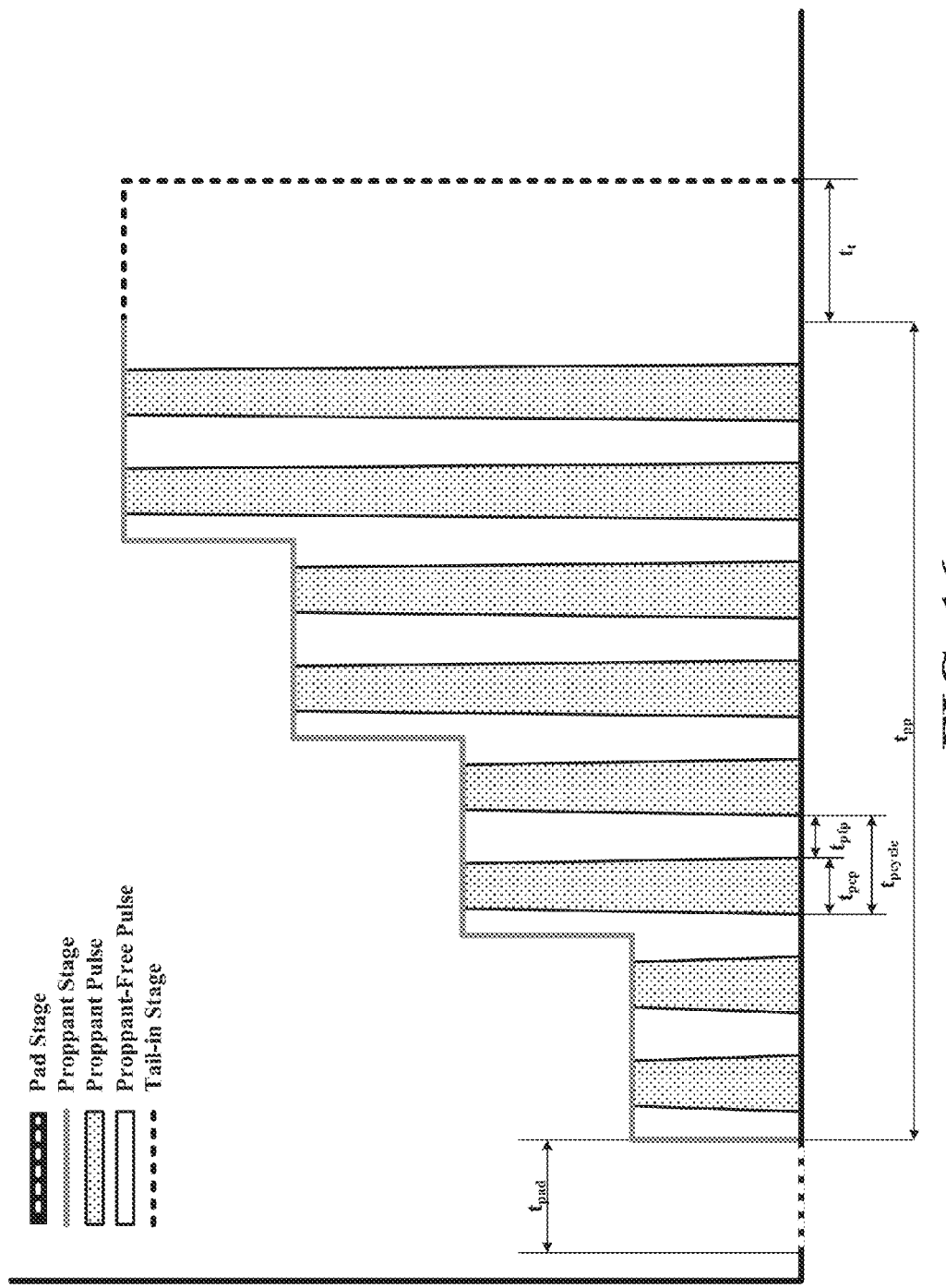
FIG. 16 depicts a typical fracturing operation including a pad stage, a proppant placement stage and a tail in stage.
Figure 17A:
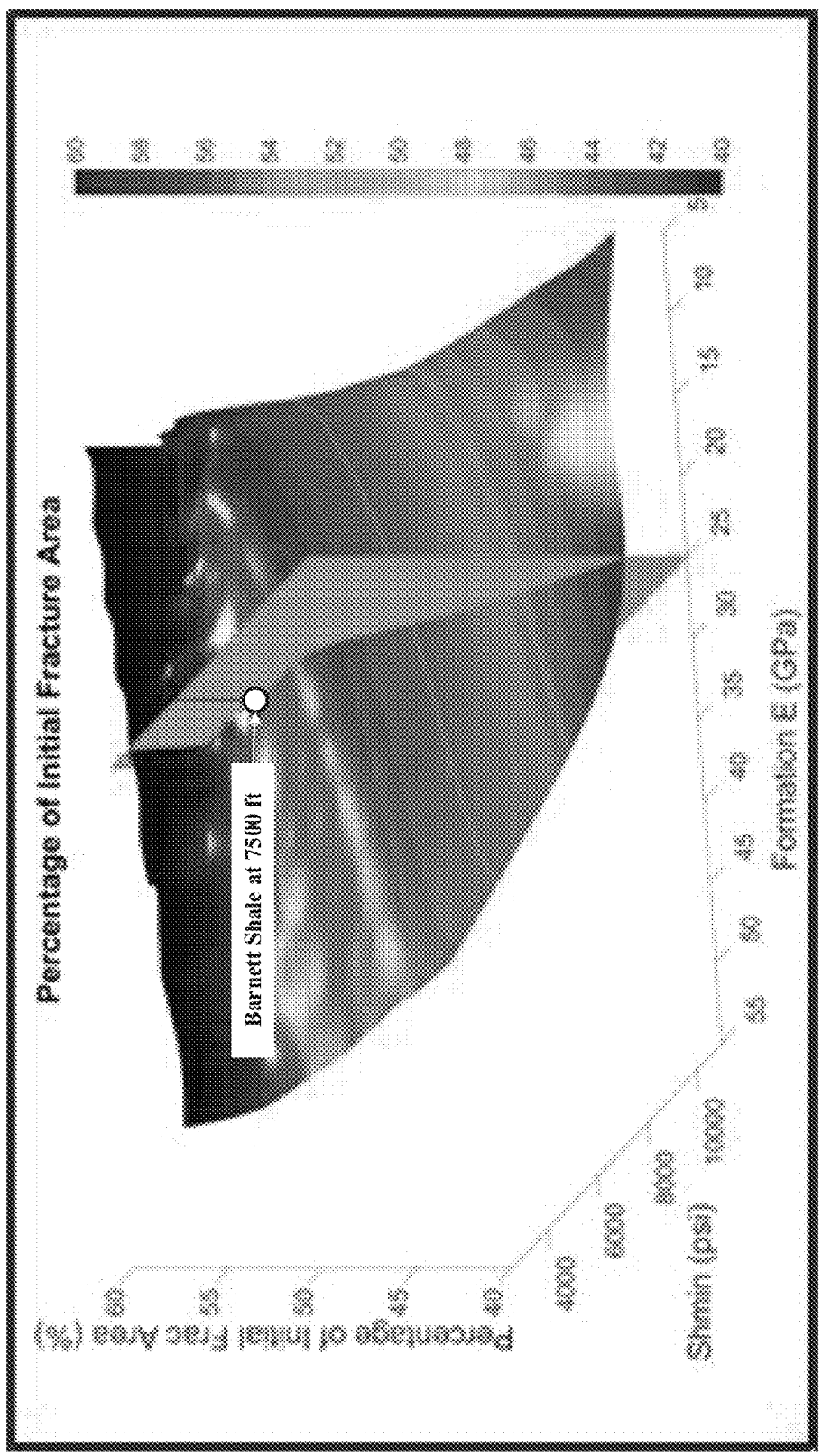
FIGS. 17A-D depict different formation types at varying depths and their corresponding stress state plotted on response surfaces.
Figure 17B:
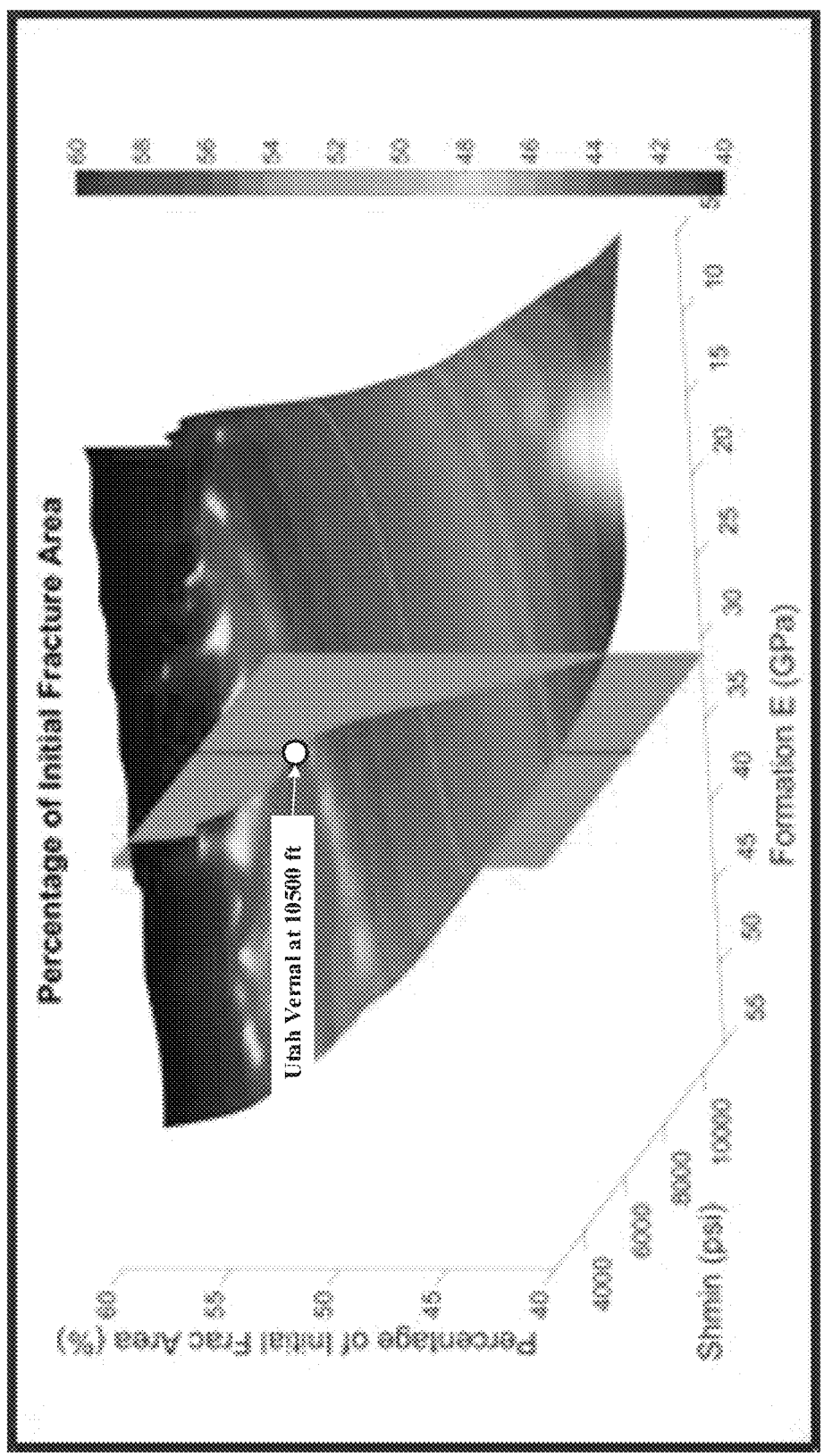
Figure 17C:
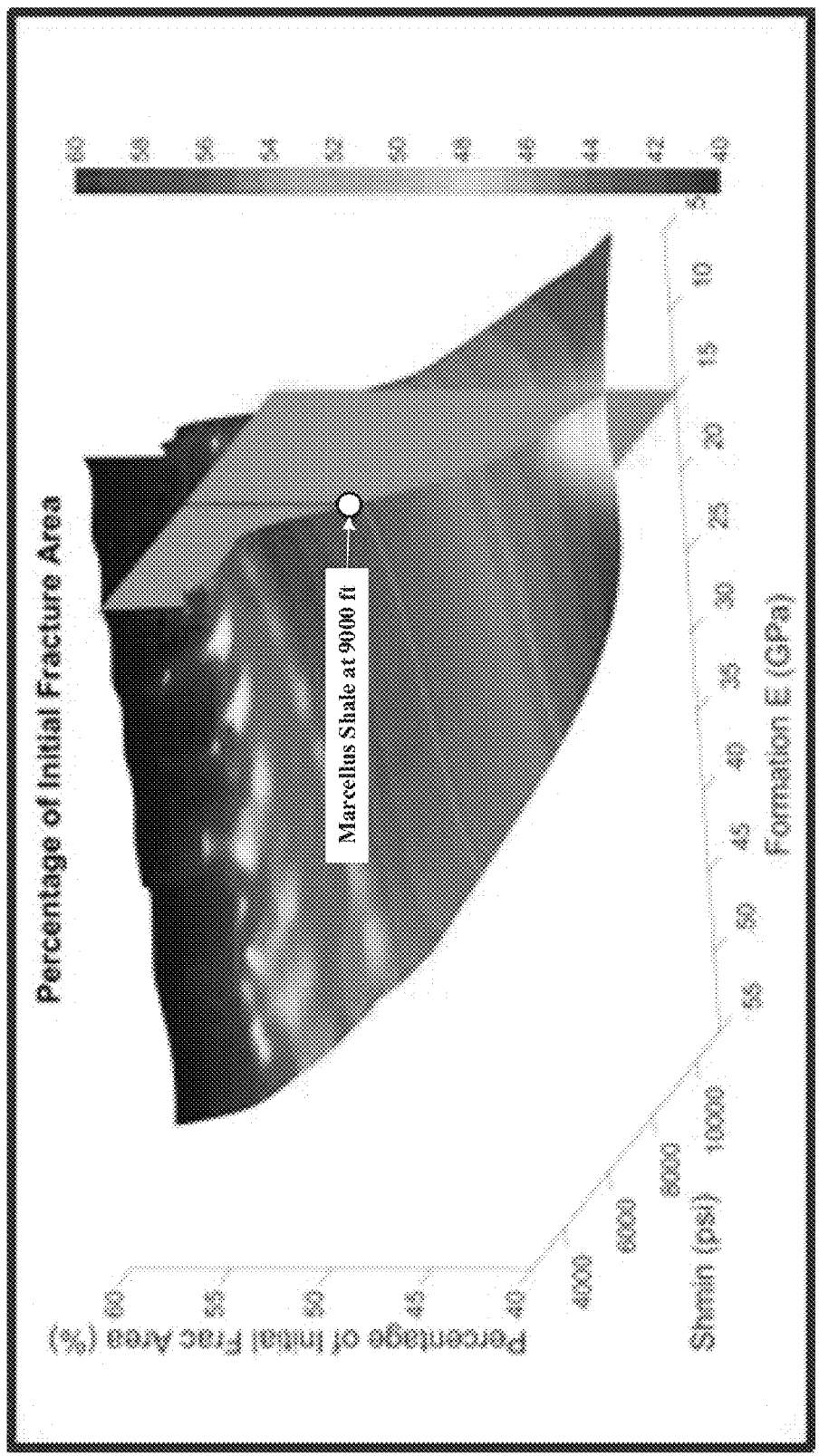
Figure 17D:
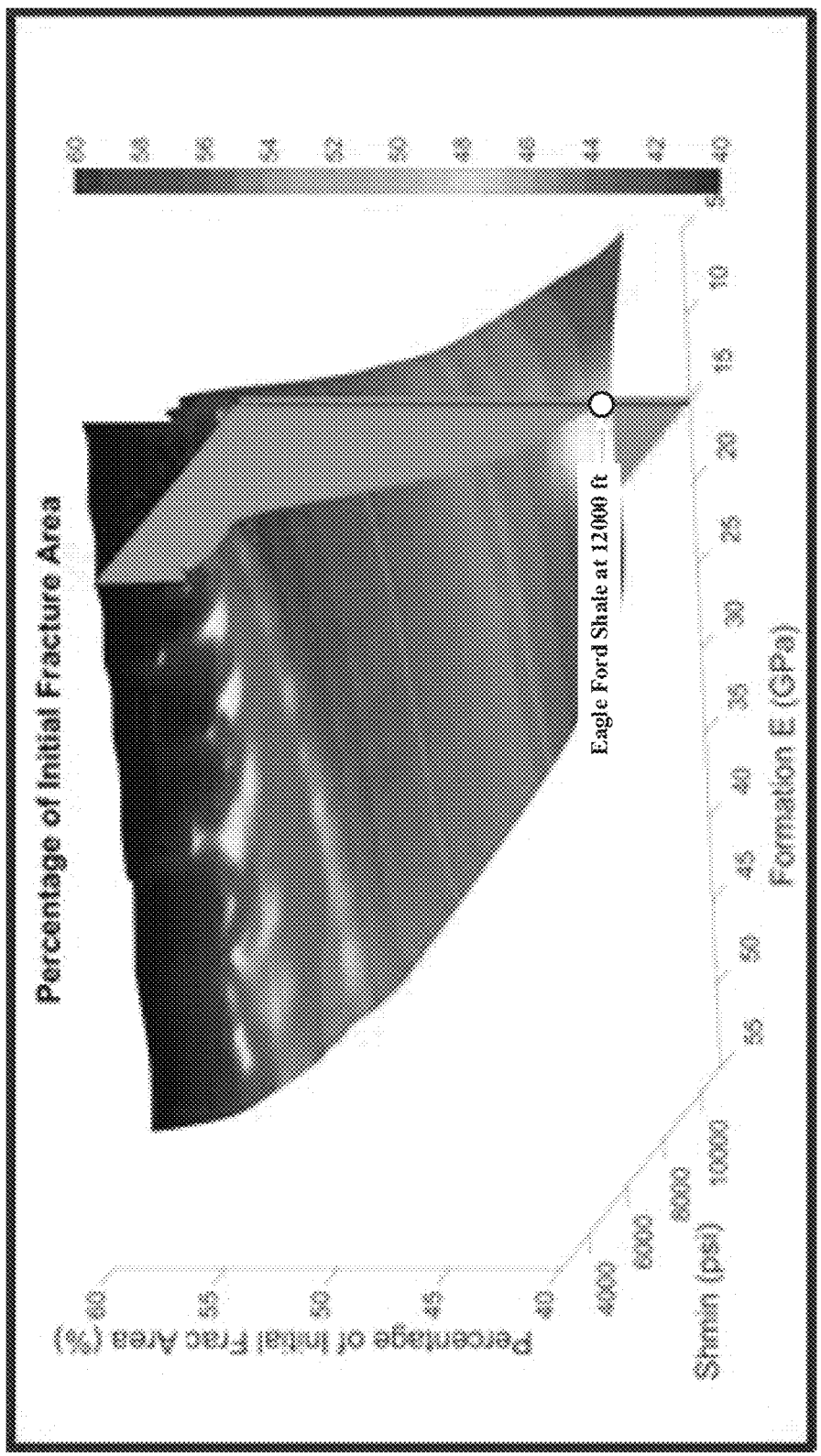

In certain embodiments, the proppant composition of each proppant-containing fracturing fluid may include from 0 wt. % to 100 wt. % of one untreated proppant or a plurality of untreated proppants and from 0 wt. % to 100 wt. % of one treated proppant or a plurality of treated proppants, where the treated proppants comprise untreated proppants treated with one aggregating agent or untreated proppants treated with a plurality of the aggregating agents to form partial or complete aggregating coating on the proppants altering their aggregating propensity from low to maximal aggregating propensity according to the information shown in FIG. 16. It should be recognized that by changing the amount of aggregating composition used or the extend of the aggregating coating on treated proppants, the relative or bulk aggregating propensity per the table of FIG. 16 may be altered to any desired aggregating propensity to permit different proppant pillar or island formation within fractures formed in a formation during formation fracturing.

Suitable Reagents for Use in this Invention

Modeling Software

Suitable commercial tools for numerical implementation includes, without limitation, ANSYS-Mechanical for geomechanics; ANSYS-CFD for flow; CMG for production modeling or similar commercial software tools. The workflow of this invention may operate either on an analytical engine or a numeric engine or a combination thereof.

Processing Units

Suitable digital processing units (DPUs) include, without limitation, any digital processing unit capable of accepting input from a singular or plurality of devices or objects and converting at least some of the input into output designed to select and/or control attributes of one or more of the devices or objects. Exemplary examples of such DPUs include, without limitation, microprocessor, microcontrollers, or the like manufactured by Intel, Motorola, Erricsson, HP, Samsung, Hitachi, NRC, Applied Materials, AMD, Cyrix, Sun Microsystem, Philips, National Semiconductor, Via Electonics, Qualcomm, or any other manufacture of microprocessors or microcontrollers.

Suitable analog processing units (APUs) include, without limitation, any analog processing unit capable of accepting input from a singular or a plurality of devices or objects and converting at least some of the input into output designed to control attributes of one or more of the devices or objects. Such analog devices are available from manufacturers such as Analog Devices Inc.

Base Fluids

The base fluids for use in this invention include, without limitation, any liquid base fluid suitable for use in oil and gas producing wells or injections wells, or mixtures and combinations thereof. Exemplary liquid base fluids include, without limitation, aqueous base fluids, organic base fluids, water-in-oil base fluids, oil-in-water base fluids, any other base fluids used in fracturing fluids, viscosified versions thereof, or mixtures and combinations thereof. Exemplary aqueous base fluids include water, tap water, production water, salt water, brines, or mixtures and combinations thereof. Exemplary brines include, without limitation, sodium chloride brines, potassium chloride brines, calcium chloride brines, magnesium chloride brines, tetramethyl ammonium chloride brines, other chloride brines, phosphate brines, nitrate brines, other salt brines, or mixtures and combinations thereof.

Aqueous Base Fluids

Aqueous base fluids will generally comprise water, consist essentially of water, or consist of water. Water will typically be a major component by weight ($\geq$50 wt. % of the aqueous base fluids. The water may be potable or non-potable. The water may be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added. The aqueous fracturing fluids generally include at least about 80 wt. % of an aqueous base fluid. In other embodiments, the aqueous fracturing fluids including 80 wt. %, 85 wt. %, 90 wt. %, and 95 wt. % of an aqueous base fluid.

Organic Base Fluids

Organic base fluids comprise of a liquid organic carrier, consist essentially of a liquid organic carrier, or consist of a liquid organic carrier or a hydrocarbon base fluid or a hydrocarbon base fluid include a hydrocarbon soluble polymer. The organic fracturing fluids generally include at least about 80 wt. % of an organic base fluid. In other embodiments, the aqueous fracturing fluids including 80 wt. %, 85 wt. %, 90 wt. %, and 95 wt. % of an organic base fluid.

Hydrocarbon Base Fluids

Suitable hydrocarbon base fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5 \times 10^{-6}$ to about $600 \times 10^{-6}$ $m^2/s$ (5 to about 600 centistokes). Exemplary examples of such hydrocarbon fluids include, without limitation, polyalphaolefins, polybutenes, polyolesters, biodiesels, simple low molecular weight fatty esters of vegetable or vegetable oil fractions, simple esters of alcohols such as Exxate from Exxon Chemicals, vegetable oils, animal oils or esters, other essential oil, diesel, diesel having a low or high sulfur content, kerosene, jet-fuel, white oils, mineral oils, mineral seal oils, hydrogenated oil such as PetroCanada HT-40N or IA-35 or similar oils produced by Shell Oil Company, internal olefins (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Linpar, Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include bends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5 \times 10^{-6}$ to about $600 \times 10^{-6}$ $m^2/s$ (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell. Chemical Company, and naphthenic oils sold under the names HydroCal and Calsol by Calumet and hydrogenated oils such as HT-40N and IA-35 from PetroCanada or Shell Oil Company or other similar hydrogenated oils.

Exemplary examples of vegetable oils include, without limitation, castor oils, corn oil, olive oil, sunflower oil, sesame oil, peanut oil, palm oil, palm kernel oil, coconut oil, butter fat, canola oil, rape seed oil, flax seed oil, cottonseed oil, linseed oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Hydrocarbon Soluble Polymers

Suitable polymers for use as anti-settling additives or polymeric suspension agents in this invention include, without limitation, linear polymers, block polymers, graft polymers, star polymers or other multi-armed polymers, which include one or more olefin monomers and/or one or more diene monomers and mixtures or combinations thereof. The term polymer as used herein refers to homo-polymers, co-polymers, polymers including three of more monomers (olefin monomers and/or diene monomers), polymer including oligomeric or polymeric grafts, which can comprise the same or different monomer composition, arms extending form a polymeric center or starring reagent such as tri and tetra valent linking agents or divinylbenzene nodes or the like, and homo-polymers having differing tacticities or microstructures. Exemplary examples are styrene-isoprene copolymers (random or block), triblocked, multi-blocked, styrene-butadiene copolymer (random or block), ethylene-propylene copolymer (random or block), sulphonated polystyrene polymers, alkyl methacrylate polymers, vinyl pyrrolidone polymers, vinyl pyridine, vinyl acetate, or mixtures or combinations thereof.

Suitable olefin monomer include, without limitation, any monounsaturated compound capable of being polymerized into a polymer or mixtures or combinations thereof. Exemplary examples include ethylene, propylene, butylene, and other alpha olefins having between about 5 and about 20 carbon atoms and sufficient hydrogens to satisfy the valency requirement, where one or more carbon atoms can be replaced by B, N, O, P, S, Ge or the like and one or more of the hydrogen atoms can be replaced by F, Cl, Br, I, OR, SR, COOR, CHO, C(O)R, C(O)NH2, C(O)NHR, C(O)NRR', or other similar monovalent groups, polymerizable internal mono-olefinic monomers or mixtures or combinations thereof, where R and R' are the same or different and are carbyl group having between about 1 to about 16 carbon atoms and where one or more of the carbon atoms and hydrogen atoms can be replaced as set forth immediately above.

Suitable diene monomer include, without limitation, any doubly unsaturated compound capable of being polymerized into a polymer or mixtures or combinations thereof. Exemplary examples include 1,3-butadiene, isoprene, 2,3-dimethyl butadiene, or other polymerizable diene monomers.

The inventors have found that Infineum SV150, an isoprene-styrene di-block and starred polymer, offers superior permanent shear stability and thickening efficiency due to its micelle forming nature.

Suitable hydrocarbon base fuels include, without limitation, t and mineral oil or diesel oil before adding organophillic clays, polar activator, the additive to be suspended (Guar or Deriatized Guar, e.g. CMHPG) and the dispersing surfactant in concentrations between 0.10-5.0% w/w.

Viscoelastic Base Fluids

Viscoelastic base fluids comprise a liquid carrier including viscoelastic surfactant (VAS) or a VAS gel.

The surfactant can generally be any surfactant. The surfactant is preferably viscoelastic. The surfactant is preferably anionic. The anionic surfactant can be an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms.

The anionic surfactant can have the chemical formula $R_1CON(R_2)CH_2X$, wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The surfactant can generally be present in any weight percent concentration. Presently preferred concentrations of surfactant are about 0.1% to about 15% by weight. A presently more preferred concentration is about 0.5% to about 6% by weight. Laboratory procedures can be employed to determine the optimum concentrations for any particular situation.

The amphoteric polymer can generally be any amphoteric polymer. The amphoteric polymer can be a nonionic water-soluble homopolysaccharide or an anionic water-soluble polysaccharide. The polymer can generally have any molecular weight, and is presently preferred to have a molecular weight of at least about 500,000.

The polymer can be a hydrolyzed polyacrylamide polymer. The polymer can be a scleroglucan, a modified scleroglucan, or a scleroglucan modified by contact with glyoxal or glutaraldehyde. The scleroglucans are nonionic water-soluble homopolysaccharides, or water-soluble anionic polysaccharides, having molecular weights in excess of about 500,000, the molecules of which consist of a main straight chain formed of D-glucose units which are bonded by β-1,3-bonds and one in three of which is bonded to a side D-glucose unit by means of a β-1,6 bond. These polysaccharides can be obtained by any of the known methods in the art, such as fermentation of a medium based on sugar and inorganic salts under the action of a microorganism of *Sclerotium* type A. A more complete description of such scleroglucans and their preparations may be found, for example, in U.S. Pat. Nos. 3,301,848 and 4,561,985, incorporated herein by reference. In aqueous solutions, the scleroglucan chains are combined in a triple helix, which explains the rigidity of the biopolymer, and consequently its features of high viscosity-increasing power and resistance to shearing stress.

It is possible to use, as source of scleroglucan, the scleroglucan which is isolated from a fermentation medium, the product being in the form of a powder or of a more or less concentrated solution in an aqueous and/or aqueous-alcoholic solvent. Scleroglucans customarily used in applications in the petroleum field are also preferred according to the present invention, such as those which are white powders obtained by alcoholic precipitation of a fermentation broth in order to remove residues of the producing organism (mycelium, for example). Additionally, it is possible to use the liquid reaction mixture resulting from the fermentation and containing the scleroglucan in solution. According to the present invention, further suitable scleroglucans are the modified scleroglucan which result from the treatment of scleroglucans with a dialdehyde reagent (glyoxal, glutaraldehyde, and the like), as well as those described in U.S. Pat. No. 6,162,449, incorporated herein by reference, (b-1,3-scleroglucans with a cross-linked 3-dimensional structure produced by *Sclerotium rolfsii*).

The polymer can be Aquatrol V (a synthetic compound which reduces water production problems in well production; described in U.S. Pat. No. 5,465,792, incorporated herein by reference), AquaCon (a moderate molecular weight hydrophilic terpolymer based on polyacrylamide capable of binding to formation surfaces to enhance hydrocarbon production; described in U.S. Pat. No. 6,228,812, incorporated herein by reference) and Aquatrol C (an amphoteric polymeric material). Aquatrol V, Aquatrol C, and AquaCon are commercially available from BJ Services Company.

The polymer can be a terpolymer synthesized from an anionic monomer, a cationic monomer, and a neutral monomer. The monomers used preferably have similar reactivities so that the resultant amphoteric polymeric material has a random distribution of monomers. The anionic monomer can generally be any anionic monomer. Presently preferred anionic monomers include acrylic acid, methacrylic acid, 2-acrylamide-2-methylpropane sulfonic acid, and maleic anhydride. The cationic monomer can generally be any cationic monomer. Presently preferred cationic monomers include dimethyl-diallyl ammonium chloride, dimethyl-amino-ethyl methacrylate, and allyltrimethyl ammonium chloride. The neutral monomer can generally be any neutral monomer. Presently preferred neutral monomers include butadiene, N-vinyl-2-pyrrolidone, methyl vinyl ether, methyl acrylate, maleic anhydride, styrene, vinyl acetate, acrylamide, methylmethacrylate, and acrylonitrile. The polymer can be a terpolymer synthesized from acrylic acid (AA), dimethyl diallyl ammonium chloride (DMDAC) or diallyl dimethyl ammonium chloride (DADMAC), and acrylamide (AM). The ratio of monomers in the terpolymer can generally be any ratio. A presently preferred ratio is about 1:1:1.

Another presently preferred amphoteric polymeric material (hereinafter "polymer 1") includes approximately 30% polymerized AA, 40% polymerized AM, and 10% polymerized DMDAC or DADMAC with approximately 20% free residual DMDAC or DADMAC which is not polymerized due to lower relative reactivity of the DMDAC or DADMAC monomer.

The fluid can further comprise one or more additives. The fluid can further comprise a base. The fluid can further comprise a salt. The fluid can further comprise a buffer. The fluid can further comprise a relative permeability modifier. The fluid can further comprise methylethylamine, monoethanolamine, triethylamine, triethanolamine, sodium hydroxide, potassium hydroxide, potassium carbonate, sodium chloride, potassium chloride, potassium fluoride, $KH_2PO_4$, or $K_2HPO_4$. The fluid can further comprise a proppant. Conventional proppants will be familiar to those skilled in the art and include sand, resin coated sand sintered bauxite and similar materials. The proppant can be suspended in the fluid.

Sarcosine (N-methylglycine) is a naturally occurring amino acid found in starfish, sea urchins and crustaceans. It can be purchased from a variety of commercial sources, or alternately produced by a number of synthetic routes known in the art including thermal decomposition of caffeine in the presence of barium hydroxide (Arch. Pharm. 232: 601, 1894); (Bull. Chem. Soc. Japan, 39: 2535, 1966); and numerous others (T. Shirai in Synthetic Production and Utilization of Amino Acids; T. Kaneko, et al., Eds.; Wiley, New York: pp. 184-186, 1974). Sodium sarcosinate is manufactured commercially from formaldehyde, sodium cyanide and methyl amine (U.S. Pat. Nos. 2,720,540 and 3,009,954). The preferred sarcosinate are the condensation products of sodium sarcosinate and a fatty acid chloride. The fatty acid chloride is reacted with sodium sarcosinate under carefully controlled alkaline conditions (i.e., the Schotten-Bauman reaction) to produce the fatty sarcosinate sodium salt which is water soluble. Upon acidification, the fatty sarcosine acid, which is also water insoluble, is formed and may be isolated from the reaction medium. The acyl sarcosines may be neutralized with bases such as the salts of sodium, potassium, ammonia, or organic bases such as triethanolamine in order to produce aqueous solutions.

Another surfactant useful in the fluids of this invention are an anionic sarcosinate surfactant available commercially from BJ Services Company as "M-Aquatrol" (MA). The MA-1 sarcosinate is a viscous liquid surfactant with at least 94% oleoyl sarcosine. For hydraulic fracturing, a sufficient quantity of the sarcosinate is present in aqueous solution to provide sufficient viscosity to suspend proppant during placement. The surfactant is preferably present at about 0.5% to about 10% by weight, most preferably at about 0.5% to about 6% by weight, based upon the weight of the total fluid.

Viscosifying Agents

The hydratable polymer may be a water soluble polysaccharide, such as galactomannan, cellulose, or derivatives thereof.

Suitable hydratable polymers that may be used in embodiments of the invention include any of the hydratable polysaccharides which are capable of forming a gel in the presence of a crosslinking agent. For instance, suitable hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred gelling agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art.

The hydratable polymer may be present in the fluid in concentrations ranging from about 0.10% to about 5.0% by weight of the aqueous fluid. In certain embodiments, the range for the hydratable polymer is about 0.20% to about 0.80% by weight.

Viscosifying Agent Crosslinking Agents

The crosslinking agent may be a borate, titanate, or zirconium-containing compound. For example, the crosslinking agent can be sodium borate×$H_2O$ (varying waters of hydration), boric acid, borate crosslinkers (a mixture of a titanate constituent, preferably an organotitanate constituent, with a boron constituent. The organotitanate constituent can be TYZOR® titanium chelate esters from E.I du Pont de Nemours & Company. The organotitanate constituent can be a mixture of a first organotitanate compound having a lactate base and a second organotitanate compound having triethanolamine base. The boron constituent can be selected from the group consisting of boric acid, sodium tetraborate, and mixtures thereof. These are described in U.S. Pat. No. 4,514,309, incorporated herein by reference, borate based ores such as ulexite and colemanite, Ti(IV) acetylacetonate, Ti(IV) triethanolamine, Zr lactate, Zr triethanolamine, Zr lactate-triethanolamine, or Zr lactate-triethanolamine-triisopropanolamine. In some embodiments, the well treatment fluid composition may further comprise a proppant.

A suitable crosslinking agent can be any compound that increases the viscosity of the fluid by chemical crosslinking, physical crosslinking, or any other mechanisms. For example, the gellation of a hydratable polymer can be achieved by crosslinking the polymer with metal ions including boron, zirconium, and titanium containing compounds, or mixtures thereof. One class of suitable crosslinking agents is organotitanates. Another class of suitable crosslinking agents is borates as described, for example, in U.S. Pat. No. 4,514,309, incorporated herein by reference. The selection of an appropriate crosslinking agent depends upon the type of treatment to be performed and the hydratable polymer to be used. The amount of the crosslinking agent used also depends upon the well conditions and the type of treatment to be effected, but is generally in the range of from about 10 ppm to about 1000 ppm of metal ion of the crosslinking agent in the hydratable polymer fluid. In some applications, the aqueous polymer solution is crosslinked immediately upon addition of the crosslinking agent to form a highly viscous gel. In other applications, the reaction of the crosslinking agent can be retarded so that viscous gel formation does not occur until the desired time.

In many instances, if not most, the viscosifying polymer is crosslinked with a suitable crosslinking agent. The crosslinked polymer has an even higher viscosity and is even more effective at carrying proppant into the fractured formation. The borate ion has been used extensively as a crosslinking agent, typically in high pH fluids, for guar, guar derivatives and other galactomannans. See, for example, U.S. Pat. No. 3,059,909, incorporated herein by reference and numerous other patents that describe this classic aqueous gel as a fracture fluid. Other crosslinking agents include, for example, titanium crosslinkers (U.S. Pat. No. 3,888,312, incorporated herein by reference), chromium, iron, aluminum, and zirconium (U.S. Pat. No. 3,301,723, incorporated herein by reference). Of these, the titanium and zirconium crosslinking agents are typically preferred. Examples of commonly used zirconium crosslinking agents include zirconium triethanolamine complexes, zirconium acetylacetonate, zirconium lactate, zirconium carbonate, and chelants of organic alphahydroxycorboxylic acid and zirconium. Examples of commonly used titanium crosslinking agents include titanium triethanolamine complexes, titanium acetylacetonate, titanium lactate, and chelants of organic alpha-hydroxycorboxylic acid and titanium.

Similarly, the crosslinking agent(s) may be selected from those organic and inorganic compounds well known to those skilled in the art useful for such purpose, and the phrase "crosslinking agent", as used herein, includes mixtures of such compounds. Exemplary organic crosslinking agents include, but are not limited to, aldehydes, dialdehydes, phenols, substituted phenols, ethers, and mixtures thereof. Phenol, resorcinol, catechol, phloroglucinol, gallic acid, pyrogallol, 4,4'-diphenol, 1,3-dihydroxynaphthalene, 1,4-benzoquinone, hydroquinone, quinhydrone, tannin, phenyl acetate, phenyl benzoate, 1-naphthyl acetate, 2-naphthyl acetate, phenyl chloracetate, hydroxyphenylalkanols, formaldehyde, paraformaldehyde, acetaldehyde, propanaldehyde, butyraldehyde, isobutyraldehyde, valeraldehyde, heptaldehyde, decanal, glyoxal, glutaraldehyde, terephthaldehyde, hexamethyl-enetetramine, trioxane, tetraoxane, polyoxymethylene, and divinylether may be used. Typical inorganic crosslinking agents are polyvalent metals, chelated polyvalent metals, and compounds capable of yielding polyvalent metals, including organometallic compounds as well as borates and boron complexes, and mixtures thereof. In certain embodiments, the inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes. Fluids containing additives such as those described in U.S. Pat. No. 4,683,068 and U.S. Pat. No. 5,082,579 may be used.

As indicated, mixtures of polymeric gel forming material or gellants may be used. Materials which may be used include water soluble crosslinkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), ammonium and alkali metal salts thereof, and mixtures thereof. In certain embodiments, the water soluble crosslinkable polymers include hydroxypropyl guar, carboxymethylhydroxypropyl guar, partially hydrolyzed polyacrylamides, xanthan gum, polyvinyl alcohol, the ammonium and alkali metal salts thereof, and mixtures thereof.

The pH of an aqueous fluid which contains a hydratable polymer can be adjusted if necessary to render the fluid compatible with a crosslinking agent. In other embodiments, a pH adjusting material is added to the aqueous fluid after the addition of the polymer to the aqueous fluid. Typical materials for adjusting the pH are commonly used acids, acid buffers, and mixtures of acids and bases. For example, sodium bicarbonate, potassium carbonate, sodium hydroxide, potassium hydroxide, and sodium carbonate are typical pH adjusting agents. Acceptable pH values for the fluid may range from neutral to basic, i.e., from about 5 to about 14. In other embodiments, the pH is kept neutral or basic, i.e., from about 7 to about 14. In other embodiments, the pH is between about 8 to about 12.

Breaking Agents

The breaking agent may be a metal-based oxidizing agent such as an alkaline earth metal or a transition metal. Exemplary breaking agents include, without limitation, magnesium peroxide, calcium peroxide, zinc peroxide, or mixtures and combinations thereof.

The term "breaking agent" or "breaker" refers to any chemical that is capable of reducing the viscosity of a gelled fluid. As described above, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. This reduction in viscosity of the treating fluid is commonly referred to as "breaking" Consequently, the chemicals used to break the viscosity of the fluid is referred to as a breaking agent or a breaker.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812, incorporated herein by reference. In some embodiments, an inorganic breaking agent is selected from alkaline earth metal or transition metal-based oxidizing agents, such as magnesium peroxides, zinc peroxides, and calcium peroxides.

In addition, enzymatic breakers may also be used in place of or in addition to a non-enzymatic breaker. Examples of suitable enzymatic breakers such as guar specific enzymes, alpha and beta amylases, amyloglucosidase, aligoglucosidase, invertase, maltase, cellulase, and hemi-cellulase are disclosed in U.S. Pat. Nos. 5,806,597 and 5,067,566, incorporated herein by reference.

A breaking agent or breaker may be used "as is" or be encapsulated and activated by a variety of mechanisms including crushing by formation closure or dissolution by formation fluids. Such techniques are disclosed, for example, in U.S. Pat. Nos. 4,506,734; 4,741,401; 5,110,486; and 3,163,219, incorporated herein by reference.

Aggregating or Zeta Potential Altering Compositions

Amine-Phosphate Reaction Product Aggregating or Zeta Potential Altering Compositions Amines Suitable amines include, without limitation, any amine that is capable of reacting with a suitable phosphate ester to form a composition that forms a deformable coating on a metal-oxide-containing surface. Exemplary examples of such amines include, without limitation, any amine of the general formula $R^1, R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Phosphate Compounds

Suitable phosphate compounds include, without limitation, any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$, polymers thereof, or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)_y$, where $x+y=3$ and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the triphosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate.

Polymeric Amine Zeta Potential Aggregating Compositions

Suitable amines capable of forming a deformable coating on a solid particles, surfaces, and/or materials include, without limitation, heterocyclic aromatic amines, substituted heterocyclic aromatic amines, poly vinyl heterocyclic aromatic amines, co-polymers of vinyl heterocyclic aromatic amine and non amine polymerizable monomers (ethylenically unsaturated monomers and diene monomers), or mixtures or combinations thereof, where the substituents of the substituted heterocyclic aromatic amines are carbyl groups having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. In certain embodiments, amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the poly vinyl heterocyclic amines include, without limitation, polymers and copolymers of vinyl pyridine, vinyl substituted pyridine, vinyl pyrrole, vinyl substituted pyrroles, vinyl piperidine, vinyl substituted piperidines, vinyl pyrrolidine, vinyl substituted pyrrolidines, vinyl indole, vinyl substituted indoles, vinyl imidazole, vinyl substituted imidazole, vinyl quinoline, vinyl substituted quinoline, vinyl isoquinoline, vinyl substituted isoquinoline, vinyl pyrazine, vinyl substituted pyrazine, vinyl quinoxaline, vinyl substituted quinoxaline, vinyl acridine, vinyl substituted acridine, vinyl pyrimidine, vinyl substituted pyrimidine, vinyl quinazoline, vinyl substituted quinazoline, or mixtures and combinations thereof. In certain embodiments, the heterocyclic aromatic amines comprise HAP™-310 available from Vertellus Specialties Inc.

Amine Component and Amine Component and Amine-Phosphate Reaction Product Aggregating Compositions Suitable amines for the amine component include, without limitation, an amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence, where at least $R^1$ or $R^2$ is a nitrogen containing heterocycle, and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof. In certain embodiments, the amines of the amine components comprise alkyl pyridines.

Amine Polymeric Zeta Potential Aggregating Compositions

Suitable polymers for use in the compositions of this invention includes, without limitation, any polymer including repeat units derived from a heterocyclic or heterocyclic aromatic vinyl monomer, where the hetero atoms is a nitrogen atom or a combination of a nitrogen atom and another hetero atoms selected from the group consisting of boron, oxygen, phosphorus, sulfur, germanium, and/or. The polymers can be homopolymers of cyclic or aromatic nitrogen-containing vinyl monomers, or copolymers of any ethylenically unsaturated monomers that will copolymerize with a cyclic or aromatic nitrogen-containing vinyl monomer. Exemplary cyclic or aromatic nitrogen-containing vinyl monomers include, without limitation, vinyl pyrroles, substituted vinyl pyrroles, vinyl pyridines, substituted vinyl pyridines, vinyl quinolines or substituted vinyl quinolines, vinyl anilines or substituted vinyl anilines, vinyl piperidines or substituted vinyl piperidines, vinyl pirrolidines or substituted vinyl pyrrolidines, vinyl imidazole or substituted vinyl imidazole, vinyl pyrazine or substituted vinyl pyrazines, vinyl pyrimidine or substituted vinyl pyrimidine, vinyl quinazoline or substituted vinyl quinazoline, or mixtures or combinations thereof. Exemplary pyridine monomer include 2-vinyl pyridine, 4-vinyl pyridine, or mixtures or combinations thereof. Exemplary homopolymers include poly-2-vinyl pyridine, poly-4-vinyl pyridine, and mixtures or combinations thereof. Exemplary copolymers including copolymers or 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures of combinations thereof. All of these monomers can also includes substituents. Moreover, in all these vinyl monomers or ethylenically unsaturated monomers, one or more of the carbon atoms can be replaced by one or more hetero atoms selected from the group consisting of boron, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Of course, all of these monomers includes at least one nitrogen atom in the structure.

Examples of vinyl amine polymers covered in U.S. Pat. No. 8,466,094.

From the claims: poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound.

Suitable polymers for use in the compositions of this invention includes, without limitation, any polymer including repeat units derived from a heterocyclic or heterocyclic aromatic vinyl monomer, where the hetero atoms is a nitrogen atom or a combination of a nitrogen atom and another hetero atoms selected from the group consisting of boron, oxygen, phosphorus, sulfur, germanium, and/or mixtures thereof. The polymers can be homopolymers of cyclic or aromatic nitrogen-containing vinyl monomers, or copolymers of any ethylenically unsaturated monomers that will copolymerize with a cyclic or aromatic nitrogen-containing vinyl monomer. Exemplary cyclic or aromatic nitrogen-containing vinyl monomers include, without limitation, vinyl pyrroles, substituted vinyl pyrroles, vinyl pyridines, substituted vinyl pyridines, vinyl quinolines or substituted vinyl quinolines, vinyl anilines or substituted vinyl anilines, vinyl piperidines or substituted vinyl piperidines, vinyl pyrrolidines or substituted vinyl pyrrolidines, vinyl imidazole or substituted vinyl imidazole, vinyl pyrazine or substituted vinyl pyrazines, vinyl pyrimidine or substituted vinyl pyrimidine, vinyl quinazoline or substituted vinyl quinazoline, or mixtures or combinations thereof.

The previous patents focused on vinyl aromatic and heterocyclic polymers. Other polymers that can be used are linear or branched non-aromatic or heterocyclic amines including primary and secondary amine containing polymers such as polyvinylamine, polyethylenimine, poly-enamines, poly(dimethylaminoethyl methacrylate) etc. Biopolymers such chitosan, polypeptides containing lysine, tryptophan, histidine, and/or arginine, and gelatin can also be used. Primary and secondary amines can be further reacted with alkylating agents such as alkyl halides to make them more hydrophobic and have a higher propensity to coat surfaces.

Any of the amine-containing polymers listed previously can be oxidized to the n-oxide or quaternized to form a quaternary amine salt with an alkylating agent. This can be done on either part or all of the amine groups in the polymer. Other examples of quaternary amine polymers include poly (diallyldimethylammonium chloride).

These polymers can be used as such for metal oxide agglomeration but their salts with HCl, phosphate esters, phosphonate ester and the likes can also be used to make the zeta altering composition of the present invention. Salts with simple acids such as HCl, nitric acid, sulfuric acid, etc. can also be made. Organic carboxylic acids such as acetic acid, citric acid, and other mono-, di-, tri-, and poly-carboxylic acids such as polyacrylic acid can be used. Sulfate-containing molecules can also function as the anionic component.

Coacervates Aggregating Compositions

The surfactant which is oppositely charged from the polymer is sometimes called herein the "counterionic surfactant." By this we mean a surfactant having a charge opposite that of the polymer.

Suitable cationic polymers include polyamines, quaternary derivatives of cellulose ethers, quaternary derivatives of guar, homopolymers and copolymers of at least 20 mole percent dimethyl diallyl ammonium chloride (DMDAAC), homopolymers and copolymers of methacrylamidopropyl trimethyl ammonium chloride (MAPTAC), homopolymers and copolymers of acrylamidopropyl trimethyl ammonium chloride (APTAC), homopolymers and copolymers of methacryloyloxyethyl trimethyl ammonium chloride (METAC), homopolymers and copolymers of acryloyloxyethyl trimethyl ammonium chloride (AETAC), homopolymers and copolymers of methacryloyloxyethyl trimethyl ammonium methyl sulfate (METAMS), and quaternary derivatives of starch.

Suitable anionic polymers include homopolymers and copolymers of acrylic acid (AA), homopolymers and copolymers of methacrylic acid (MAA), homopolymers and copolymers of 2-acrylamido-2-methylpropane sulfonic acid (AMPSA), homopolymers and copolymers of N-methacrylamidopropyl N,N-dimethyl amino acetic acid, N-acrylamidopropyl N,N-dimethyl amino acetic acid, N-methacryloyloxyethyl N,N-dimethyl amino acetic acid, and N-acryloyloxyethyl N,N-dimethyl amino acetic acid.

Anionic surfactants suitable for use with the cationic polymers include alkyl, aryl or alkyl aryl sulfates, alkyl, aryl or alkyl aryl carboxylates or alkyl, aryl or alkyl aryl sulfonates. Preferably, the alkyl moieties have about 1 to about 18 carbons, the aryl moieties have about 6 to about 12 carbons, and the alkyl aryl moieties have about 7 to about 30 carbons. Exemplary groups would be propyl, butyl, hexyl, decyl, dodecyl, phenyl, benzyl and linear or branched alkyl benzene derivatives of the carboxylates, sulfates and sulfonates. Included are alkyl ether sulphates, alkaryl sulphonates, alkyl succinates, alkyl sulphosuccinates, N-alkoyl sarcosinates, alkyl phosphates, alkyl ether phosphates, alkyl ether carboxylates, alpha-olefin sulphonates and acyl methyl taurates, especially their sodium, magnesium ammonium and mono-, di- and triethanolamine salts. The alkyl and acyl groups generally contain from 8 to 18 carbon atoms and may be unsaturated. The alkyl ether sulphates, alkyl ether phosphates and alkyl ether carboxylates may contain from one to 10 ethylene oxide or propylene oxide units per molecule, and preferably contain 2 to 3 ethylene oxide units per molecule. Examples of suitable anionic surfactants include sodium lauryl sulphate, sodium lauryl ether sulphate, ammonium lauryl sulphosuccinate, ammonium lauryl sulphate, ammonium lauryl ether sulphate, sodium dodecylbenzene sulphonate, triethanolamine dodecylbenzene sulphonate, sodium cocoyl isethionate, sodium lauroyl isethionate, and sodium N-lauryl sarcosinate.

Cationic surfactants suitable for use with the anionic polymers include quaternary ammonium surfactants of the formula $X^-N^+R^1R^2R^3$ where $R^1$, $R^2$, and $R^3$ are independently selected from hydrogen, an aliphatic group of from about 1 to about 22 carbon atoms, or aromatic, aryl, an alkoxy, polyoxyalkylene, alkylamido, hydroxyalkyl, or alkylaryl group having from about 1 to about 22 carbon atoms; and X is an anion selected from halogen, acetate, phosphate, nitrate, sulfate, alkylsulfate radicals (e.g., methyl sulfate and ethyl sulfate), tosylate, lactate, citrate, and glycolate. The aliphatic groups may contain, in addition to carbon and hydrogen atoms, ether linkages, and other groups such as hydroxy or amino group substituents (e.g., the alkyl groups can contain polyethylene glycol and polypropylene glycol moieties). The longer chain aliphatic groups, e.g., those of about 12 carbons, or higher, can be saturated or unsaturated. More preferably, $R^1$ is an alkyl group having from about 12 to about 18 carbon atoms; $R^2$ is selected from H or an alkyl group having from about 1 to about 18 carbon atoms; $R^3$ and $R^4$ are independently selected from H or an alkyl group having from about 1 to about 3 carbon atoms; and X is as described above.

Suitable hydrophobic alcohols having 6-23 carbon atoms are linear or branched alkyl alcohols of the general formula $C_MH_{2M+2-N}(OH)_N$, where M is a number from 6-23, and N is 1 when M is 6-12, but where M is 13-23, N may be a number from 1 to 3. Our most preferred hydrophobic alcohol is lauryl alcohol, but any linear monohydroxy alcohol having 8-15 carbon atoms is also preferable to an alcohol with more or fewer carbon atoms.

By a gel promoter we mean a betaine, a sultaine or hydroxysultaine, or an amine oxide. Examples of betaines include the higher alkyl betaines such as coco dimethyl carboxymethyl betaine, lauryl dimethyl carboxymethyl betaine, lauryl dimethyl alphacarboxyethyl betaine, cetyl dimethyl carboxymethyl betaine, cetyl dimethyl betaine, lauryl bis-(2-hydroxyethyl)carboxymethyl betaine, oleyl dimethyl gamma-carboxypropyl betaine, lauryl bis-(2-hydroxypropyl)alpha-carboxyethyl betaine, coco dimethyl sulfopropyl betaine, lauryl dimethyl sulfoethyl betaine, lauryl bis-(2-hydroxyethyl)sulfopropyl betaine, amidobetaines and amidosulfobetaines (wherein the RCONH(CH$_2$)$_3$ radical is attached to the nitrogen atom of the betaine, oleyl betaine, and cocamidopropyl betaine. Examples of sultaines and hydroxysultaines include materials such as cocamidopropyl hydroxysultaine.

By a Zeta potential having an absolute value of at least 20 we mean a Zeta potential having a value of +20 of higher or −20 or lower.

Amphoteric surfactants suitable for use with either cationic polymers or anionic polymers include those surfactants broadly described as derivatives of aliphatic secondary and tertiary amines in which the aliphatic radical can be straight or branched chain and wherein one of the aliphatic substituents contains from about 8 to about 18 carbon atoms and one contains an anionic water solubilizing group such as carboxy, sulfonate, sulfate, phosphate, or phosphonate. Suitable amphoteric surfactants include derivatives of aliphatic secondary and tertiary amines in which the aliphatic radical can be straight or branched chain and wherein one of the aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecylaminopropionate, and sodium 3-dodecylaminopropane sulfonate.

Suitable amine oxides include cocoamidopropyl dimethyl amine oxide and other compounds of the formula $R^1R^2R^3N{\rightarrow}O$ wherein $R^3$ is a hydrocarbyl or substituted hydrocarbyl having from about 8 to about 30 carbon atoms, and $R^1$ and $R^2$ are independently hydrogen, a hydrocarbyl or substituted hydrocarbyl having up to 30 carbon atoms. Preferably, $R^3$ is an aliphatic or substituted aliphatic hydrocarbyl having at least about 12 and up to about 24 carbon atoms. More preferably $R^3$ is an aliphatic group having at least about 12 carbon atoms and having up to about 22, and most preferably an aliphatic group having at least about 18 and no more than about 22 carbon atoms.

Suitable phosphorus-containing compounds suitable for use in the invention include, without limitation, phosphates or phosphate equivalents or mixtures or combinations thereof. Suitable phosphates include, without limitation, mono-alkali metal phosphates (PO(OH)(OM), where M is Li, Na, K, Rd, or Cs), di-alkali metal phosphates (PO(OH)(OM)$_2$, where each M is the same or different and is Li, Na, K, Rd, or Cs) such as dipotassium phosphate (PO(OH)(OK)$_2$) and disodium phosphate, (PO(OH)(ONa)$_2$), tri-alkali metal phosphates (PO(OM)$_3$, where each M is the same or different and is Li, Na, K, Rd, or Cs) such as trisodium phosphate (PO(ONa)$_3$) and tripotassium phosphate (PO(OK)$_3$), carbyl phosphates (PO(OR$^1$)(OM)$_2$, where $R^1$ is a carbyl group and M is H, Li, Na, K, Rd, and/or Cs), dicarbyl phosphates (PO(OR$^1$)(OR$^2$)(OM), where $R^1$ and $R^2$ are the same or different carbyl groups and M is H, Li, Na, K, Rd, or Cs), tricarbyl phosphates (PO(OR$^1$)(OR$^2$)(OR$^3$), where $R^1$, $R^2$, and $R^3$ are the same or different carbyl groups), or mixtures or combinations thereof.

Suitable carbyl group include, without limitations, carbyl group having between about 3 and 40 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. The carbyl group can be an alkyl group, an alkenyl group, an aryl group, an alkaaryl group, an aryalkyl group, or mixtures or combinations thereof, i.e., each carbyl group in the phosphate can be the same or different. In certain embodiments, the carbyl group has between about 3 and about 20, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 3 and about 16, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 3 and about 12, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the carbyl group has between about 4 and about 8, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group.

Suitable tri-alkyl phosphates include, without limitations, alkyl group having from about 3 to about 20 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In certain embodiments, the tri-alkyl phosphate includes alkyl groups having from about 4 to about 12 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. In other embodiments, the tri-alkyl phosphate includes alkyl groups having from about 4 to about 8 carbon atoms, where one or more of the carbon atoms can be replaced with a hetero atom selected from the group consisting of oxygen and nitrogen, with the remainder of valences comprising hydrogen or a mono-valent group such as a halogen, an amide (—NHCOR), an alkoxide (—OR), or the like, where R is a carbyl group. Such phosphates can be produced by reacting a phosphate donor such as phosphorus pentoxide and a mixture of alcohols in desired proportions.

Aggregation Coating Stabilizers and/or Strengtheners

Suitable aggregation coating stabilizer and/or strengtheners include, without limitation, inorganic crosslinking agents, organic crosslinking agents, and mixtures or combinations thereof.

Suitable inorganic crosslinking agents includes, without limitation, metal compounds capable of forming a network of metal complexes within the coating to stabilize, consolidate and/or strengthen the coating. The metal compounds are selected from the group consisting of groups 2-17 metal compounds. The group 2 metal compounds include compounds of Be, Mg, Ca, Sr, and Ba. The group 3 metal compounds include compounds of Sc, Y, La and Ac. The group 4 metal compounds include compounds of Ti, Zr, Hf, Ce, and Th. The group 5 metal compounds include compounds of V, Nb, Ta, and Pr. The group 6 metal compounds include compounds of Cr, Mo, W, Nd, and U. The group 7 metal compounds include compounds of Mn, Tc, Re, and Pm. The group 8 metal compounds include compounds of Fe, Ru, Os, and Sm. The group 9 metal compounds include compounds of Co, Rh, Ir, and Eu. The group 10 metal compounds include compounds of Ni, Pd, Pt, and Gd. The group 11 metal compounds include compounds of Cu, Ag, Au, and Tb. The group 12 metal compounds include compounds of Zn, Cd, Hg, and Dy. The group 13 metal compounds include compounds of Al, Ga, In, Tl, and Ho. The group 14 metal compounds include compounds of Si, Ge, Sn, Pb, and Er. The group 15 metal compounds include compounds of As, Sb, Bi, and Tm. The group 16 metal compounds include compounds of Yb. The group 17 metal compounds include compounds of Lu. Alternatively, the metal compounds includes alkaline earth metal compounds, poor metal compounds, transition metal compounds, lanthanide metal compounds, actinide metal compounds, and mixtures or combinations thereof. The metal compounds may be in the form of halides, carbonates, oxides, sulfates, sulfites, phosphates, phosphites, nitrates, nitrites, carboxylates (formates, acetates, propionates, butionates, citrates, oxylates, or higher carboxylates), Suitable organic crosslinking agents include, without limitation, di-glycidyl ethers, tri-glycidyl ethers, carbyldihalides, bisphenol A, di-isocynates, tri-isocynates, diacyl azides, cyanuaric chloride, diacids, polyacids, imidylated di and poly carboxylic acids, anhydrides, carbonates, diepoxides, dialdehydes, disothiocyantes, divinylsulfones, such as other similar organic crosslinking agents, and mixtures or combinations thereof.

Solid Materials and Proppants

Suitable solid materials and/or proppants capable of being pre-treated or treated with the aggregating compositions of this invention include, without limitation, metal oxides and/or ceramics, natural or synthetic, metals, plastics and/or other polymeric solids, solid materials derived from plants, any other solid material that does or may find use in downhole applications, treated analogs thereof, where solid materials and/or proppants are treated with the aggregating compositions of this invention, or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired.

Sand, resin-coated sand, and ceramic particles are the most commonly used proppants, though the literature, for instance U.S. Pat. No. 4,654,266, incorporated herein by reference, also mentions the used of walnut hull fragments coated with some bonding additives, metallic shots, or metal-coated beads—nearly spherical but having a passageways to improve their conductibility.

The proppant conductivity is affected principally by two parameters, the proppant pack width and the proppant pack permeability. To improve fracture proppant conductivity, typical approaches include high large diameter proppants. More generally, the most common approaches to improve proppant fracture performance include high strength proppants, large diameter proppants, high proppant concentrations in the proppant pack to obtain wider propped fractures, conductivity enhancing materials such as breakers, flowback aides, fibers and other material that physically alter proppant packing, and use of non-damaging fracturing fluids such as gelled oils, viscoelastic surfactant based fluids, foamed fluids or emulsified fluids. It is also recognized that grain size, grain-size distribution, quantity of fines and impurities, roundness and sphericity and proppant density have an impact on fracture conductivity.

As mentioned above, the main function of the proppant is to keep the fracture open by overcoming the in-situ stress. Where the proppant strength is not high enough, the closure stress crushes the proppant, creating fines and reducing the conductivity. Sand is typically suitable for closure stresses of less than about 6000 psi (41 MPa), resin-coated sand may be used up to about 8000 psi (55 MPa). Intermediate-strength proppant typically consists of fused ceramic or sintered-bauxite and is used for closure stresses ranging between 5000 psi and 10000 psi (34 MPa to 69 MPa). High-strength proppant, consisting of sintered-bauxite with large amounts of corundum is used at closure stresses of up to about 14000 psi (96 MPa).

Permeability of a propped fracture increases as the square of the grain diameter. However, larger grains are often more susceptible to crush, have more placement problems and tend to be more easily invaded by fines. As the result, the average conductivity over the life of a well may be actually higher with smaller proppants.

It should be recognized that the proppant itself is may be of any shape including irregular shapes, essentially spherical shapes, elongated shapes, etc. Adding fibers or fiber-like products to the fluids may contribute to a reduction of the proppant flowback and consequently to a better packing of the proppant islands in the fracture, as the fibers will adhere to the islands because the islands include an amount of proppants coated with an aggregating composition of this invention or treated with an aggregating composition and a coating crosslinking composition. Additionally, the fibers may prevent or reduce fine migrations and consequently, prevent or reduce a reduction of the proppant conductivity by forming new types of proppant islands that will lead to higher formation conductivity.

Fibers and Organic Particulate Materials

Non-Erodible Fibers

Suitable non soluble or non erodible fibers include, without limitation, natural fibers, synthetic fibers, or mixtures and combinations thereof. Exemplary examples of natural fibers include, without limitation, abaca, cellulose, wool such as alpaca wool, cashmere wool, mohair, or angora wool, camel hair, coir, cotton, flax, hemp, jute, ramie, silk, sisal, byssus fibers, chiengora fibers, muskox wool, yak wool, rabbit hair, kapok, kenaf, raffia, bamboo, Piiia, asbestos fibers, glass fibers, cellulose fibers, wood pulp fibers, treated analogs thereof, or mixtures and combinations thereof. Exemplary examples of synthetic fibers include, without limitation, regenerated cellulose fibers, cellulose acetate fibers, polyester fibers, aramid fibers, acrylic fibers, fibre optic fibers, polyamide and polyester fibers, polyethylene fibers, polypropylene fibers, acrylic fibers, aramid fibers, silk fibers, azlon fibers, BAN-LON® fibers (registered trademark of Joseph Bancroft & Sons Company), basalt fiber, carbon fiber, CELLIANT® fiber (registered trademark of Hologenix, LLC), cellulose acetate fiber, cellulose triacetate fibers, CORDURA® fibers (registered trademark of INVISTA, a subsidiary of privately owned Koch Industries, Inc.), crimplene (a polyester) fibers, cuben fibers, cuprammonium rayon fibers, dynel fibers, elasterell fibers, elastolefin fibers, glass fibers, GOLD FLEX® fibers (registered trademark of Honeywell), INNEGRA S™ fibers (brandname of Innegra Technologies LLC), aramid fibers such as KEVLAR® fibers (registered trademark of DuPont), KEVLAR® KM2 fibers (registered trademark of DuPont), LASTOL® fibers (registered trademark of DOW Chemicals Company), Lyocell fibers, M5 fibers, modacrylic fibers, Modal fibers, NOMEX® fibers (registered trademark of DuPont), nylon fibers such as nylon 4 fibers, nylon 6 fibers, nylon 6-6 fibers, polyolefin fibers, poly(p-phenylene sulfide) fibers, polyacrylonitrile fibers, polybenzimidazole fibers, polydioxanone fibers, polyester fibers, qiana fibers, rayon fibers, polyvinylidene chloride fibers such as Saran fibers, of poly(trimethylene terephthalate) fibers such as Sorona fibers, spandex or elastane fibers, Taklon fibers, Technora fibers, THINSULATE® fibers (registered trademark of 3M), Twaron™ fibers (brandname of Teij in Aramid), ultra-high-molecular-weight polyethylene fibers, syndiotactic polypropylene fibers, isotactic polypropylene fibers, polyvinylalcohol fibers, cellulose xanthate fibers, poly(p-phenylene-2,6-benzobisoxazole) fibers, polyimide fibers, other synthetic fibers, or mixtures and combinations thereof. These fibers can additionally or alternatively form a three-dimensional network, reinforcing the proppant and limiting its flowback.

Non-Erodible Particles

Suitable solid organic polymeric particulate materials include, without limitation, polymeric particulate matter derived from cellulose, acrylic acid, aramides, acrylonitrile, polyamides, vinylidene, olefins, diolefins, polyester, polyurethane, vinyl alcohol, and vinyl chloride, may be used. Preferred compositions, assuming the required reactivity and/or decomposition characteristics may be selected from rayon, acetate, triacetate, cotton, wool (cellulose group); nylon, acrylic, modacrylic, nitrile, polyester, saran, spandex, vinyon, olefin, vinyl, (synthetic polymer group); azlon, rubber (protein and rubber group), and mixtures thereof. Polyester and polyamide particles of sufficient molecular weight, such as from Dacron® and nylon, respectively, and mixtures thereof, are most preferred. Again, composite particles, comprising natural and/or synthetic materials of appropriate characteristics, may be employed. For example, a suitable composite particle might comprise a core and sheath structure where the sheath material and the core material degrade over different desired periods of time. The compounds or compositions employed as organic polymeric material according to the invention need not be pure, and commercially available materials containing various additives, fillers, etc. or having coatings may be used, so long as such components do not interfere with the required activity. The organic polymeric particulate material level, i.e., concentration, provided initially in the fluid may range from 0.02 percent up to about 10 percent by weight of the fluid. Most preferably, however, the concentration ranges from about 0.02 percent to about 5.0 percent by weight of fluid.

Particle size and shape, while important, may be varied considerably, depending on timing and transport considerations. In certain embodiments, if irregular or spherical particles of the organic polymer are used, particle size may range from 80 mesh to 2.5 mesh (Tyler), preferably from 60 mesh to 3 mesh. Fibers and/or platelets of the specified polymeric materials are preferred for their mobility and transfer aiding capability. In the case of fibers of the organic polymer, the fibers employed according to the invention may also have a wide range of dimensions and properties. As employed herein, the term "fibers" refers to bodies or masses, such as filaments, of natural or synthetic material(s) having one dimension significantly longer than the other two, which are at least similar in size, and further includes mixtures of such materials having multiple sizes and types. In other embodiments, individual fiber lengths may range upwardly from about 1 millimeter. Practical limitations of handling, mixing, and pumping equipment in wellbore applications, currently limit the practical use length of the fibers to about 100 millimeters. Accordingly, in other embodiments, a range of fiber length will be from about 1 mm to about 100 mm or so. In yet other embodiments, the length will be from at least about 2 mm up to about 30 mm. Similarly, fiber diameters will preferably range upwardly from about 5 microns. In other embodiments, the diameters will range from about 5 microns to about 40 microns. In other embodiments, the diameters will range from about 8 microns to about 20 microns, depending on the modulus of the fiber, as described more fully hereinafter. A ratio of length to diameter (assuming the cross section of the fiber to be circular) in excess of 50 is preferred. However, the fibers may have a variety of shapes ranging from simple round or oval cross-sectional areas to more complex shapes such as trilobe, figure eight, star-shape, rectangular cross-sectional, or the like. Preferably, generally straight fibers with round or oval cross sections will be used. Curved, crimped, branched, spiral-shaped, hollow, fibrillated, and other three dimensional fiber geometries may be used. Again, the fibers may be hooked on one or both ends. Fiber and platelet densities are not critical, and will preferably range from below 1 to 4 g/cm$^3$ or more.

Those skilled in the art will recognize that a dividing line between what constitute "platelets", on one hand, and "fibers", on the other, tends to be arbitrary, with platelets being distinguished practically from fibers by having two dimensions of comparable size both of which are significantly larger than the third dimension, fibers, as indicated, generally having one dimension significantly larger than the other two, which are similar in size. As used herein, the terms "platelet" or "platelets" are employed in their ordinary sense, suggesting flatness or extension in two particular dimensions, rather than in one dimension, and also is understood to include mixtures of both differing types and sizes. In general, shavings, discs, wafers, films, and strips of the polymeric material(s) may be used. Conventionally, the term "aspect ratio" is understood to be the ratio of one dimension, especially a dimension of a surface, to another dimension. As used herein, the phrase is taken to indicate the ratio of the diameter of the surface area of the largest side of a segment of material, treating or assuming such segment surface area to be circular, to the thickness of the material (on average). Accordingly, the platelets utilized in the invention will possess an average aspect ratio of from about 10 to about 10,000. In certain embodiments the average aspect ration is from 100 to 1000. In other embodiments, the platelets will be larger than 5 microns in the shortest dimension, the dimensions of a platelet which may be used in the invention being, for example, 6 mm×2 mm×15 μm.

In a particularly advantageous aspect of the invention, particle size of the organic polymeric particulate matter may be managed or adjusted to advance or retard the reaction or degradation of the gelled suspension in the fracture. Thus, for example, of the total particulate matter content, 20 percent may comprise larger particles, e.g., greater than 100 microns, and 80 percent smaller, say 80 percent smaller than 20 micron particles. Such blending in the gelled suspension may provide, because of surface area considerations, a different time of completion of reaction or decomposition of the particulate matter, and hence the time of completion of gel decomposition or breaking, when compared with that provided by a different particle size distribution.

The solid particulate matter, e.g., fibers, or fibers and/or platelet, containing fluid suspensions used in the invention may be prepared in any suitable manner or in any sequence or order. Thus, the suspension may be provided by blending in any order at the surface, and by addition, in suitable proportions, of the components to the fluid or slurry during treatment on the fly. The suspensions may also be blended offsite. In the case of some materials, which are not readily dispersible, the fibers should be "wetted" with a suitable fluid, such as water or a wellbore fluid, before or during mixing with the fracturing fluid, to allow better feeding of the fibers. Good mixing techniques should be employed to avoid "clumping" of the particulate matter.

Erodible Particles and Fibers

Suitable dissolvable, degradable, or erodible proppants include, without limitation, water-soluble solids, hydrocarbon-soluble solids, or mixtures and combinations thereof. Exemplary examples of water-soluble solids and hydrocarbon-soluble solids include, without limitation, salt, calcium carbonate, wax, soluble resins, polymers, or mixtures and combinations thereof. Exemplary salts include, without limitation, calcium carbonate, benzoic acid, naphthalene based materials, magnesium oxide, sodium bicarbonate, sodium chloride, potassium chloride, calcium chloride, ammonium sulfate, or mixtures and combinations thereof. Exemplary polymers include, without limitation, polylactic acid (PLA), polyglycolic acid (PGA), lactic acid/glycolic acid copolymer (PLGA), polysaccharides, starches, or mixtures and combinations thereof.

As used herein, "polymers" includes both homopolymers and copolymers of the indicated monomer with one or more comonomers, including graft, block and random copolymers. The polymers may be linear, branched, star, cross-linked, derivatized, and so on, as desired. The dissolvable or erodible proppants may be selected to have a size and shape similar or dissimilar to the size and shape of the proppant particles as needed to facilitate segregation from the proppant. Dissolvable, degradable, or erodible proppant particle shapes can include, for example, spheres, rods, platelets, ribbons, and the like and combinations thereof. In some applications, bundles of dissolvable, degradable, or erodible fibers, or fibrous or deformable materials, may be used.

The dissolvable, degradable, or erodible proppants may be capable of decomposing in the water-based fracturing fluid or in the downhole fluid, such as fibers made of polylactic acid (PLA), polyglycolic acid (PGA), polyvinyl alcohol (PVOH), and others. The dissolvable, degradable, or erodible fibers may be made of or coated by a material that becomes adhesive at subterranean formation temperatures. The dissolvable, degradable, or erodible fibers used in one embodiment may be up to 2 mm long with a diameter of 10-200 microns, in accordance with the main condition that the ratio between any two of the three dimensions be greater than 5 to 1. In another embodiment, the dissolvable, degradable, or erodible fibers may have a length greater than 1 mm, such as, for example, 1-30 mm, 2-25 mm or 3-18 mm, e.g., about 6 mm; and they can have a diameter of 5-100 microns and/or a denier of about 0.1-20, preferably about 0.15-6. These dissolvable, degradable, or erodible fibers are desired to facilitate proppant carrying capability of the treatment fluid with reduced levels of fluid viscosifying polymers or surfactants. Dissolvable, degradable, or erodible fiber cross-sections need not be circular and fibers need not be straight. If fibrillated dissolvable, degradable, or erodible fibers are used, the diameters of the individual fibrils may be much smaller than the aforementioned fiber diameters.

Other Fracturing Fluid Components

The fracturing fluid may also include ester compound such as esters of polycarboxylic acids. For example, the ester compound may be an ester of oxalate, citrate, or ethylene diamine tetraacetate. The ester compound having hydroxyl groups can also be acetylated. An example of this is that citric acid can be acetylated to form acetyl triethyl citrate. A presently preferred ester is acetyl triethyl citrate.

Gases

Suitable gases for foaming the foamable, ionically coupled gel composition include, without limitation, nitrogen, carbon dioxide, or any other gas suitable for use in formation fracturing, or mixtures or combinations thereof.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Other Fracturing Fluid Additives

The fracturing fluids of this invention may also include other additives such as pH modifiers, scale inhibitors, carbon dioxide control additives, paraffin control additives, oxygen control additives, salt inhibitors, or other additives.

pH Modifiers

Suitable pH modifiers for use in this invention include, without limitation, alkali hydroxides, alkali carbonates, alkali bicarbonates, alkaline earth metal hydroxides, alkaline earth metal carbonates, alkaline earth metal bicarbonates, rare earth metal carbonates, rare earth metal bicarbonates, rare earth metal hydroxides, amines, hydroxylamines ($NH_2OH$), alkylated hydroxyl amines ($NH_2OR$, where R is a carbyl group having from 1 to about 30 carbon atoms or heteroatoms —O or N), and mixtures or combinations thereof. Preferred pH modifiers include NaOH, KOH, $Ca(OH)_2$, CaO, $Na_2CO_3$, $KHCO_3$, $K_2CO_3$, $NaHCO_3$, MgO, $Mg(OH)_2$ and mixtures or combinations thereof. Preferred amines include triethylamine, tripropylamine, other trialkylamines, bis hydroxyl ethyl ethylenediamine (DGA), bis hydroxyethyl diamine 1-2 dimethylcyclohexane, or the like or mixtures or combinations thereof.

Scale Control

Suitable additives for Scale Control and useful in the compositions of this invention include, without limitation: Chelating agents, e.g., $Na^+$, $K^+$ or $NH_4^+$ salts of EDTA; Na, K or $NH_4^+$ salts of NTA; $Na^+$, $K^+$ or $NH_4^+$ salts of Erythorbic acid; $Na^+$, $K^+$ or $NH_4^+$ salts of thioglycolic acid (TGA); $Na^+$, $K^+$ or $NH_4^+$ salts of Hydroxy acetic acid; $Na^+$, $K^+$ or $NH_4^+$ salts of Citric acid; $Na^+$, $K^+$ or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaerythritol, neopentyl glycol or the like; Tris & Tetra hydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of amino ethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na Minus-Nitrilotriacetamide available from Clearwater International, LLC of Houston, Tex.

DETAILED DESCRIPTION OF THE DRAWINGS

Referring now to FIG. 1, an embodiment of an illustrative flow chart of a method and a system of this invention, generally 100, is shown to include a data input module 102, a candidate formation or play selection module 104, an engineering design module 106, an output module 108, and an execution module 110. The input module 102 receives formation or reservoir, geomechanical, site, and well specification data in step 1.1. The input module 102 also receives proppant properties and proppant pillar properties in step 1.2. This data is transferred to the candidate formation or play selection module 104. The candidate formation or play selection module 104 calculates preliminary hydraulic fracturing geometry modeling in step 2.1 and generates response surfaces for different pillar configurations for a quick look analysis in step 2.2. Candidates are then forwarded to a conditional pass step 112. If the candidate fails the pass step 112, then the control is transferred along a NO path to a select a different formation type and/or different proppant/pillar type 114 and transferred back to the input module 102. If a candidate passes the step 112, then the candidate is forwarded along a YES path to a proceed to an advanced analysis step 116. Control is then transferred to the engineering module 106. The engineering module 106 simulates pillar transport using CFD routines in a step 3.1. The engineering module 106 also simulates pillar embedment and fracture closures using goemechanical routines in a step 3.2 and performs production and economic analysis in a step 3.3 creating a complete fracturing operation including potential optimal fracturing parameters. After producing the potential optimal fracturing parameters, control is transferred to a second conditional pass step 118. If the potential optimal fracturing parameters do not meet targeted fracturing conditions, then control is transferred along a NO path to a modify engineering design parameter step 120 and then to an adjust fracturing parameter step 122 and then back to the engineering design module 106. If the potential optimal fracturing parameters meets targeted fracturing conditions, then control is transferred along a YES path to the output module 108. The output module 108 includes outputting a treatment schedule including perforation design, pulse frequency, optimum BHP, proppant selection, production uplift, and other fracturing operation parameters. The optimal fracturing parameters are then forwarded to the field for execution in the execution module 110. The execution module 110 may include a near real time monitoring performance step 5.1, which obtains near real time fracturing data and modifies fracturing parameters to further improve proppant placement and fracture conductivity.

Figure 2:
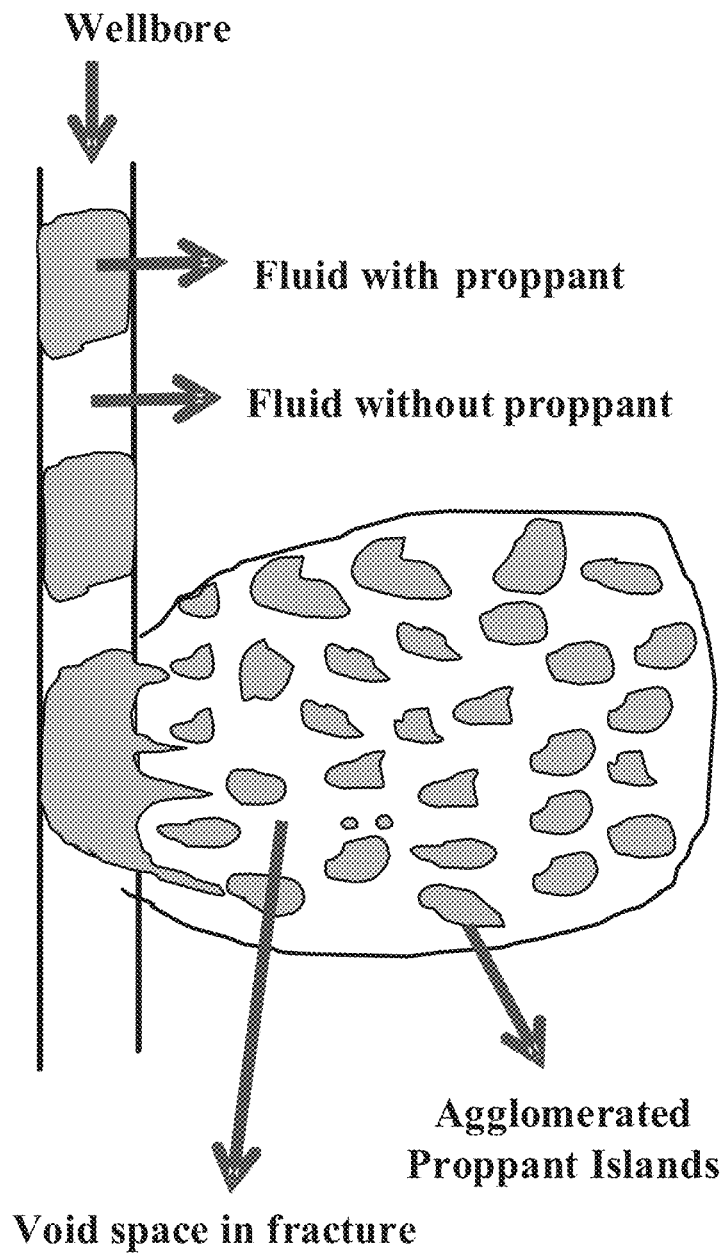
FIG. 2 depicts an illustration fracturing pulse sequence and resulting proppant placement in a fracture.

Referring now to FIG. 2, a typical slug fracturing application is shown. Fluid pulses including fluid with proppant (grey) and fluid without proppant (white) are injected down a well bore and exit through perforations in the well bore to form agglomerated proppant islands (grey) and void spaces (white) in the fracture. Each successive fluid with proppant will deposit additional proppant islands in the fracture.

Referring now to FIG. 3, a plot of permeability of sand pack fracturing versus pillar fracturing is shown. In the plot, the permeability of pillar fractured formations versus closure pressures is higher than conditional sand pack fracturing formed by continuously pumping a proppant containing fluid into the formation—no pulsing. The bottom inserts show proppant configuration and flow pathways in pillar fracturing—full sample assembly to the left and when sample surfaces are taken apart to the right. Bottom inserts are an actual numerical model showing open channels and proppant pillars under closure stress. Bottom right and left inserts are extracted from the same numerical simulation. Bottom left insert shows the complete set-up with fracture surfaces and proppant pillars placed in between. Bottom right insert shows the exact same set-up, but two fracture surfaces split up so that the reader is looking directly to the proppant island (e.g., top-view).

Referring now to FIG. 4, a plot of $k_F w$ versus proppant concentration is shown of partial mono-layers proppant configuration (bottom insert) and a full mono-layer configuration (top insert). It is clear that partial mono-layers have increased conductivity versus full mono-layers. As pillar fracturing forms pillar islands in the fractures, where the pillars act like partial mono-layers and therefore have high conductivity than uniformly distributed proppants—monolayer like.

Figure 5:
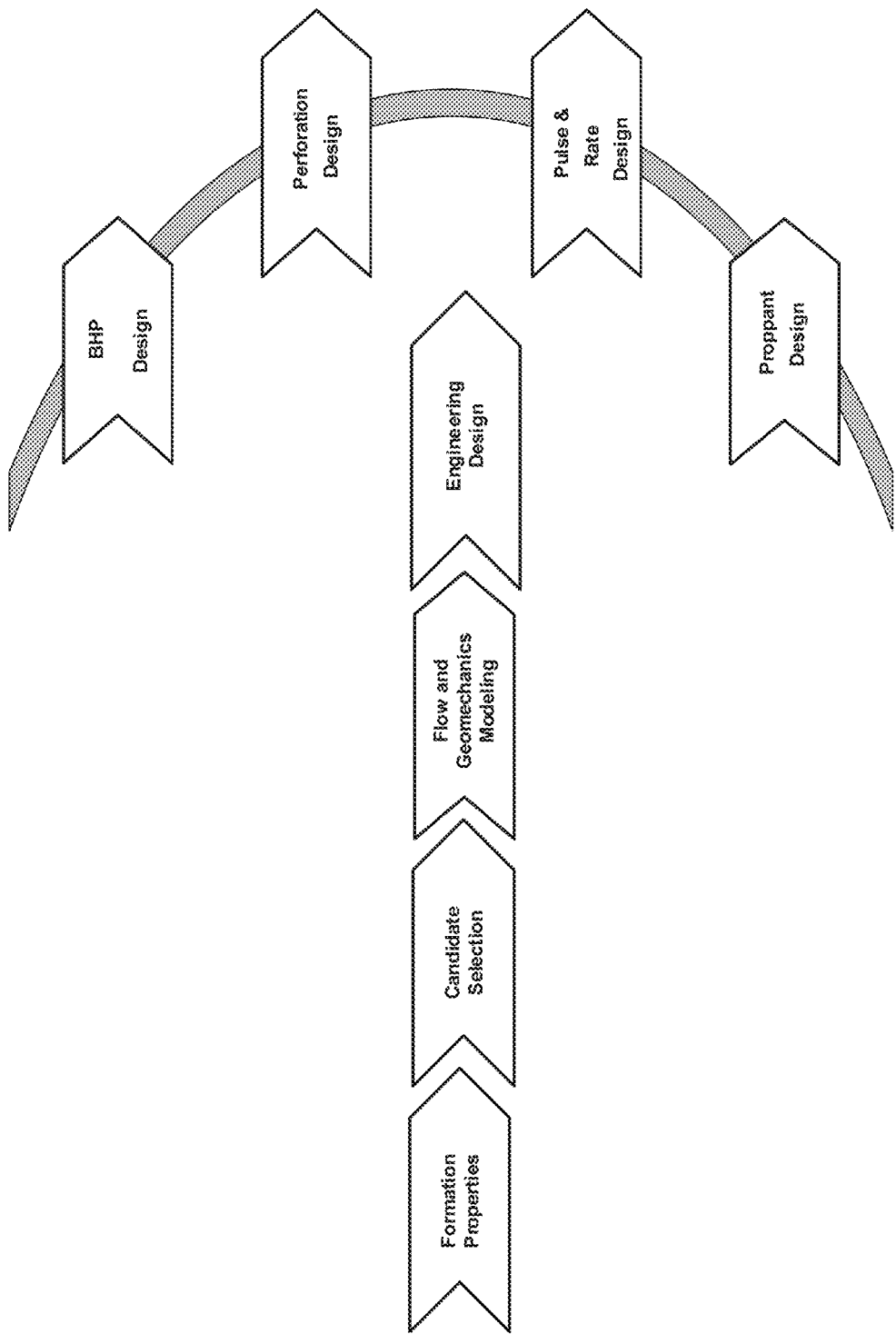
FIG. 5 depicts a method flow diagram that results in optimal BHP design, perforation design, pulse fluid and proppant design and proppant design.

Referring now to FIG. 5, a basic work flow diagram is shown. The work flow starts with obtaining formation properties, performing candidate selection, performing flow and geomechanical modeling, and performing engineering design to fracturing parameters to produce optimal BHP designs, optimal perforation designs, optimal pules and rate designs, and optimal proppant design. The work flow is implemented in an iterative process where candidate selection, proppant design, pulse design, perforation design and BHP design are modified and adjusted until optimal fracturing parameters are generated.

Figure 6:
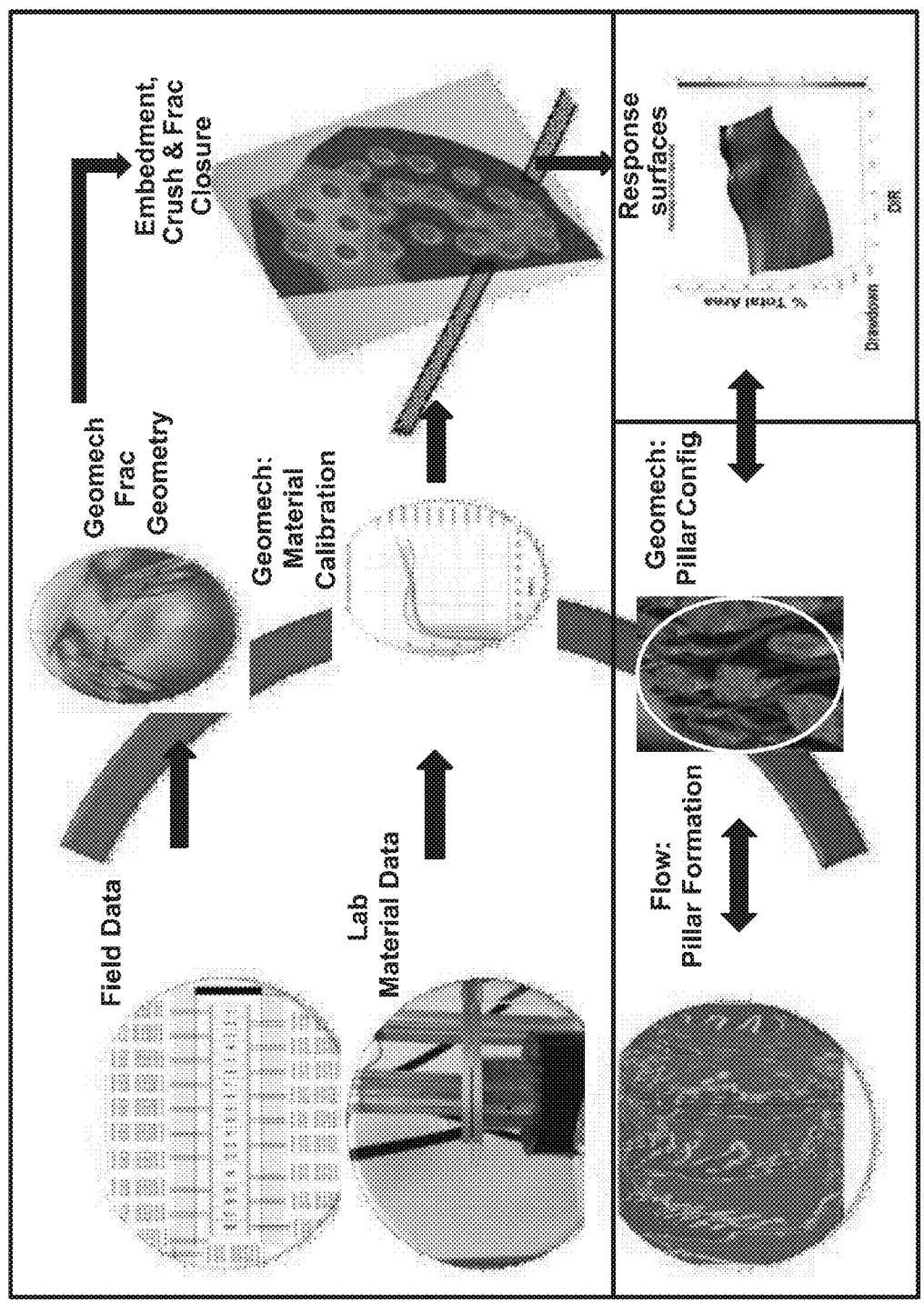
FIG. 6 depicts an other method flow diagram illustrating the method steps involved.

Referring now to FIG. 6, another basic work flow diagram is shown. The work flow starts with obtaining field data and lab material data, which is forwarded to geomechanical fracturing geometry modeling and geomechanical material calibration. After geomechanical modeling and calibration, the work flow proceeds to embedment crush and fracture closing modeling. This data is then used to generate a response surfaces for quick analysis of design parameters. The resulting data is then forwarded to geomechanical piller configuration modeling in an iterative process until optimal fracturing parameters are generated.

Figure 7:
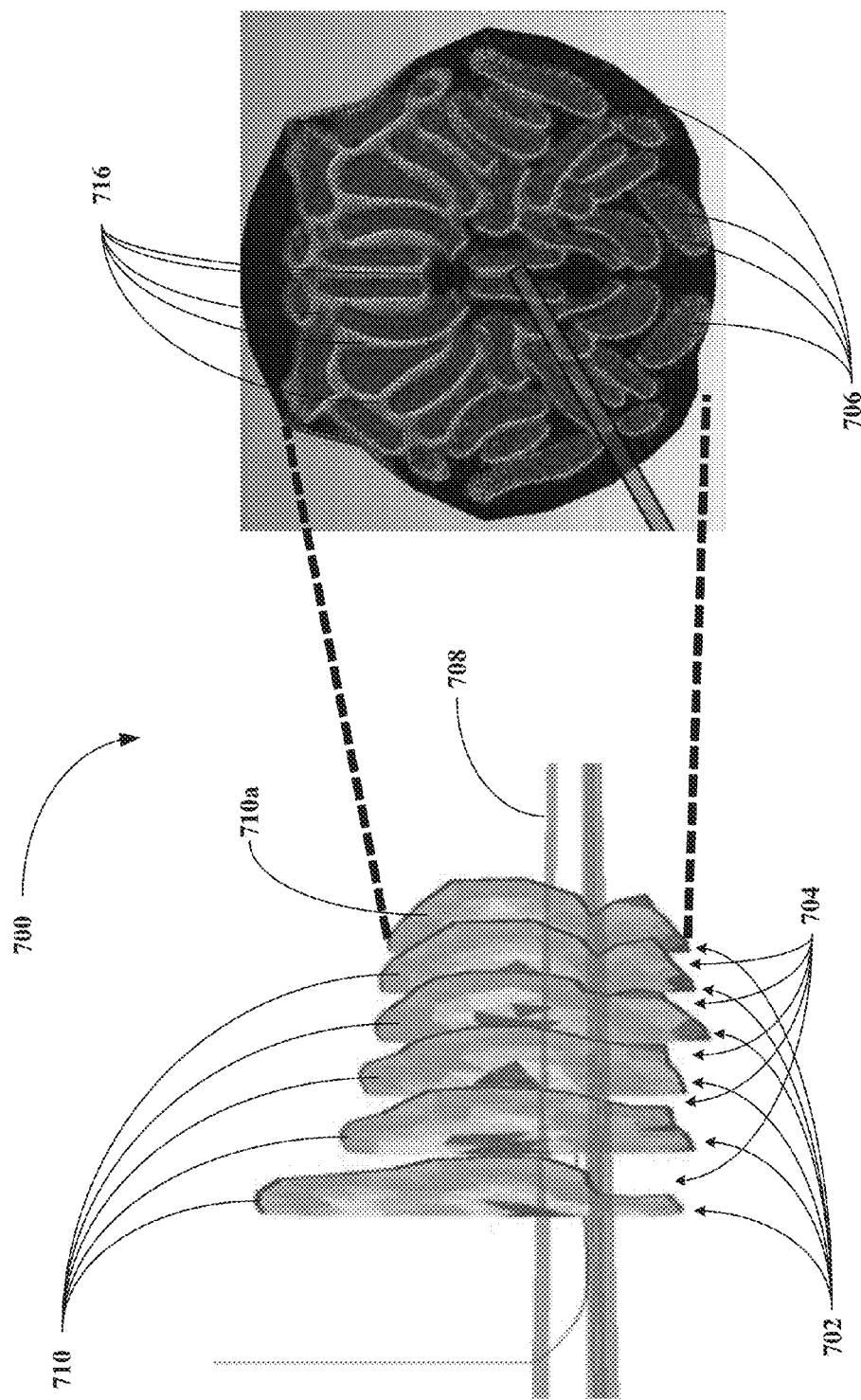
FIG. 7 depicts a proppant placement sequence within a fracture and a resulting proppant configuration in the initial proppant pulse.

Referring now to FIG. 7, an illustration of a horizontal well with multiple fractures, and pulsed proppant patterns within a specific fracture, generally 700, is shown. The figure illustrates a distributed proppant pillars keep the fracture surfaces open, while the space between each pillar act as open flow channels and enhance overall conductivity. FIG. 7 is shown to include a series of proppant-containing pulses 702 and proppant-free pulses 704. Each proppant-containing pulse 702 generates a distribution of proppant islands 706 in the fracture 708 as shown by the shaded cross-sectional profiles 710. The shaded cross-sections 710 illustrate a distribution of proppant in the fracture from the corresponding proppant pulse, where the darker center region represents the highest proppant concentration and where the darker sections on the edges are not proppant, but proppant free regions as the original drawing was in color with the center being red and the edges being blue. The insert 712 shows a view of the first profile 710*a* looking into the fracture. The insert 714 shows a plurality of the proppant islands 706 and a plurality of flow paths 716 therebetween.

Figure 8A:
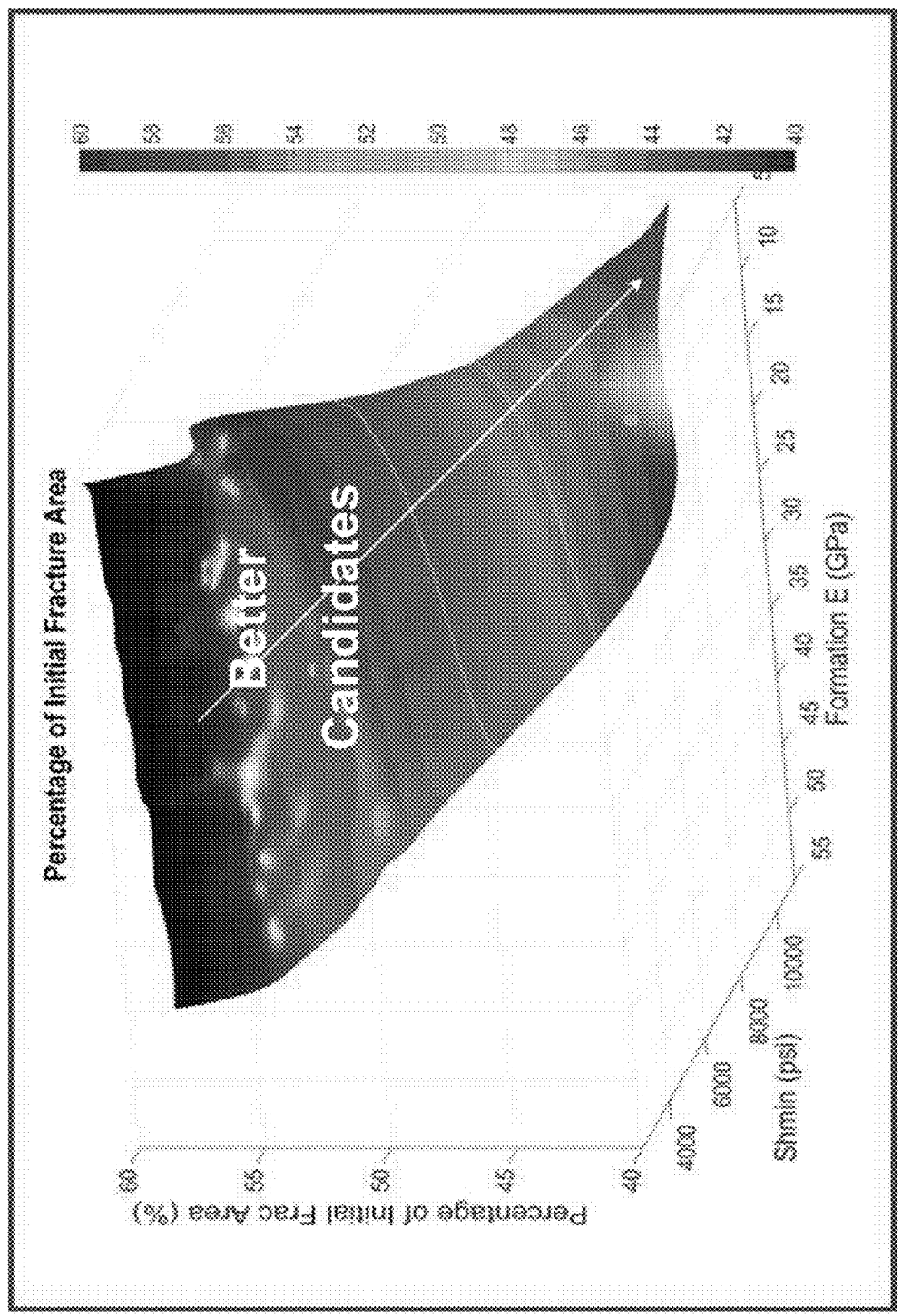
FIG. 8A depicts a response surface of open fracture area as percentage of initial fracture area versus $S_{hmin}$ versus formation E.
Figure 8B:
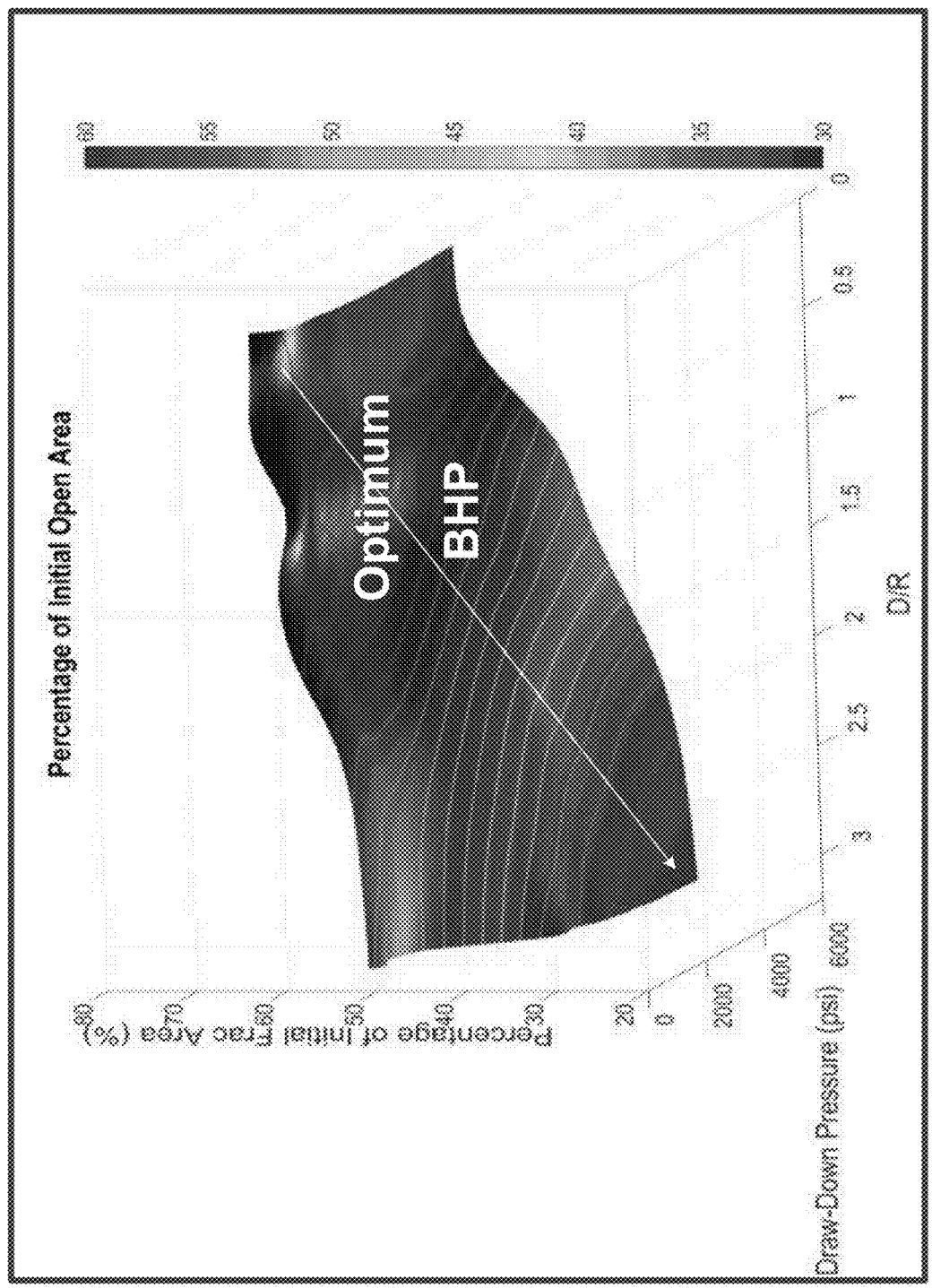
FIG. 8B depicts a response surface of open fracture area as percentage of initial fracture area versus draw-down pressure versus D/R.

Referring now to FIGS. 8A&B, response surfaces for candidate well selection and optimization are shown. FIG. 8A shows a response surface of open fracture area as percentage of initial fracture area versus $S_{hmin}$ versus formation E. FIG. 8B shows a response surface of open fracture area as percentage of initial fracture area versus drawdown pressure and versus D/R (distance between proppant pillars to average pillar diameter). These response surfaces are then utilized to determine which formations (or plays) will have a better chance of success and respond well to clustered proppant placement. Once a candidate formation or well is selected, response surfaces may also be utilized to optimize operational parameters for a specific well: such as operating bottom hole pressure or drawdown to maximize fracture conductivity.

Figure 9A:
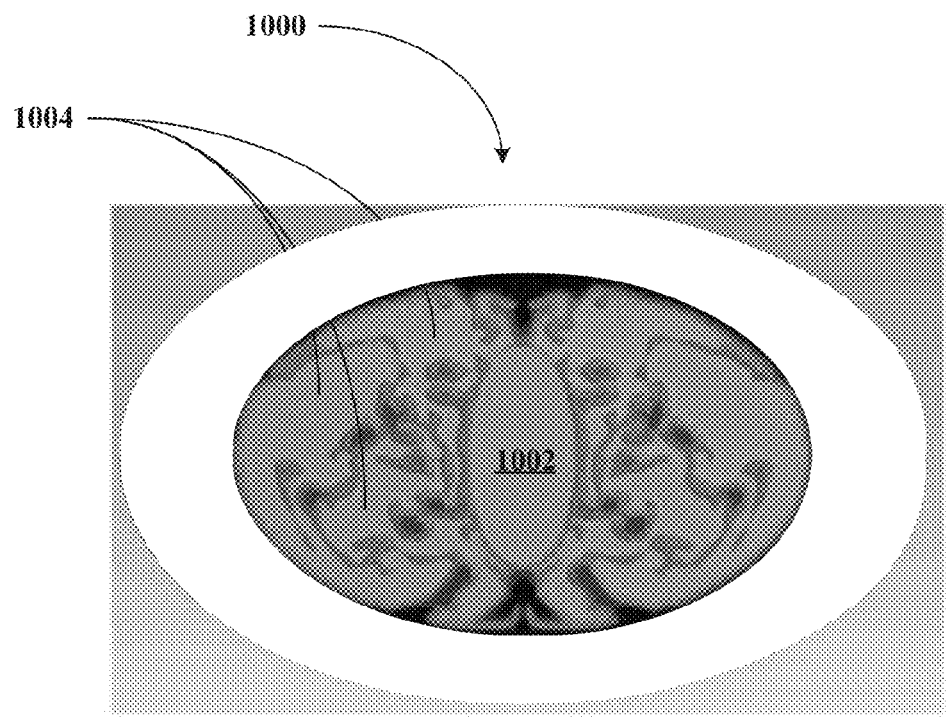
FIGS. 9A&B depict a non-optimized proppant placement configuration versus an optimized proppant placement within a fracture.
Figure 9B:
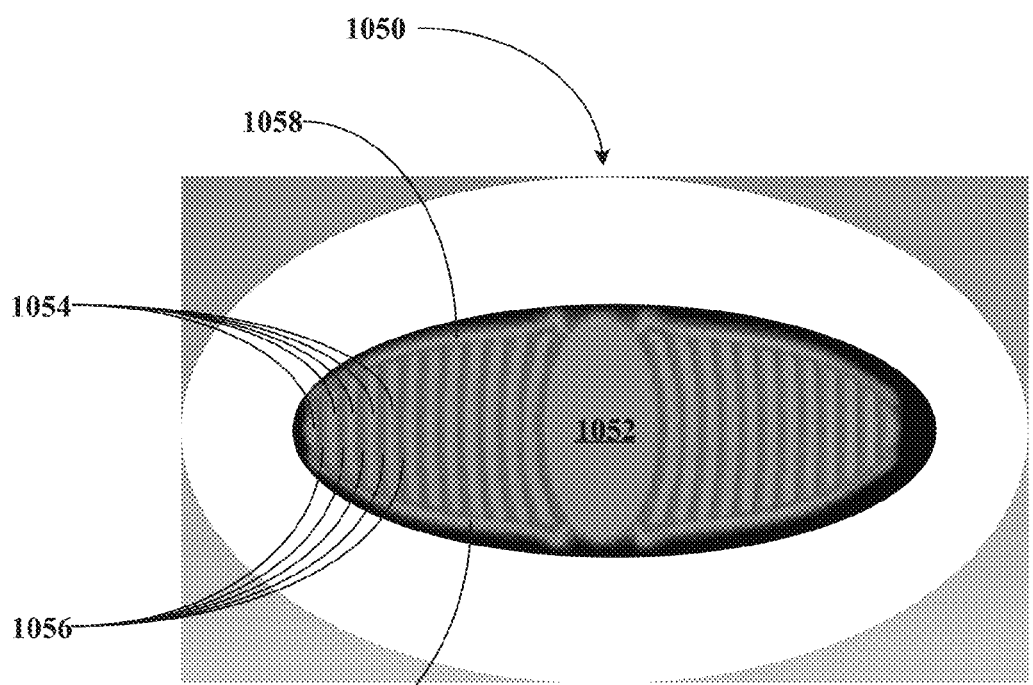

Referring now to FIGS. 9A&B, a non-optimized clustered proppant placement operation with a tail-in versus an optimized clustered proppant placement again with a tail-in is shown. Looking at FIG. 9A, the non-optimized proppant configuration, generally 1000, is shown to include a center dense proppant island 1002 and a plurality of ill defined and ill placed proppant islands 1004 distributed randomly away from the center island 1002. The configuration 1000 also include ill defined and ill placed flow paths 1006 through the configuration 1000. On the contrary, looking at FIG. 9B, the optimized proppant configuration, generally 1050, is shown to include a center dense proppant island 1052 and a plurality of well placed and well defined elongated proppant islands or pillars 1054 and well placed and well defined elongated flow paths 1056 distributed uniformly away from the center island 1052. The configuration 1050 also includes elongated boarder proppant pillars 1058. The optimal configuration 1050 clearly has enhanced or optimized proppant pillar placement resulting in an optimized flow path configuration. The configuration 1050 is, thus, comprised of a center proppant island and a plurality of alternating uniformly placed, well defined elongated proppant islands or pillars 1054 and well placed and well defined elongated flow paths 1056 and elongated boarder proppant pillars 1058. Non-optimized proppant distribution within a given fracture inhibits development of connected-open channels, leading to a chaotic pattern. In the case of the non-optimized proppant placement of FIG. 9A, most of the fracture is filled with a continuous proppant mass and similar to a conventional proppant placement operation. On the other hand, optimized proppant placement of FIG. 9B results in distinct proppant islands pushed further into the fractures with regular/adjustable spacings (i.e., different D/R ratios), high conductivity open channels between pillars and increased effective fracture lengths.

Referring now to FIGS. 10A-D, an example of a high rate/velocity injection (>70 bpm) that results in a non-optimum proppant placement configuration versus a medium rate/velocity injection (50-55 bpm) that results in an improved proppant placement configuration is shown. FIGS. 10A-B show CFD models that simulate proppant patterns, distribution and channel formation, whereas FIGS. 10C-D show geomechanical models that simulate fracture closure and conductivity evolution based on the patterns obtained from the CFD models. Looking at FIG. 10A, the high rate/velocity flow configuration 1100 through the non-optimized proppant configuration 1110 is shown and looking at FIG. 10B, the medium rate/velocity flow configuration 1150 through an improved designed configuration 1160 is shown. The high rate/velocity flow configuration 1100 includes flow channels 1102 associated with the non-optimized configuration 1110 as shown in FIG. 10C, which includes a central proppant island 1112, a plurality of lateral proppant islands 1114, and corresponding flow paths 1116. The medium rate/velocity flow configuration 1150 associated with the improved designed configuration 1160 as shown in FIG. 10D includes elongated proppant islands 1152 and elongated flow paths 1154. The improved designed proppant configuration 1160 includes a central proppant island 1162, a plurality of radially elongated proppant islands 1164, elongated boundary islands 1166, and associated flow paths 1168. Clearly, the improved design 1160 and associated improved flow configuration 1150 have more clearly defined and regular flow channel configuration at medium flow rates or velocities through an improved proppant configuration as compared to the high flow rates or velocities through a non-optimized proppant configuration. Thus, the improved design permits improved production or injection flow at medium flow rates or velocities. At relatively higher rates or inlet velocities pulsing action results in proppant patterns that are chaotic and limited flow channels that are not connected. As rate drops below a certain threshold, proppant pillars start to form and connectivity between flow channels is established as fracture remains open under an optimized configuration resisting closure.

Figure 11B:
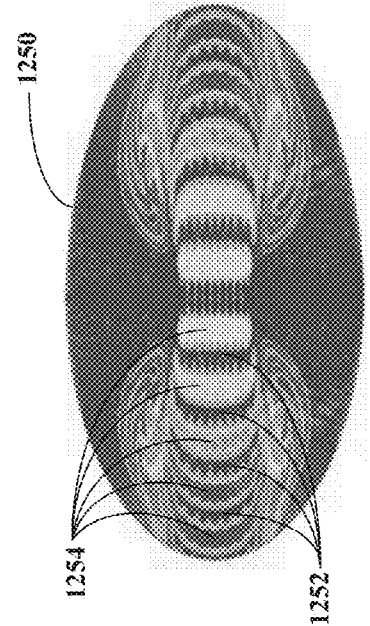
FIGS. 11A-D depicts a longer perforation interval producing an improved proppant placement configuration versus a shorter perforation interval having a non-optimum proppant placement configuration.
Figure 11D:
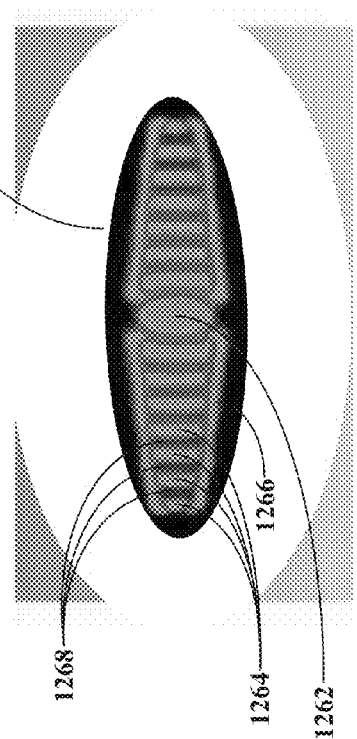
Figure 11A:
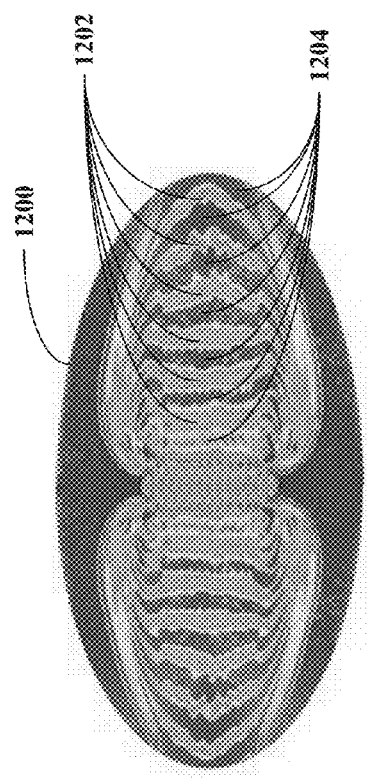
Figure 11C:
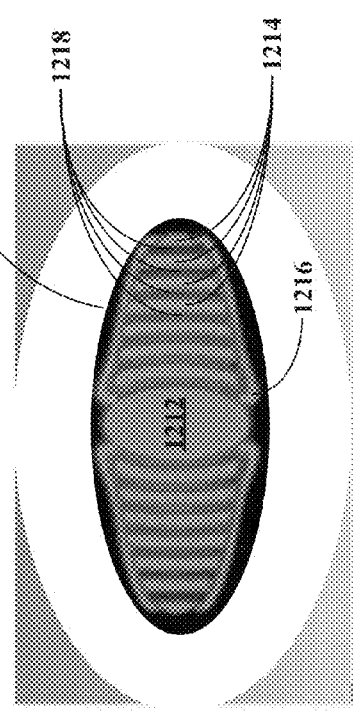

Referring now to FIGS. 11A-D, a longer perforation interval (~170 ft) producing an improved proppant placement configuration versus a shorter perforation interval (~85 ft) having a non-optimum proppant placement configuration is shown. FIGS. 11A-B show CFD models that simulate proppant patterns, distribution and channel formation whereas FIGS. 11C-D show geomechanical models that simulate fracture closure and conductivity evolution based on the patterns obtained from the CFD models. Looking at FIG. 11A, the flow configuration 1200 through an improved proppant pillar configuration 1210 based on a longer perforation interval and a simulated flow configuration 1250 through a non-optimum proppant pillar configuration 1260 as shown in FIG. 11C based on a shorter perforation interval are shown. The simulated flow configuration 1200 includes radially elongated proppant islands 1202 and associated flow channels 1204. The improved proppant pillar configuration 1210 includes a central proppant island 1212, a plurality of lateral proppant islands 1214, and corresponding flow paths 1216. Looking at FIG. 11B, the simulated flow configuration 1250 includes radially elongated proppant islands 1252 and associated radially elongated flow paths 1254. The non-optimum proppant pillar configuration 1260 as shown in FIG. 11D includes a central proppant island 1262, a plurality of lateral proppant islands 1264, and corresponding flow paths 1266. Clearly, the improved design 1210 and associated improved flow configuration 1200 have a larger proppant pillar configuration including a larger defined and regular flow channel configuration resulting from longer perforation intervals than the flow channel configuration resulting from shorter perforation intervals. Thus, the methods of the present invention no only permits optimization of proppant placement based on formation properties and proppant properties, but also the concurrent optimization of perforation intervals resulting in improved formation fracturing and improved formation production or improved formation injection. Longer perforations more effectively distribute proppant fractures within a fracture and provide optimum height coverate. As perforated interval reduces beyond a certain threshold; effective fracture area (dictated by clustered proppant coverage) decreases and conductivity is lost.

Figure 12:
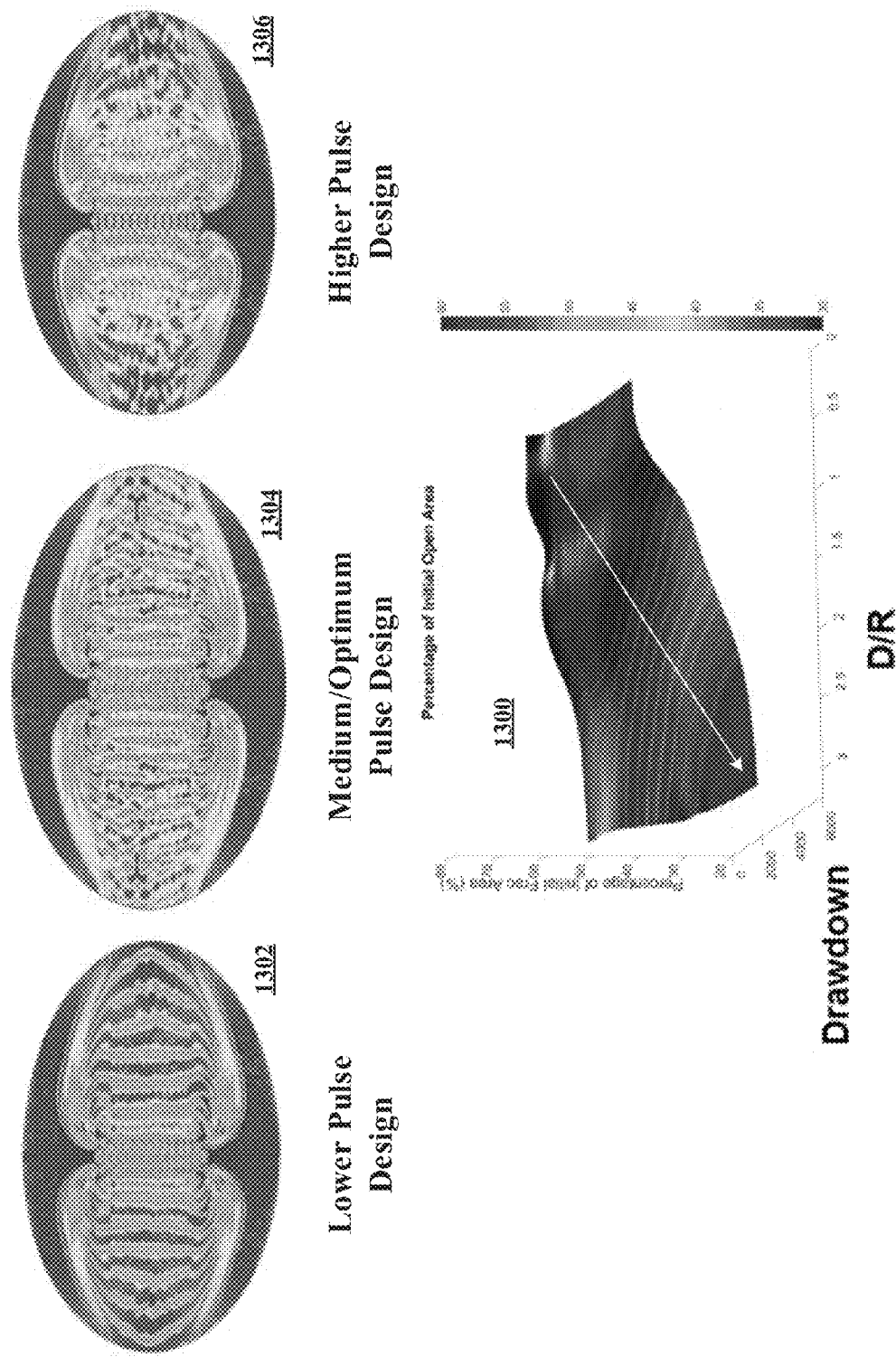
FIG. 12 depicts three different pulse designs: lower pulse design, medium or optimum pulse design and higher pulse design based on the associated response plot.

Referring now to FIG. 12, CFD analysis of three different pulse frequencies: lower pulse frequency design, medium or optimum pulse frequency design and higher pulse frequency design based are shown and based on a response surface plot 1300. FIG. 12 also includes three simulated flow channel configurations: a lower pulse design 1302, a medium or optimum pulse design 1304 and a higher pulse design 1306. Comparing the three flow channel configurations, the flow channel configuration 1304 resulting from medium or optimum pulse design show more uniform flow throughout the proppant pillar structure than the flow configurations 1302 and 1306 associated with the lower pulse design and the higher pulse design, respectively. Spacing to diameter ratio (D/R) of proppant pillars can be controlled. As pulse frequency increases (or elapsed time between each proppant pulse interval decreases) D/R ratio decreases: resulting in closely spaced pillars. For example (and based on response surfaces); for a relatively soft formation or at high drawdown pressures, pulse rate should be adjusted to optimize spacing between pillars to achieve a certain D/R ratio (D/R<1) that would keep the fracture open and conductivity above a certain threshold. As D/R ratio increases and/or spacing between clustered pillar islands increase; fractures tend to close as unsupported span area between each clustered proppant pillar increases for closure stresses is reduced.

Referring now to FIGS. 13A-D, proppant placement configuration for the lower pulse design and medium or optimum pulse design is shown. FIGS. 13A-B show CFD models that simulate proppant patterns, distribution and channel formation, whereas FIGS. 13C-D show geomechanical models that simulate fracture closure and conductivity evolution based on the patterns obtained from the CFD models. Looking at FIG. 13A, the simulated flow channel configuration 1400 and associated proppant pillar configuration 1410 as shown FIG. 13C based on the lower pulse design of FIG. 13A and looking at FIG. 13D, the simulated flow channel configuration 1450 and associated proppant pillar configuration 1460 based on the medium and optimum pulse design of FIG. 13B. The simulated flow configuration 1400 includes radially elongated proppant islands 1402 and associated flow channels 1404. The improved designed proppant pillar configuration 1410 includes a central proppant island 1412, a plurality of lateral proppant islands 1414, and corresponding flow paths 1416. The simulated flow channel configuration 1450 includes radially elongated proppant islands 1452 and associated radially elongated flow paths 1454. The optimized proppant pillar configuration 1460 includes a central proppant island 1462, a plurality of lateral proppant islands 1464, and corresponding flow paths 1466. Clearly, the optimized designed proppant pillar configuration 1460 shows a better proppant island and flow path pattern having more pillars and paths than the improved designed proppant pillar configuration 1410. Thus, the methods of the present invention no only permits optimization of proppant placement based on formation properties and proppant properties, but also the concurrent optimization of pulse design resulting in improved formation fracturing and improved formation production or improved formation injection. At relatively low pulse frequencies (35 s pulse intervals) spacing between pillars increase and fracture tend to close towards the tip. As pulse frequency increases (20 s pulse intervals): spacing between pillars (and unsupported span area between each clustered proppant pillar) decreases. This results in improved resistance to closure, higher conductivities and increased effective fracture length(s). Therefore an improved design (with regular clustered pillar patterns) can be further optimized by adjusting the pulse frequency of the operation.

Figure 14:
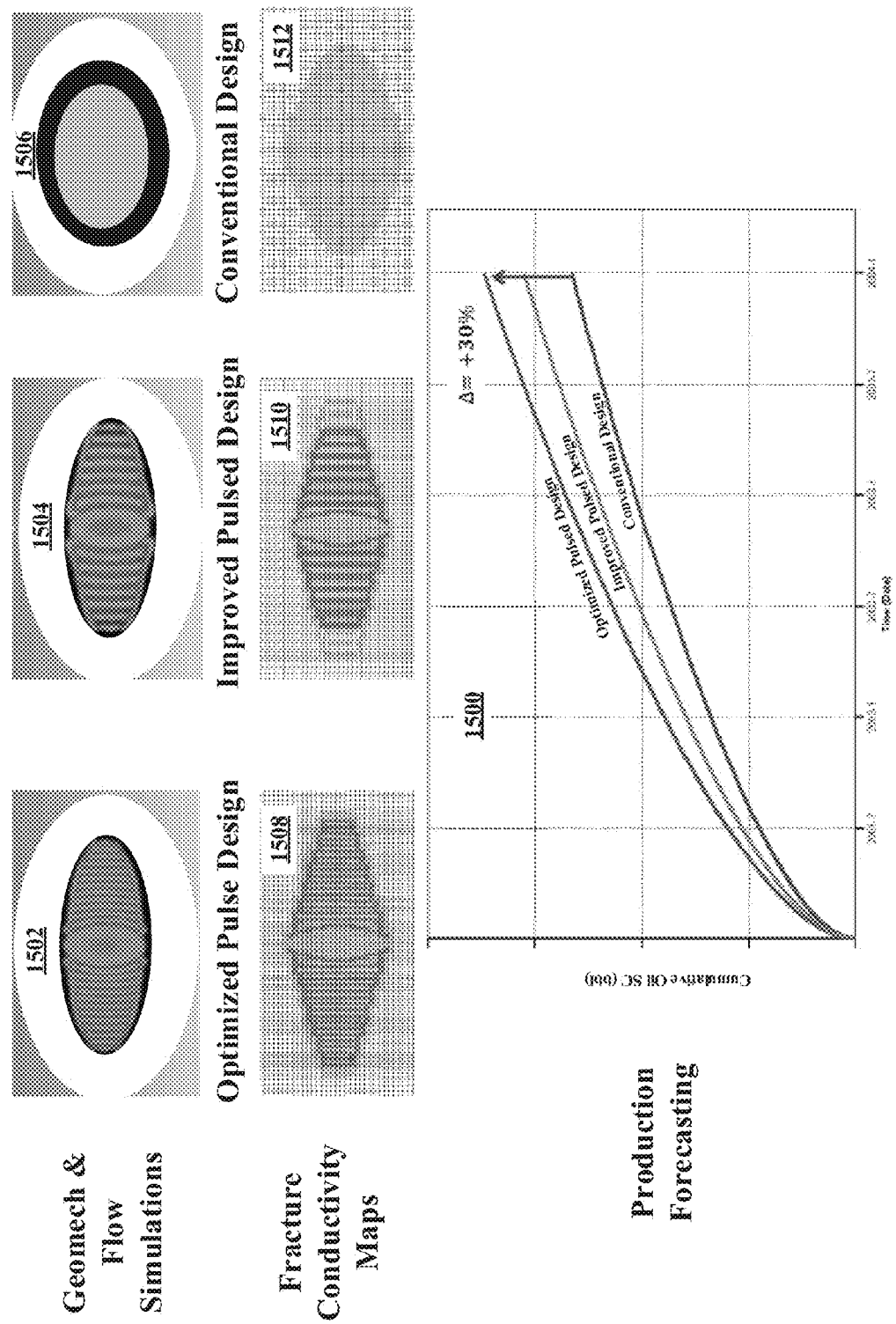
FIG. 14 depicts optimized pulse design compared non-optimized pulse design and conventional non-pulse design and a plot of the corresponding calculated production rates based on fracture conductivity.

Referring now to FIG. 14, a plot of corresponding calculated production rates based on fracture conductivity 1500 is shown that evidences production forecasts for an optimized pulse fracture design, an improved pulse fracture design and a conventional fracture design (non-pulsed). Above the plot 1500, fracture conductivity models based on flow and geomechanical models are shown including an optimized fracture conductivity model 1502 is compared to a non-optimized, but improved fracture conductivity model 1504 and a conventional fracture conductivity model 1506. The figure also shows associated reservoir models based on the conductivity maps generated from flow and geomechanical models including reservoir models 1508, 1510, and 1512, respectively. Clearly, the improved and optimized pulse designs 1502 and 1504 produce improved proppant pillar configurations and improved fracture conductivity, which will correspond to a signification increase in formation production output or formation injection capacity. Clustered proppant placement due to pulsing action provides a production uplift compared to conventional techniques. This forecast can further be improved if the operation is optimized (via adjustments to flow rate, pulse frequency, perforation design and length) leading to a forecasted production increase of ~20-30%. Again, the methods of this invention permit the generation of optimized fracturing operation parameters prior to fracturing operation commencement based on little more that formation properties and characteristics and proppant properties and characteristics. The methods then take this data and using geomechanical and flow analysis to iteratively vary proppant particles, BHP design, perforation design, and fluid pulse design until optimal fracturing parameters are generated for a given fracturing application. These optimal fracturing parameter are then used to perform the fracturing application. Again, these optimal fracturing parameters may also be modified or adjusted in near real time to adjust one, some or all of the parameters based on downhole data collected, analyzed, transmitted and utilized during the fracturing operation.

Figure 15:
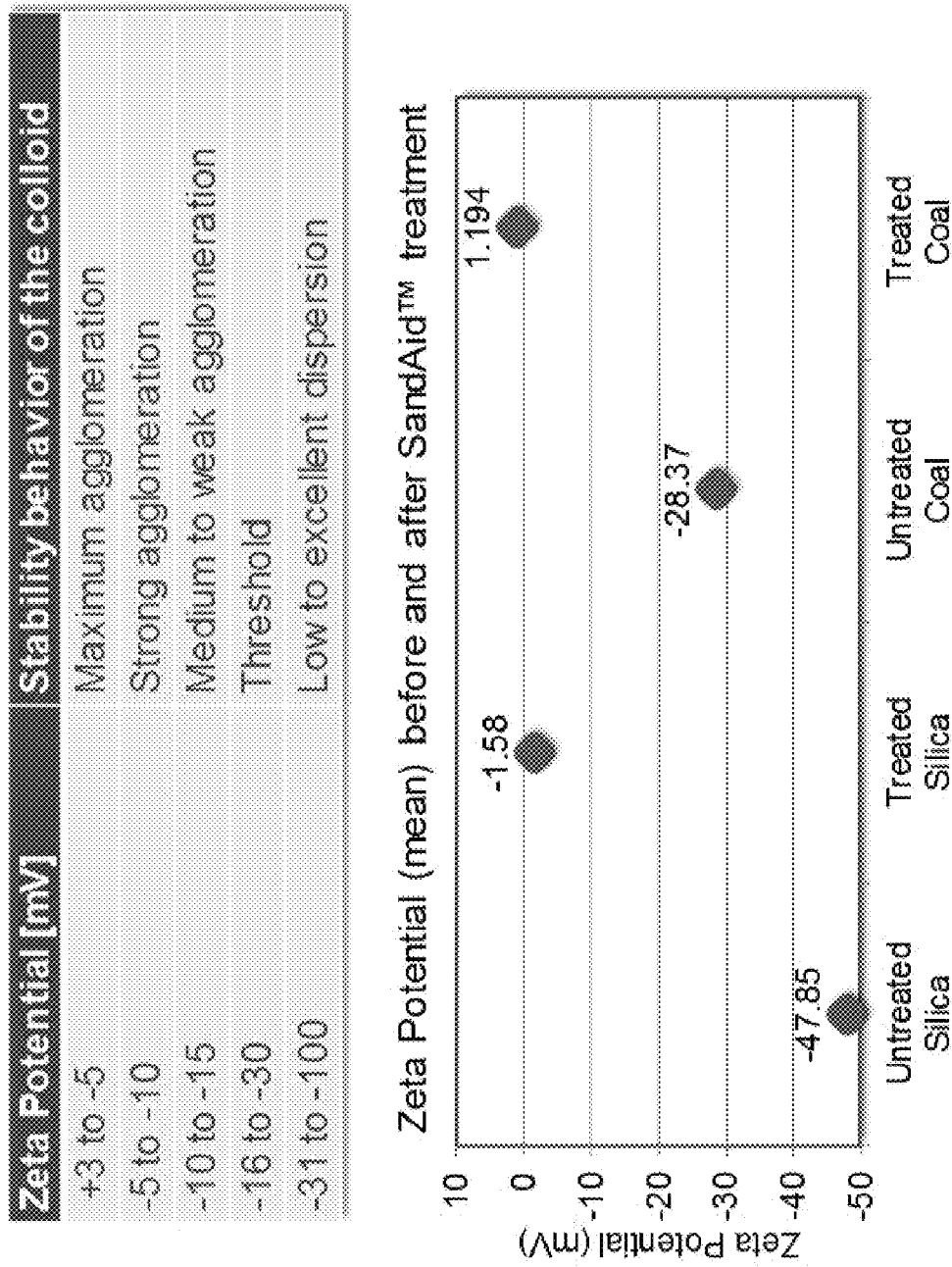
FIG. 15 depicts a chart of zeta potential values in mV versus aggregation or agglomeration propensities and a plot of the zeta potentials for untreated silica, SandAid™ treated silica, untreated coal and SandAid™ treated coal.

Referring now to FIG. 15, a table showing zeta potential in mV and the associated aggregation propensity of proppant having the tabulated zeta potential values. One important aspect of this invention is the optimization of proppant properties. Proppant aggregation properties may be varied through the use of the aggregating compositions of the invention. These aggregating compositions form partial or complete coating on the proppant particles significantly changing the particles aggregation potential. For examples, as shown in the zeta potential versus proppant type plot, untreated silica has a zeta potential of about −47.85 has little aggregating propensity, but after treatment with SandAid, an amine-phosphate aggregating composition available from Weatherford International, the treated silica has a zeta potential of about −1.58. Thus, the treatment changes the proppant from a non-aggregating proppant to a maximal aggregating proppant. A similar change is also found for particular coal, where untreated coal have a zeta potential of about −28.37, while the treated coal has a zeta potential of about 1.194 converting a threshold aggregating proppant into a maximal aggregating proppant. From this plot, it is clear that by varying untreated and treated proppant, the proppant composition may be optimized for the given fracturing operation.

Referring now to FIG. 16, a typical fracturing operation is shown to include a pad stage, a stair stepped proppant stage including proppant-free and proppant-containing fluid pulses according to a pulse cycle and a tail in stage. While the pulses here are shown equal, the pulses may be the same or different in each step.

Computational Experiments of the Invention

Engineering design and optimization of clustered proppant placement operation can be achieved within the framework of a coupled CFD and Geomechanical workflow. This workflow can be performed on various formations (soft or hard rock; conventional or unconventional plays) and modeling can be performed on any well and fracture configuration (horizontal, vertical, deviated wells; single or multiple fractures, complex fracture networks).

Figure 18:
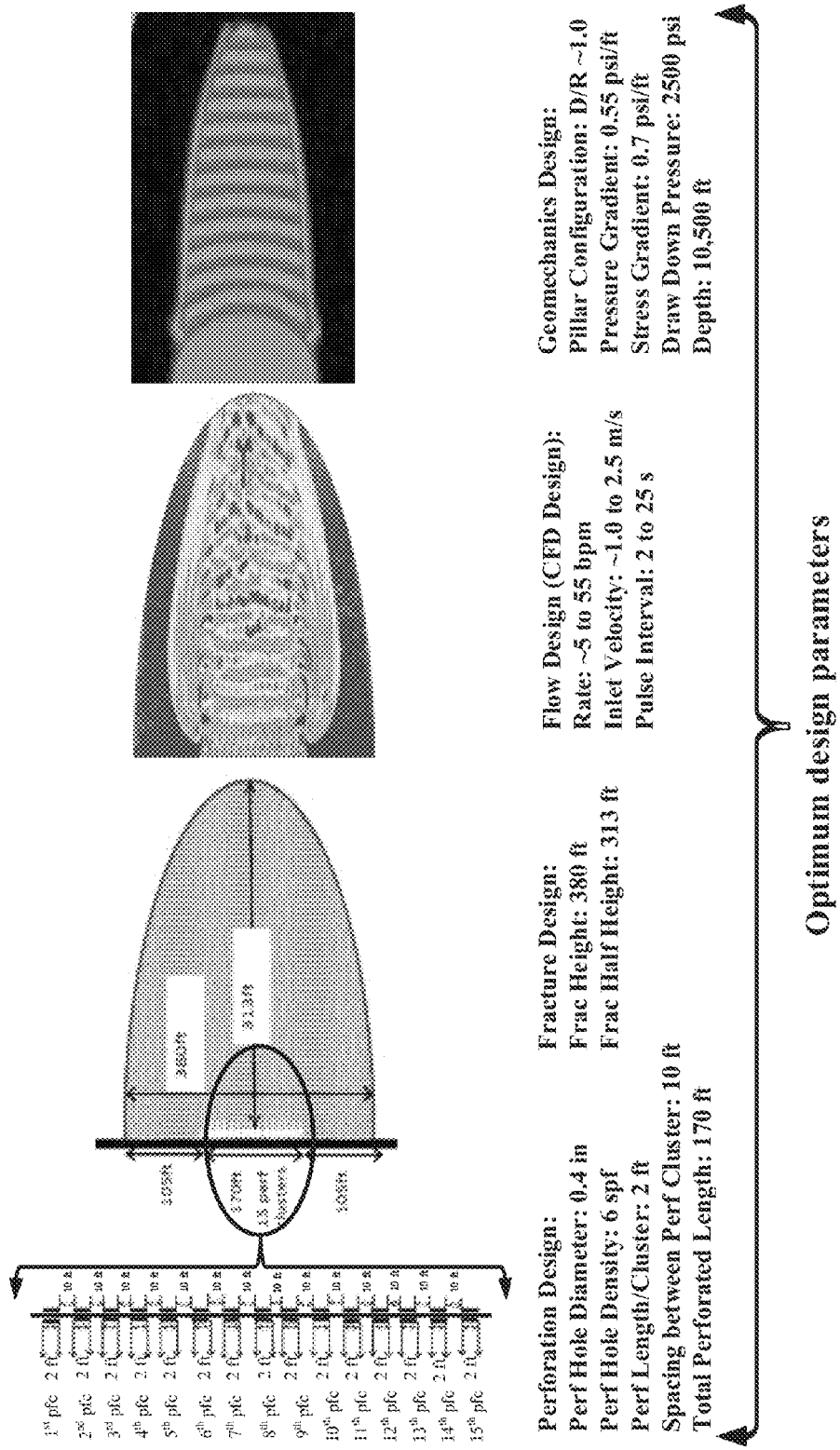
FIG. 18 depicts optimized design parameters for a specific formation.

FIGS. 17A-D show different formation types at varying depths and their corresponding stress state plotted on response surfaces. Circular data point(s) on each figure represents fracture closure risk (e.g., based on % opening) for each formation. For example, for a formation like Utah Vernal (relatively stiff, buried deep, low stress gradient). Again, the response surfaces were original color plots with dark blue at the top and dark red at the bottom. Based on computational analysis results, the following combination of design parameters lead to an optimum design and as depicted in FIG. 18.

| Perforation Design/Parameters | Flow Design/Parameters |
|---|---|
| Perforation Hole Diameter: 0.4" (1.02 cm) | Rate: about 50 to about 55 bpm |
| Perforation Hole Density: 6 spf | Inlet Velocity: about 1.5 to about 2.5 m/s |
| Perforation Length/Cluster: 2' (0.61 m) | Pulse Interval: about 20 to about 25 s |
| Evenly Space Perforation Cluster: 10' (3.05 m) | |
| Total Perforated Length: 170' (51.8 m) | |

| Fracture Design/Parameters | Geomechanics Design/Parameters |
|---|---|
| Fracture Height: 380' (115.8 m) | Pillar Configuration: D/R about 1.0 |
| Fracture Half Height: 313' (95.4 m) | Pressure Gradient: 0.55 psi/ft |
| | Stress Gradient: 0.7 psi/ft |
| | Draw Down Pressure: 2500 psi (17.2 MPa) |
| | Depth: 10,500' (3,200 m) |
| | Young's Modulus: 32 Gpa |

As formation type(s) vary: design parameters need to be adjusted and optimized. For example, stiffer formations having a higher Young's modulus>30 GPa and relatively shallow depth between about 7,000 ft (2134 m) to about 8,500 ft (2591 m) may be accommodated with relatively higher pulse intervals between about 20 s and about 30 s to maintain fracture conductivity. Examples of such formations or plays include Utah Vernal, Barnett, Horn River, or similar plays based on their avg. formation properties; while relatively softer formations having a Young's modulus<20 GPa and a deeper depth between about 11,000 ft (3353 m) and about 12,000 ft (3658 m) might require pulse intervals between about 10 s and about 20 s. Examples of such plays include Haynesville, EagleFord, or similar formation based on their average formation properties. For other plays that lie in between these bookends (e.g., like Marcellus formations), the same workflow can be utilized to come up with optimum design parameters. In general, higher injection rates of about 70 to greater than 70 bpm lead to chaotic pillar formation. For more regular pillar pattern clustering, injection rates between about 50 bpm and about 55 bpm or lower inlet velocities of about 2 m/s and intermediate pulse intervals of about 30 s lead to more regular pillar configurations, where spacing may be further adjusted by varying pulse intervals. Relatively long and evenly spaced perforation clusters lead to increased proppant coverage area.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method of optimizing proppant placement in a subterranean formation; comprising the steps of:
   (a) obtaining:
      (1) formation, site and well properties and characteristics including formation depth, formation pore pressure gradient, formation temperature, formation natural fractures, formation cohesion, formation friction angle, formation anisotropy, formation zones, formation shale play zones, formation permeability, formation porosity, formation Young's modulus, formation Poisson's ratio, and formation effective stress,
      (2) proppant properties and characteristics including type, zeta potential, coating type, diameter, and strength, and
      (3) fracturing fluid properties and characteristics including base fluid type, viscosity, elasticity, proppant density, proppant diameter, proppant concentration, aggregating composition type, aggregating composition concentration, coating crosslinking composition concentration type, and coating crosslinking composition concentration;
   (b) generating response surfaces for different proppant island and flow channel configurations based on the obtained properties and characteristics, a bottom hole pressure (BHP) design, a perforation design, a fracturing fluid rate and pulse design, and a proppant design;
   (c) simulating island transport properties based on the obtained properties and characteristics, the BHP design, the perforation design, the fracturing fluid rate and pulse design, and the proppant design;
   (d) simulating island embedment and fracture closure properties based on the obtained properties and characteristics, the BHP design, the perforation design, and the fracturing fluid rate and pulse design;
   (e) generating fracturing operational parameters based on the simulated island transport properties and the simulated island embedment and fracture closure properties to determine flow channels and fracture lengths;
   (f) adjusting the BHP design, the perforation design, and the fracturing fluid rate and pulse design;
   (g) repeating steps (e) through (f), until the generated fracturing operational parameters are optimized to generate optimized fracturing operational parameters that are designed to produce an optimized proppant island and flow channel configuration;
wherein:
   the optimized perforation design includes perforation hole diameter, perforation hole density, perforation length, perforation spacing, and total perforation length,
   the optimized fracturing fluid rate and pulse design includes a series of proppant-free fracturing fluid pulses and proppant-containing fluid pulses, inlet velocities, pulse rates, pulse frequencies, and pulse intervals,
   the optimized BHP design includes bottom hole pressure and temperature,
   at least one of the fracturing fluids includes an aggregating composition comprising: 1) an amine/phosphate reaction product, 2) an amine component and an amine/phosphate reaction product, 3) a polymeric amine; 4) a polymeric amine and an amine/phosphate reaction products, 5) a polymeric amine, an amine component, and an amine/phosphate reaction product, 6) an amine component, 7) a coacervate aggregating composition, or 8) mixtures and combinations thereof,
   at least one of the fracturing fluids includes a coating crosslinking composition comprising inorganic crosslinking agents, organic crosslinking agents, or mixtures and combinations thereof,
   at least one of the fracturing fluid types include proppants,
   the aggregating composition forms a coating on the proppant causing the coated proppant to aggregate into pillars in the fractures in accord with the proppant island and flow channel configuration, and
   the coating crosslinking composition forms crosslinks in the coating stabilizing and strengthening the pillars within the proppant island and flow channel configuration.

2. The method of claim 1, further comprising:
   (h) transmitting the optimized fracturing operational parameters to a field location for implementation;
   (i) fracturing the formation utilizing the optimized fracturing operational parameters;
   (j) collecting near real time data while fracturing; and
   (k) adjusting one, some or all of the optimized fracturing operational parameters while fracturing.

3. A system for fracturing a subterranean formation comprising:
   a fracturing parameter generation subsystem implemented on a digital and/or analog processing unit that:
      (a) obtains:
         (1) formation, site and well properties and characteristics including formation depth, formation pore pressure gradient, formation temperature, formation natural fractures, formation cohesion, formation friction angle, formation anisotropy, formation zones, formation shale play zones, formation permeability, formation porosity, formation Young's modulus, formation Poisson's ratio, and formation effective stress, (2) proppant properties and characteristics including type, zeta potential, coating type, diameter, and strength, (3) fracturing fluid properties and characteristics including base fluid type, viscosity, elasticity, proppant density, proppant diameter, proppant concentration, aggregating composition type, aggregating composition concentration, coating crosslinking composition concentration type, and coating crosslinking composition concentration;

(b) generates response surfaces for different proppant island and flow channel configurations based on the obtained properties and characteristics, a bottom hole pressure (BHP) design, a perforation design, and a fracturing fluid rate and pulse design;

(c) simulates island transport properties based on the obtained properties and characteristics, the BHP design, the perforation design, and the fracturing fluid rate and pulse design;

(d) simulates island embedment and fracture closure properties based on the obtained properties and characteristics, the BHP design, the perforation design, and the fracturing fluid rate and pulse design;

(e) generates fracturing operational parameters based on the simulated island transport properties and the simulated island embedment and fracture closure properties to determine flow channels and fracture lengths;

(f) adjusts the BHP design, the perforation design, and the fracturing fluid rate and pulse design;

(g) repeats steps (e) through (f), until the generated fracturing operational parameters are optimized to produce optimized fracturing operational parameters, wherein:
the optimized perforation design includes perforation hole diameter, perforation hole density, perforation length, perforation spacing, and total perforation length,
the optimized fracturing fluid rate and pulse design includes a series of proppant-free fracturing fluid pulses and proppant-containing fluid pulses, inlet velocities, pulse rates, pulse frequencies, and pulse intervals,
the optimized BHP design includes bottom hole pressure and temperature,
at least one of the fracturing fluids includes an aggregating composition comprising: 1) an amine/phosphate reaction product, 2) an amine component and an amine/phosphate reaction product, 3) a polymeric amine; 4) a polymeric amine and an amine/phosphate reaction products, 5) a polymeric amine, an amine component, and an amine/phosphate reaction product, 6) an amine component, 7) a coacervate aggregating composition, or 8) mixtures and combinations thereof,
at least one of the fracturing fluids includes a coating crosslinking composition comprising inorganic crosslinking agents, organic crosslinking agents, or mixtures and combinations thereof,
the aggregating composition forms a coating on the proppant causing the coated proppant to aggregate into pillars in the fractures in accord with the proppant island and flow channel configuration, and
the coating crosslinking composition forms crosslinks in the coating stabilizing and strengthening the pillars within the proppant island and flow channel configuration;
a delivery subsystem that fractures the formation according to the optimized formation fracturing parameters produces an optimized proppant island and flow channel configuration, and
a control subsystem in communication with the fracturing parameter generation subsystem and the delivery subsystem that receives the optimized formation fracturing parameters form the fracturing parameter generation subsystem, transmits the parameters to the delivery subsystem, and controls the delivery subsystem during formation fracturing.

4. The system of claim 3, further comprising:
a sensor subsystem including a plurality of sensors that measure one, some or all of the fracturing operational parameter in real-time or near real time,
a parameter adjustment subsystem that receives sensor data and modifies or adjusts one, some, or all of the optimized formation fracturing parameters based on the received sensor data,
wherein the sensor subsystem and the parameter adjustment subsystem are in communication with the control subsystem and the control subsystem transmits the adjusted parameters to the delivery subsystem while fracturing.

5. The system of claim 3, wherein the delivery subsystem comprises a pump.

6. The system of claim 5, wherein the delivery subsystem further comprises a mixer.

7. The system of claim 5, wherein the delivery subsystem further comprises a blender.

8. The system of claim 7, wherein the blender comprises a programmable optimum density (POD) blender.

9. The system of claim 7, wherein the blender comprises a tub blender.

10. The system of claim 4, wherein the sensor is selected from the group consisting of pressure sensor, seismic sensor, tilt sensor, radioactivity sensor, magnetic sensor and electromagnetic sensor.

11. The system of claim 4, wherein the sensor comprises an array of sensors.

12. The system of claim 4, wherein the sensor comprises a noisy particulate material and a noisy particulate material sensor that detects a detonation, ignition or exothermic reaction of the noisy particulate material.

13. The system of claim 12, wherein the noisy particulate material sensor includes a transmitting device that actively transmits location data and the sensor subsystem comprises a sensor for receiving the transmitted location data.

14. The method of claim 1, wherein the optimized proppant island and flow channel configuration produces high conductivity fractures.

15. The method of claim 14, wherein the optimized proppant island and flow channel configuration comprises an elongated island and flow channel structure comprising a central proppant pillar, a plurality of radially elongated proppant pillars, elongated boundary pillars, and elongated flow paths interposed between the pillars.

16. The method of claim 15, wherein the pillars comprise crosslinked, aggregating composition coated proppant having improved crush strength, wherein the aggregating composition has a Zeta potential between $-10$ mV and $-15$ mV, between $-5$ mV and $-10$ mV, or between $+3$ mV and $-5$ mV.

17. The system of claim 3, wherein the optimized proppant island and flow channel configuration produces high conductivity fractures.

18. The system of claim 17, wherein the optimized proppant island and flow channel configuration comprises an elongated island and flow channel structure comprising a central proppant pillar, a plurality of radially elongated proppant pillars, elongated boundary pillars, and elongated flow paths interposed between the pillars.

19. The system of claim 18, wherein the pillars comprise crosslinked, aggregating composition coated proppant having improved crush strength, wherein the aggregating composition has a Zeta potential between −10 mV and −15 mV, between −5 mV and −10 mV, or between +3 mV and −5 mV.

* * * * *